US007679593B2

(12) United States Patent
Nakai et al.

(10) Patent No.: US 7,679,593 B2
(45) Date of Patent: *Mar. 16, 2010

(54) LIQUID CRYSTAL DISPLAY DEVICE HAVING A LIQUID CRYSTAL DISPLAY DRIVEN BY INTERLACE SCANNING AND/OR SEQUENTIAL SCANNING

(75) Inventors: Masaaki Nakai, Osaka (JP); Katsuhiko Asai, Takatsuki (JP); Koichi Kohriyama, Amagasaki (JP); Keizou Ochi, Takatsuki (JP); Takashi Kondo, Sakai (JP); Hideo Hotomi, Toyonaka (JP); Kazuaki Okumura, Ikeda (JP)

(73) Assignee: Minolta Co., Ltd., Osaka (JP)

( * ) Notice: Subject to any disclaimer, the term of this patent is extended or adjusted under 35 U.S.C. 154(b) by 1133 days.

This patent is subject to a terminal disclaimer.

(21) Appl. No.: 11/200,775

(22) Filed: Aug. 10, 2005

(65) Prior Publication Data

US 2006/0012556 A1 Jan. 19, 2006

Related U.S. Application Data

(63) Continuation of application No. 09/795,938, filed on Feb. 28, 2001, now Pat. No. 6,954,195.

(30) Foreign Application Priority Data

| | | | |
|---|---|---|---|
| Mar. 1, 2000 | (JP) | .............................. | 2000-55874 |
| Mar. 29, 2000 | (JP) | .............................. | 2000-91612 |
| Mar. 31, 2000 | (JP) | .............................. | 2000-99828 |
| Mar. 31, 2000 | (JP) | .............................. | 2000-99829 |
| Mar. 31, 2000 | (JP) | .............................. | 2000-99830 |
| Nov. 6, 2000 | (JP) | .............................. | 2000-338097 |

(51) Int. Cl.
*G09G 3/36* (2006.01)
*G09G 5/00* (2006.01)
*G06F 3/039* (2006.01)

(52) U.S. Cl. ............................ 345/94; 345/95; 345/210

(58) Field of Classification Search ......... 345/201–214, 345/87–104; 349/169

See application file for complete search history.

(56) References Cited

U.S. PATENT DOCUMENTS

| | | | | |
|---|---|---|---|---|
| 4,834,506 | A | 5/1989 | Demke et al. | 349/143 |
| 5,070,409 | A | 12/1991 | Miyadera et al. | 348/790 |
| 5,147,682 | A | 9/1992 | Takiguchi et al. | 427/58 |
| 5,200,845 | A | 4/1993 | Crooker et al. | 349/175 |
| 5,555,114 | A | 9/1996 | Narita et al. | 349/98 |
| 5,583,534 | A | 12/1996 | Katakura et al. | 345/97 |
| 5,715,019 | A | 2/1998 | Yata | 348/722 |
| 5,734,367 | A | 3/1998 | Tsuboyama et al. | 345/101 |
| 5,748,277 | A | 5/1998 | Huang et al. | 349/169 |
| 5,754,153 | A | 5/1998 | Mizutome et al. | 345/97 |
| 5,796,381 | A | 8/1998 | Iwasaki et al. | 345/101 |
| 5,886,678 | A | 3/1999 | Katakura et al. | 345/94 |
| 5,943,035 | A | 8/1999 | Katakura | 345/97 |
| 6,133,895 | A | 10/2000 | Huang | 345/94 |
| 6,225,967 | B1 | 5/2001 | Hebiguchi | 345/88 |
| 6,268,840 | B1 | 7/2001 | Huang | 345/94 |
| 6,323,871 | B1 | 11/2001 | Fujiyoshi et al. | 345/598 |
| 6,326,935 | B1 | 12/2001 | Boger | 345/3.2 |
| 6,384,831 | B1 | 5/2002 | Nakamura et al. | 345/503 |
| 6,507,331 | B1 | 1/2003 | Schlangen et al. | 345/100 |
| 6,954,195 | B2 * | 10/2005 | Yoneda et al. | 345/94 |
| 2002/0005843 | A1 | 1/2002 | Kurumisawa et al. | 345/204 |

FOREIGN PATENT DOCUMENTS

| | | | |
|---|---|---|---|
| EP | 0 569 029 | A2 | 11/1993 |
| EP | 0 772 067 | A1 | 5/1997 |
| JP | 02-093583 | A | 4/1990 |
| JP | 05-066733 | A | 3/1993 |
| JP | 05-127629 | A | 5/1993 |
| JP | 5-210085 | A | 8/1993 |
| JP | 5-236399 | A | 9/1993 |

| | | | |
|---|---|---|---|
| JP | 05-323931 A | 12/1993 |
| JP | 6-95071 A | 4/1994 |
| JP | 07-181915 A | 7/1995 |
| JP | 08-304774 A | 11/1996 |
| JP | 10-023117 A | 1/1998 |
| JP | 2000-069134 A | 3/2000 |
| WO | WO99/40561 A1 | 8/1999 |

OTHER PUBLICATIONS

Xiao-Yang Huang et al, "23.3: High-Performance Dynamic Drive Scheme for Bistable Reflective Cholesteric Displays", *SID 96 Digest*, 1996, pp. 359-362.

European Search Report, dated Jul. 11, 2003, for counterpart European Patent Application No. EP 01 10 4477.

Japanese "Notification of Reasons for Refusal", dated Jul. 21, 2009, for counterpart Japanese Patent Application No. 2000-099829, along with an English-translation thereof.

Japanese "Notification of Reasons for Refusal", dated Jul. 21, 2009, for counterpart Japanese Patent Application No. 2000-099830, along with an English-translation thereof.

* cited by examiner

*Primary Examiner*—Srilakshmi K Kumar
(74) *Attorney, Agent, or Firm*—Sidley Austin LLP

(57) ABSTRACT

A display device which has a liquid crystal display which has a plurality liquid crystal pixels arranged in a matrix and which writes an image thereon after resetting the liquid crystal. The method of writing on the liquid crystal display can be selected from driving methods according to interlace scanning in which a frame is divided into a plurality of fields and writing by interlace scanning is performed and driving methods according to sequential scanning in which scanning lines are subjected to writing serially. When high-speed writing is required, for example, when display of a motion picture, display of inputted letters or scroll display is desired, one of the driving methods according to interlace scanning is selected. In interlace scanning, based on the end of a blackout state of a scanning line in a field, selection of a scanning line in the next field for writing is started. Writing on a scanning line comprises a reset step of resetting the liquid crystal, a selection step of selecting the final state of the liquid crystal, an evolution step of stabling the liquid crystal into the selected state, and one of the length of the reset step and the total length of the selection step and the evolution step is n times (n: natural number) the other. For example, when the length of the reset step is n times the total length of the selection step and the evolution step and when a frame is divided into m fields (m: natural number larger than n) for interlace scanning, there is a moment when, in serial m scanning lines, n scanning lines of them are in the reset step, one of them is in the selection step or in the evolution step, and the other m-n-1 scanning lines are in a display step.

20 Claims, 47 Drawing Sheets

SCANNING EXAMPLE 5 (DIVIDED INTO 3 FIELDS, STILL PICTURE→MOTION PICTURE)

SCANNING EXAMPLE 6 (DIVIDED INTO 3 FIELDS, STILL PICTURE→MOTION PICTURE)

SCANNING EXAMPLE 8 [RESETx2= SELECTION + EVOLUTION, m=7, n=2]

AVERAGE BRIGHTNESS OF 7 LINES
[RESET+EVOLUTION+DISPLAY+DISPLAY+DISPLAY+DISPLAY+DISPLAY]

SCANNING EXAMPLE 10 [RESET=(SELECTION + EVOLUTION)x2, m=5, n=2]

F / G. 2 2

SCANNING EXAMPLE 11 [(RESET+SELECTION)x2= EVOLUTION, m=7, n=2]

SCANNING EXAMPLE 14 (NON-DIVIDED, SEQUENTIAL SCANNING)

SCANNING EXAMPLE 15 (NON-DIVIDED, SEQUENTIAL SCANNING)

SCANNING EXAMPLE 16 (NON-DIVIDED, INTERLACE SCANNING)

EXAMPLE 1: STILL PICTURE → MOTION PICTURE

EXAMPLE 2: STILL PICTURE → INPUTTED LETTERS

EXAMPLE 3: SCROLL

SCANNING EXAMPLE 4 (DIVIDED INTO 2 FIELDS, STILL PICTURE→MOTION PICTURE)

FIG. 36

SEQUENTIAL SCANNING MODE

ORDINARY 1

| | | | |
|---|---|---|---|
| 1ST FRAME | 2ND FRAME | 3RD FRAME | 4TH FRAME |

POWER-SAVING 1-1

| | |
|---|---|
| 1ST FRAME | 2ND FRAME |

POWER-SAVING 1-2

| | | | | |
|---|---|---|---|---|
| 1ST FRAME | BREAK | 2ND FRAME | BREAK | 3RD FRAME |

FIG. 37

INTERLACE SCANNING MODE

ORDINARY 2

| 1ST FRAME | | 2ND FRAME | | 3RD FRAME | | 4TH FRAME | |
|---|---|---|---|---|---|---|---|
| ODD-NUMBER FIELD | EVEN-NUMBER FIELD | ODD-NUMBER FIELD | EVEN-NUMBER FIELD | ODD-NUMBER FIELD | EVEN-NUMBER FIELD | ODD-NUMBER FIELD | EVEN-NUMBER FIELD |

POWER-SAVING 2-1

| 1ST FRAME | | | 2ND FRAME | | | 3RD FRAME | |
|---|---|---|---|---|---|---|---|
| ODD-NUMBER FIELD | EVEN-NUMBER FIELD | BREAK | ODD-NUMBER FIELD | EVEN-NUMBER FIELD | BREAK | ODD-NUMBER FIELD | EVEN-NUMBER FIELD |

POWER-SAVING 2-2

| 1ST FRAME | | 1ST FRAME | | 2ND FRAME | | 2ND FRAME | | 3RD FRAME | | |
|---|---|---|---|---|---|---|---|---|---|---|
| ODD-NUMBER FIELD | BREAK | EVEN-NUMBER FIELD | BREAK | ODD-NUMBER FIELD | BREAK | EVEN-NUMBER FIELD | BREAK | ODD-NUMBER FIELD | BREAK | |

FIG. 38

INTERLACE SCANNING MODE : MODIFIED

ORDINARY 3

| 1ST FRAME | 2ND FRAME | 3RD FRAME | 4TH FRAME |
|---|---|---|---|
| ODD-NUMBER FIELD | EVEN-NUMBER FIELD | ODD-NUMBER FIELD | EVEN-NUMBER FIELD |

POWER-SAVING 3-1

| 1ST FRAME | | 2ND FRAME | | 3RD FRAME | | 4TH FRAME | | 5TH FRAME |
|---|---|---|---|---|---|---|---|---|
| ODD-NUMBER FIELD | BREAK | EVEN-NUMBER FIELD | BREAK | ODD-NUMBER FIELD | BREAK | EVEN-NUMBER FIELD | BREAK | ODD-NUMBER FIELD |

F / G. 4 1
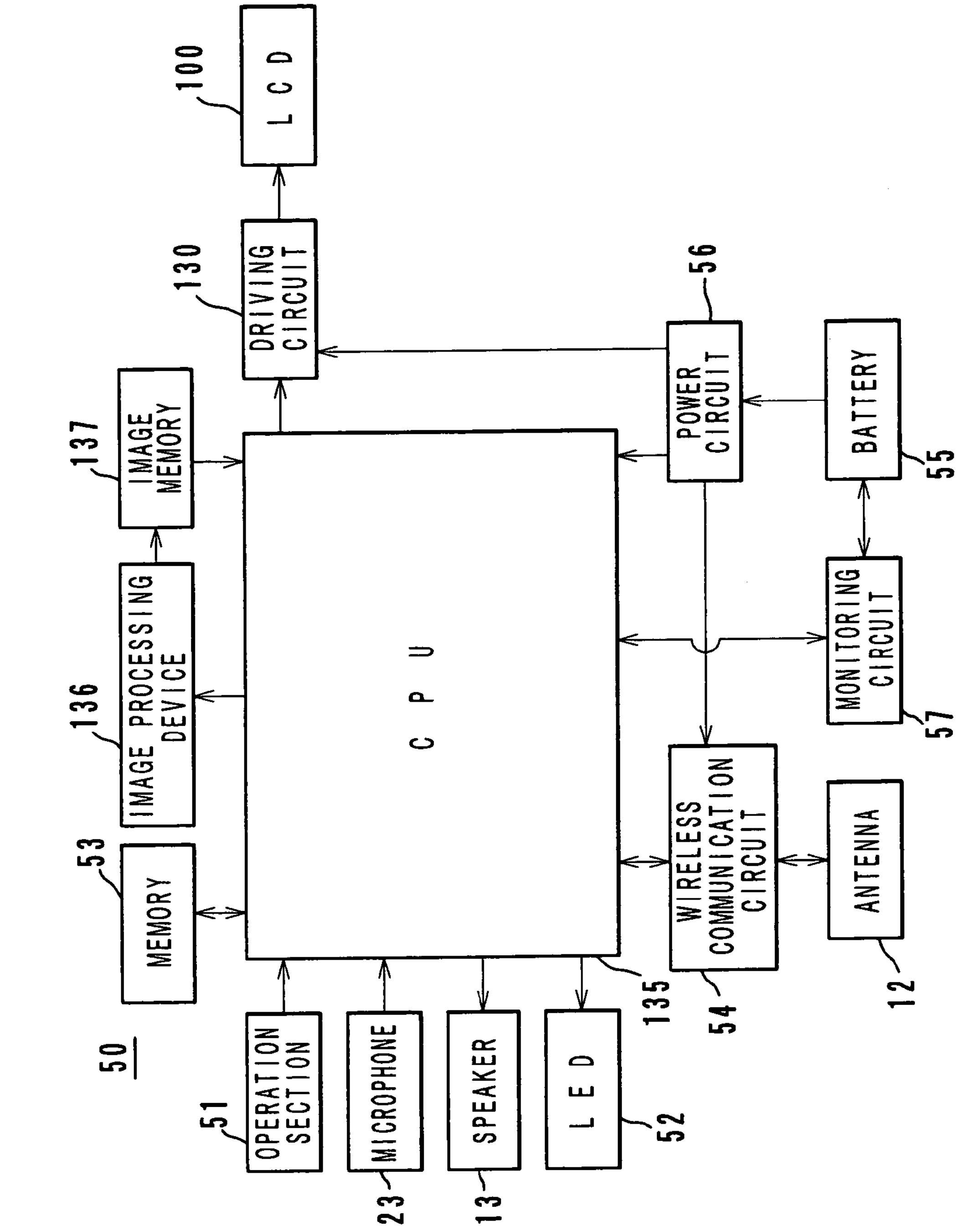

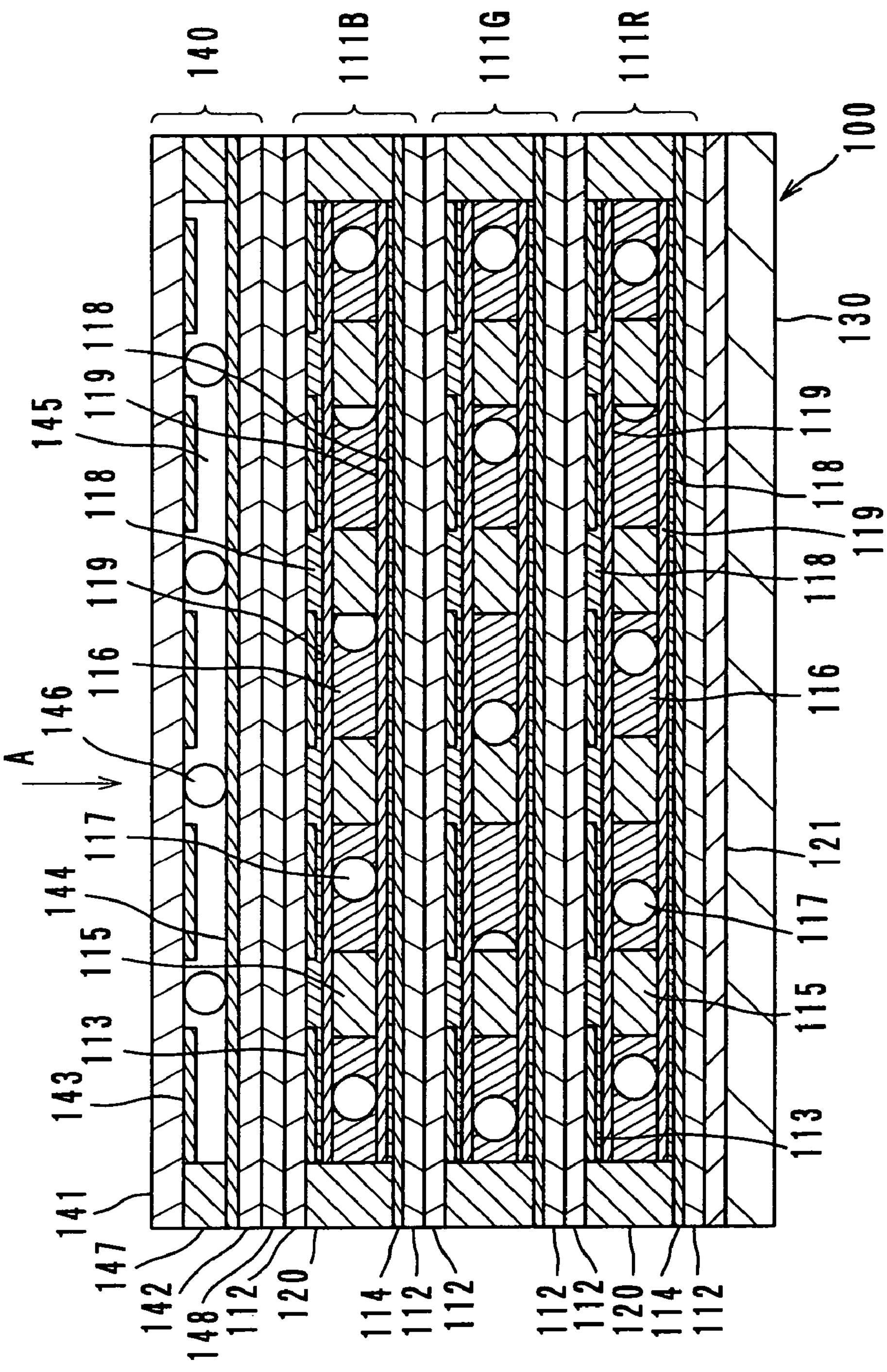
F/G. 59

LIQUID CRYSTAL DISPLAY DEVICE HAVING A LIQUID CRYSTAL DISPLAY DRIVEN BY INTERLACE SCANNING AND/OR SEQUENTIAL SCANNING

This application is a continuation application of application Ser. No. 09/795,938, filed Feb. 28, 2001, now U.S. Pat. No. 6,954,195, issued Oct. 11, 2005, which is based on the Japanese application Nos. 2000-55874, 2000-91612, 2000-99828, 2000-99829, 2000-99830 and 2000-338097 filed in Japan, the contents of which are incorporated by reference.

BACKGROUND OF THE INVENTION

1. Field of the Invention

The present invention relates to a liquid crystal display device, and more particularly to a display device which has a liquid crystal display which has a plurality of liquid crystal pixels arranged in a matrix and on which writing is carried out after reset of the liquid crystal.

2. Description of Prior Art

In recent years, liquid crystal displays which use chiral nematic liquid crystal which exhibits a cholesteric phase at room temperature attracts attention because such displays have a memory effect, that is, are capable of displaying an image thereon continuously after the supply of electric power thereto is stopped.

However, in such a liquid crystal display, it is necessary to reset the liquid crystal before writing, and it takes a long time to complete writing. During the writing, in the part on which writing is being carried out, the light absorbing layer provided on the backside of the pixels is seen as black lines (blackout), which raises a problem that the screen is difficult to see.

In portable equipment such as note-type personal computers, mobile telephones, PDA, digital cameras, video cameras, etc., batteries are used as the power sources, and therefore, the available time of such a device after an electric charge thereto is limited. It is demanded to lengthen the available time.

In order to comply with this demand, it is good to use the above-described reflective type liquid crystal displays which have a memory effect and which therefore consume little electric power. This will contribute to energy saving and will never obstacle downsizing, lightening and thinning of the devices. Thus, in the near future, it will be indispensable to employ a reflective type liquid crystal display with a memory effect for portable equipment.

A liquid crystal display with a memory effect consumes electric power while carrying out writing thereon. Therefore, such a liquid crystal display consumes little electric power while displaying a still image continuously but consumes great electric power while writing images repeatedly.

A typical example of liquid crystal with a memory effect is chiral nematic liquid crystal. This kind of liquid crystal takes a longer time for writing thereon than TFT liquid crystal, and this kind of liquid crystal has been considered to be unsuited to display motion pictures and rapidly changeable images (for example, display of inputted letters, scroll of a screen).

SUMMARY OF THE INVENTION

An object of the present invention is to provide a display device which takes a short time for writing of one frame and which has an easy-to-see screen on which blackout is inhibited.

Another object of the present invention is to provide a display device which consumes less electric power in carrying out writing thereon repeatedly.

Another object of the present invention is to provide a display device which carries out high-speed writing when necessary.

Further, another object of the present invention is to provide a display device which carries out high-speed writing in accordance with the kind of an image to be displayed thereon.

Furthermore, another object of the present invention is to provide a display device which inhibits a flicker during writing, which results in achieving an easy-to-see screen.

In order to attain the objects, a display device according to the present invention comprises: a liquid crystal display comprising a plurality of scanning lines, a plurality of data lines which cross the scanning lines, and liquid crystal provided between the scanning lines and the data lines, the scanning lines and the data lines defining a plurality of pixels arranged in a matrix; and a driver which are connected to the scanning lines and the data lines and which drives the liquid crystal display following a specified procedure comprising a reset step of resetting the liquid crystal, a selection step of selecting a final state of the liquid crystal, and an evolution step of stabling the liquid crystal into the selected state. In the display device, either one of the reset step or the total of the selection step and the evolution step has a length which is n times (n: natural number) as long as the other, or either one of the total of the reset step and the selection step or the evolution step has a length which is n times (n: natural number) as long as the other.

In the display device according to the present invention, the average luminosity of the scanning lines is constant, and a flicker can be prevented. Thus, the screen during writing is easy to see.

In the display device, preferably, the driver uses the length of the reset step, the total length of the selection step and the evolution step, the total length of the reset step and the selection step or the length of the evolution step as a unit length, and when a time which is k times (k: natural number) the unit length has passed since start of the selection step of a scanning line, the driver starts selection of a next scanning line for writing. Thereby, writing is carried out while the screen is kept bright.

In the display device, the driver may carry out writing by interlace scanning by dividing a frame into a plurality of fields. For example, if a frame is divided into m fields (m: natural number larger than n) for interlace scanning and if the length of the reset step is n times the total length of the selection step and the evolution step, there is a moment when, in serial m scanning lines, n scanning lines of them are in the reset step, one of them is in the selection step or in the evolution step, and the other m-n-1 scanning lines are in a display step. If the total length of the selection step and the evolution step is n times the length of the reset step, there is a moment when, in serial m scanning lines, one of them is in the reset step, n scanning lines of them are in the selection step or in the evolution step, and the other m-n-1 scanning lines are in the display step. If the total length of the reset step and the selection step is n times the length of the evolution step, there is a moment when, in serial m scanning lines, n scanning lines of them are in the reset step or in the evolution step, one of them is in the evolution step, and the other m-n-1 scanning lines are in the display step. If the length of the evolution step is n times the total length of the reset step and the selection step, there is a moment when, in serial m scanning lines, one of them is in the reset step or in the selection step, n scanning lines of them are in the evolution step, and the other m-n-1 scanning lines are in the display step. In such a drive, the average luminosity of the serial m scanning lines is constant, and a flicker can be prevented.

In the display device according to the present invention, the liquid crystal display may have a plurality of liquid crystal layers laminated together, and the liquid crystal layers may be driven by separate drivers of the above-described type. Since the liquid crystal display has a plurality of liquid crystal layers laminated together, it is possible to display a full-color image.

The liquid crystal provided in the liquid crystal display preferably has a memory effect, and it is especially preferred that the liquid crystal exhibits a cholesteric phase at room temperature. The use of such liquid crystal permits fabrication of a small, light and thin liquid crystal display, and further, once writing of an image on the liquid crystal display is completed, the display is capable of displaying the image continuously even after the supply of electric power thereto is stopped, which means the liquid crystal display consumes little electric power. Also, while an interlace scanning drive is carried out for high-speed writing, the liquid crystal on the scanning lines which are not subjected to writing keeps displaying an image, which results in an easy-to-see screen.

In the display device according to the present invention, during an interlace scanning drive in which a frame is divided into a plurality of fields, when a blackout state of a specified scanning line in a field ends, the driver may start selection of a first scanning line in a next field for writing. In this case, writing in a field overlap writing in the next field, which shortens the time for writing a frame. Also, the liquid crystal on scanning lines which are not subjected to writing keeps displaying an image, and the rate of the blackout state can be reduced.

The display device preferably comprises a selector which selects a driving method from a plurality of driving methods including driving methods according to interlace scanning. If the data to be displayed is a kind which is hardly influenced by the blackout state, a driving method optimal to the data is automatically selected, which is convenient. Also, the intention of the operator may be prior to the automatic selection of the selector. Preferably, the plurality of driving methods include driving methods according to sequential scanning which require easy control.

The driving methods according to interlace scanning are suited to display a motion picture or inputted letters on the liquid crystal display and to scroll the screen. In an interlace scanning drive, the screen can follow the change of images, and an easy-to-see screen can be achieved.

If writing is carried out after total reset of all the scanning lines in the area to be written, the previous image is wholly erased before the writing, and the newly written image is easily recognizable. If writing in each field comprises a reset step, a selection step and an evolution step, an interlace scanning drive is carried out smoothly.

Further, by providing new frame data for writing in every field, change of images can be displayed more rapidly. When one frame is divided into n fields, if new frame data are provided for writing in every n fields, one frame is completely written. Thus, the written image is easily recognizable, and this is suited for scroll display.

If based on the end of a blackout state of the last scanning line in a field, writing on the first scanning line in the next field is started, almost all the scanning lines in the former field have come to the display step when writing in the next field is started. Therefore, writing is carried out while the brightness of the screen is maintained. If based on the end of a blackout state of the first scanning line in a field, writing on the first scanning line in the next field is started, each scanning line switches between a blackout state and a display state alternately and repeatedly at uniform time intervals. In this case, the brightness of the area which is subjected to writing is constant, and a flicker can be prevented. Also, by applying an evolution pulse to each scanning line in a field continuously to the start of writing in the next field, the scanning lines can be kept in a blackout state, and a flicker can be prevented.

The display device according to the present invention further comprises a scanning line driver which selects the scanning lines serially, a data line driver which gives image data to the data lines for writing on a selected scanning line, a selector which selects a length for a cycle of writing a frame from a first frame length and a second frame length which is longer than the first frame length, and a controller which controls at least the scanning line driver to carry out writing at cycles of the selected frame length.

The first frame length is selected in an ordinary driving mode. In this mode, writing of a frame is completed in the first frame length, and on completion of writing of a frame, writing of the next frame is started. In writing of a frame, the scanning lines are selected serially at uniform time intervals. The second frame length is selected in a power-saving mode, and the second frame length is longer than the first frame length. In this mode, the number of scanning lines which are subjected to writing per a unit length is reduced, that is, the rate of writing is reduced. The scanning line driver consumes relatively great electric power to output the selection signal; however, in the power-saving mode, the number of outputting the selection signal per a unit length is reduced. Consequently, the cycle of writing a frame is longer, and/or part of an image is omitted; however, writing in this mode greatly contributes to energy saving.

The cycle of writing a frame can be lengthened by various ways. For example, the cycle of selecting a scanning line may be lengthened, or break times may be inserted among writing times of frames.

The display device may further comprise a receiver for receiving an input from outside and a controller for controlling the drivers to start an interlace scanning drive in response to reception of an input at the receiver. The receiver is, for example, a signal receiving device which receives a signal sent from outside or an operating member to be operated by an operator.

BRIEF DESCRIPTION OF THE DRAWINGS

These and other objects and features of the present invention will be apparent from the following description with reference to the accompanying drawings, in which:

FIG. 36 is a chart which shows an ordinary mode and power-saving modes in a sequential scanning mode;

FIG. 37 is a chart which shows an ordinary mode and power-saving modes in an interlace scanning mode;

FIG. 38 is a chart which shows another ordinary mode and other power-saving modes in the interlace scanning mode;

FIG. 41 is a block diagram which shows a first exemplary control circuit for the mobile telephone;

FIG. 59 is a sectional view of a touch panel and a liquid crystal display which are employed in the PDA;

DETAILED DESCRIPTION OF THE PREFERRED EMBODIMENTS

Embodiments of a display device according to the present invention are described with reference to the accompanying drawings.

Liquid Crystal Display; See FIG. 1

First, a liquid crystal display which is suited to be employed in a display device according to the present invention is described. The liquid crystal display comprises liquid crystal which exhibits a cholesteric phase.

Figure 1:
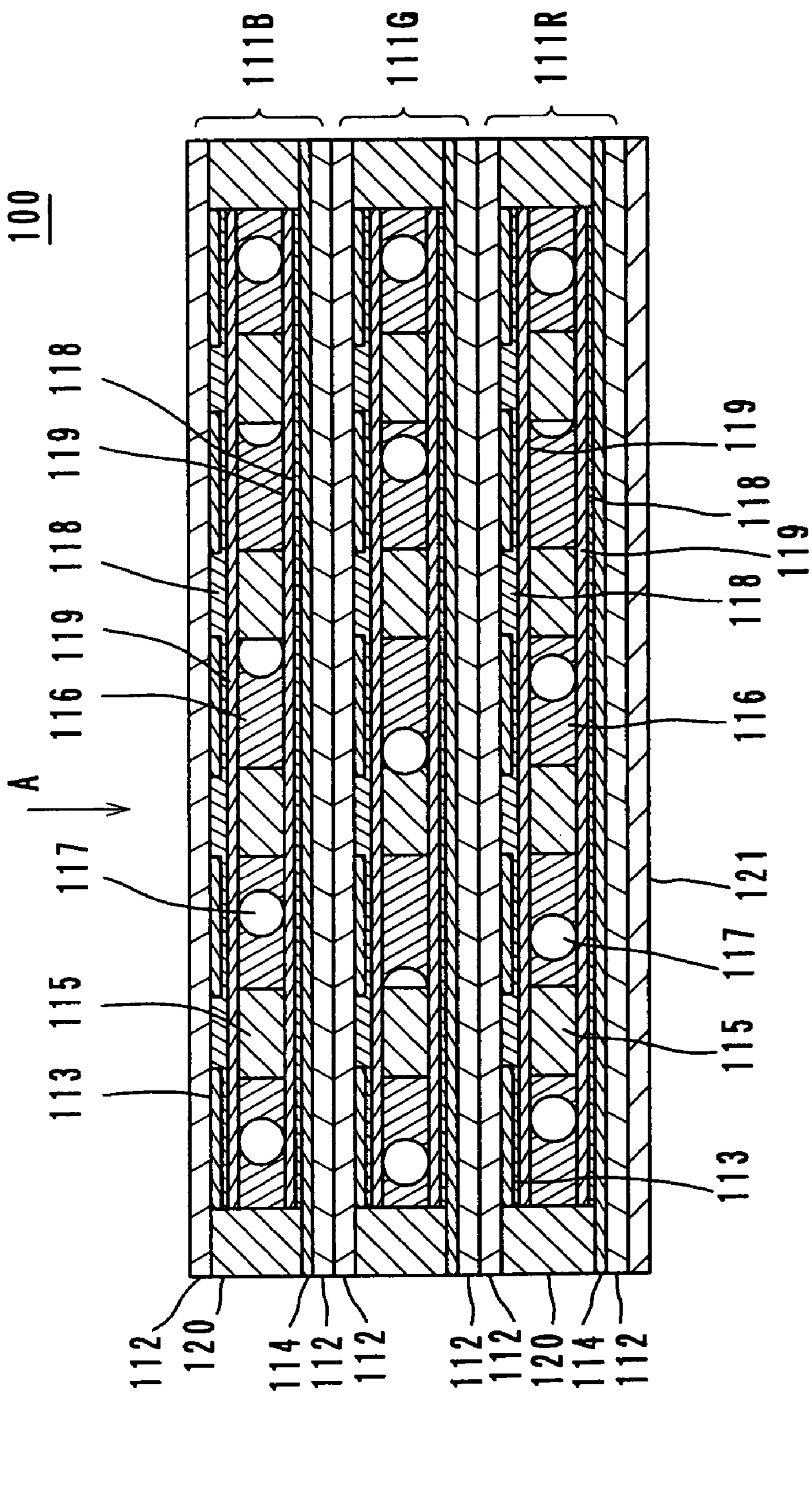
FIG. 1 is an exemplary liquid crystal display which is employed in a display device according to the present invention.

FIG. 1 shows a reflective type full-color liquid crystal display which is driven by a simple matrix driving method. In this liquid crystal display 100, on a light absorbing layer 121, a red display layer 111R, a green display layer 111G and a blue display layer 111B are laminated. The red display layer 111R makes a display by switching between a red selective reflection state and a transparent state. The green display layer 111G makes a display by switching between a green selective reflection state and a transparent state. The blue display layer 111B makes a display by switching between a blue selective reflection state and a transparent state.

Each of the display layers 111R, 111G and 111B has, between transparent substrates 112 on which transparent electrodes 113 and 114 are formed, resin columnar nodules 115, liquid crystal 116 and spacers 117. On the transparent electrodes 113 and 114, an insulating layer 118 and an alignment controlling layer 119 are provided if necessary. Around the substrates 112 (out of a displaying area), a sealant 120 is provided to seal the liquid crystal 116 therein.

The transparent electrodes 113 and 114 are connected to driving ICs 131 and 132 respectively (see FIG. 2), and specified pulse voltages are applied between the transparent electrodes 113 and 114. In response to the voltages applied, the liquid crystal 116 switches between a transparent state to transmit visible light and a selective reflection state to selectively reflect light of a specified wavelength.

In each of the display layers 111R, 111G and 111B, the transparent electrodes 113 and 114, respectively, are composed of a plurality of strip-like electrodes which are arranged in parallel at fine intervals. The extending direction of the strip-like electrodes 113 and the extending direction of the strip-like electrodes 114 are perpendicular to each other, and the electrodes 113 and the electrodes 114 face each other. Electric power is applied between these upper electrodes and lower electrodes serially, that is, voltages are applied to the liquid crystal 116 serially in a matrix, so that the liquid crystal 116 makes a display. This is referred to as matrix driving. The intersections between the electrodes 113 and 114 function as pixels. By carrying out this matrix driving toward the display layers 111R, 111G and 111B serially or simultaneously, a full-color image is displayed on the liquid crystal display 100.

A liquid crystal display which has liquid crystal which exhibits a cholesteric phase between two substrates makes a display by switching the liquid crystal between a planar state and a focal-conic state. When the liquid crystal is in the planar state, the liquid crystal selectively reflects light of a wavelength $\lambda = Pn$ (P: helical pitch of the cholesteric liquid crystal, n: average refractive index). When the liquid crystal display is in the focal-conic state, if the wavelength of light selectively reflected by the liquid crystal is in the infrared spectrum, the liquid crystal scatters light, and if the wavelength of light selectively reflected by the liquid crystal is shorter than the infrared spectrum, the liquid crystal transmits visible light. Accordingly, if the wavelength of light selectively reflected by the liquid crystal is set within the visible spectrum and if a light absorbing layer is provided in the side opposite the observing side of the display, the liquid crystal display makes displays as follows: when the liquid crystal is in the planar state, the liquid crystal display makes a display of the color determined by the selectively reflected light; and when the liquid crystal is in the focal-conic state, the liquid crystal display makes a display of black. Also, if the wavelength of light selectively reflected by the liquid crystal is set within the infrared spectrum and if a light absorbing layer is provided in the side opposite the observing side of the display, the liquid crystal display makes displays as follows: when the liquid crystal is in the planar state, the liquid crystal reflects infrared light but transmits visible light, and accordingly, the liquid crystal display makes a display of black; and when the liquid crystal display is in the focal-conic state, the liquid crystal scatters light, and accordingly, the liquid crystal display makes a display of white.

In the liquid crystal display 100 in which the display layers 111R, 111G and 111B are laminated, when the liquid crystal of the blue display layer 111B and the liquid crystal of the green display layer 111G are in the focal-conic state (transparent state) and when the liquid crystal of the red display layer 111R is in the planar state (selective reflection state), a display of red is made. When the liquid crystal display of the blue display layer 111B is in the focal-conic state (transparent state) and when the liquid crystal of the green display layer 111G and the liquid crystal of the red display layer 111R are in the planar state (selective reflection state), a display of yellow is made. Thus, by setting the display layers 111R, 111G and 111B in the transparent state or in the selective reflection state appropriately, displays of red, green, blue, white, cyan, magenta, yellow and black are possible. Further, by setting the display layers 111R, 111G and 111B in intermediate states, displays of intermediate colors are possible, and thus, the liquid crystal display 21 can be used as a full-color display.

The liquid crystal 116 preferably exhibits a cholesteric phase at room temperature. Especially chiral nematic liquid crystal which is produced by adding a chiral agent to nematic liquid crystal is suited.

A chiral agent is an additive which, when it is added to nematic liquid crystal, twists molecules of the nematic liquid crystal. When a chiral agent is added to nematic liquid crystal, the liquid crystal molecules form a helical structure with uniform twist intervals, and thereby, the liquid crystal exhibits a cholesteric phase.

However, the liquid crystal display with a memory effect is not necessarily of this structure. It is possible to structure the liquid crystal display layer to be a conventional polymer-dispersed type composite layer in which liquid crystal is dispersed in a three-dimensional polymer net or in which a three-dimensional polymer net is formed in liquid crystal.

Driving Circuit; See FIG. 2

Figure 2:
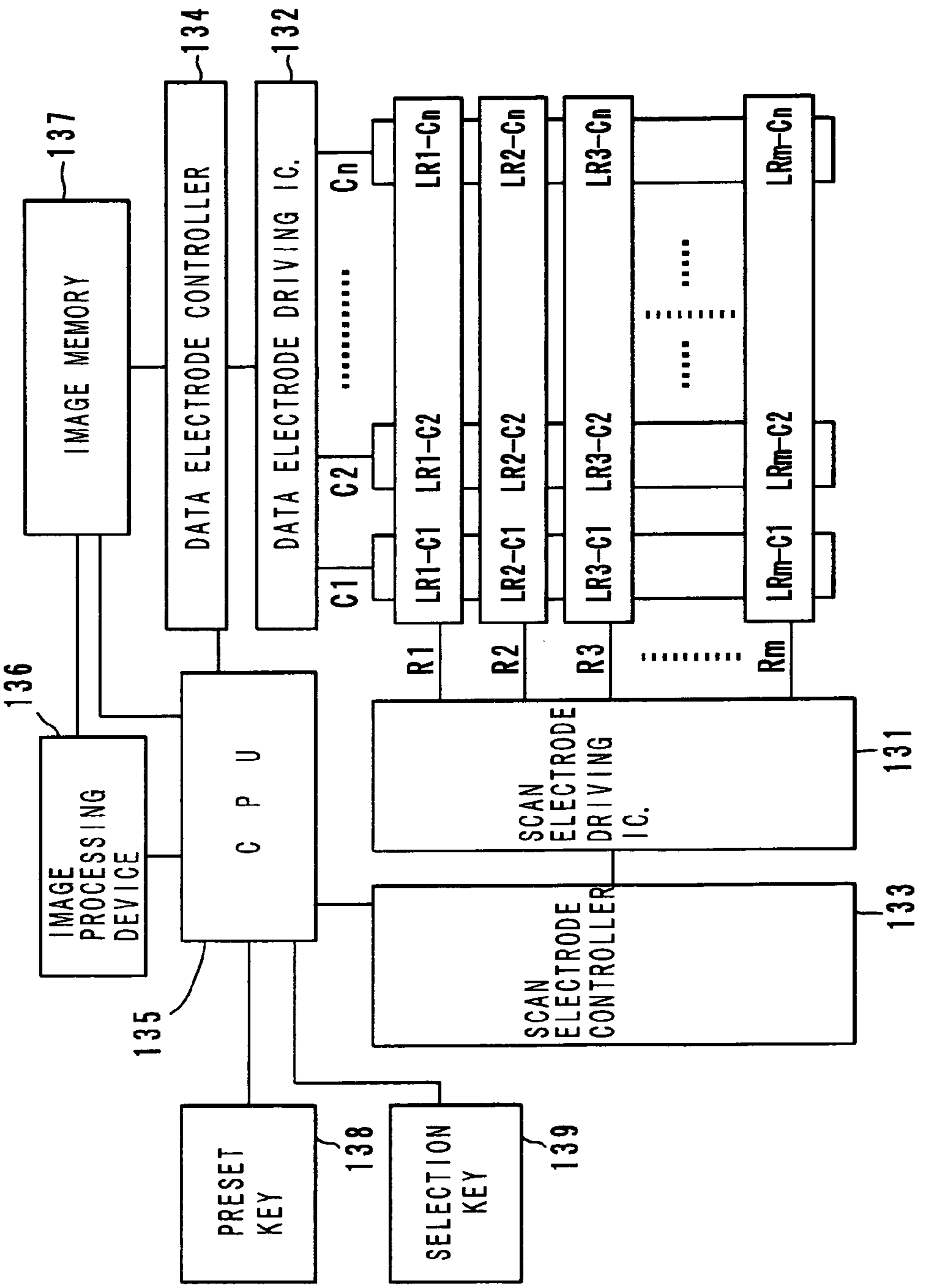
FIG. 2 is a block diagram which shows a driving circuit of the liquid crystal display.

As FIG. 2 shows, the pixels of the liquid crystal display 100 are structured into a matrix which is composed of a plurality of scan electrodes R1, R2, . . . Rm and a plurality of data electrodes C1, C2, . . . Cn (n, m: natural numbers). The scan electrodes R1, R2 . . . Rm are connected to output terminals of a scan electrode driving IC 131, and the data electrodes C1, C2, . . . Cn are connected to output terminals of a data electrode driving IC 132.

The scan electrode driving IC 131 outputs a selective signal to a specified one of the scan electrodes R1, R2, . . . Rm while outputting a non-selective signal to the other scan electrodes R1, R2, . . . Rm. The scan electrode driving IC 131 outputs the selective signal to the scan electrodes R1, R2, . . . Rm one by one at specified time intervals. In the meantime, the data electrode driving IC 132 outputs signals to the data electrodes C1, C2, . . . Cn simultaneously in accordance with image data to write the pixels on the selected scan electrode. For example, while a scan electrode Ra ($a \leqq m$, a: natural number) is selected, the pixels LRa-C1 through LRa-Cn on the intersections of the scan electrode Ra and the data electrodes C1, C2, . . . Cn are written simultaneously. In each pixel, the voltage difference between the scan electrode and the data electrode is a voltage for writing the pixel (writing voltage), and each pixel is written in accordance with this writing voltage.

The driving circuit of the liquid crystal display 100 comprises a CPU 135, an image processing device 136, an image memory 137, controllers 133 and 134, and the driving ICs (drivers) 131 and 132. In accordance with image data stored in the image memory 137, the controllers 133 and 134 control the driving ICs 131 and 132. Thereby, voltages are applied between the scan electrodes and the data electrodes of the liquid crystal display 100 serially, so that an image is written on the liquid crystal display 100.

Further, a preset key 138 is connected to the driving circuit. This key 138 is to preset a driving method selected from a plurality of methods, which will be described later, by the user or by the maker at the delivery of the display device from the factory. Also, a selection key 139 is provided so that the user can select a driving method freely from the plurality of kinds and can set the selected method independently of the preset method.

In this embodiment, as will be described later, driving methods according to interlace scanning and driving methods according to sequential scanning are selectable. The selection of a driving method from these methods depends on the kind of data to be displayed. When a motion picture or inputted letters are to be displayed, it is preferred to select a driving method according to interlace scanning. Also, for scroll, a method according to interlace scanning is preferable.

Suppose the threshold voltage (first threshold voltage) to untwist liquid crystal which exhibits a cholesteric phase to be Vth1, when the first threshold voltage Vth1 is applied to the liquid crystal for a sufficiently long time and thereafter, the voltage is lowered under a second threshold voltage Vth2 which is lower than Vth1, the liquid crystal comes to a planar state. When a voltage which is higher than Vth2 and lower than Vth1 is applied to the liquid crystal for a sufficiently long time, the liquid crystal comes to a focal-conic state. These two states are maintained even after stoppage of application of voltage. Also, by applying voltages between Vth1 and Vth2 to the liquid crystal, it is possible to display intermediate tones, that is, gray levels.

Further, when writing part of the liquid crystal display, only specified scan electrodes including the part shall be selected. In this way, writing is carried out on only necessary part of the liquid crystal display, which requires a shorter time.

Principle of First Driving Method; See FIGS. 3 and 4

A first driving method to be adaptable for the present invention is described. First, the driving principle of the method is described. Although specific examples which use alternated pulse waveforms will be described in the following paragraphs, the driving method adaptable for the present invention does not necessarily use such waveforms. As FIG. 3 shows, the driving method generally comprises a reset step Tr, a selection step Ts, an evolution step Te and a display step Td.

Figure 3:
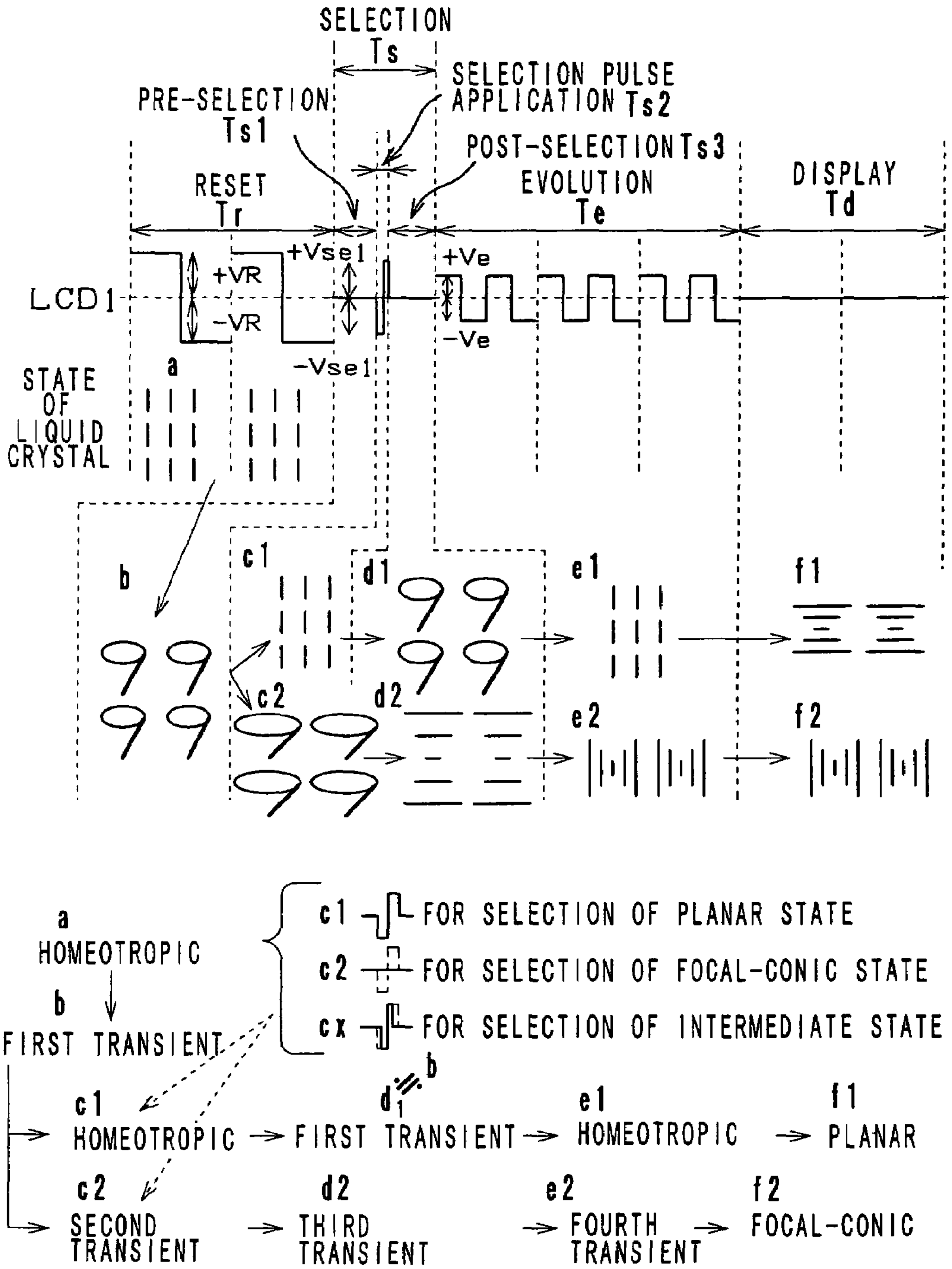
FIG. 3 is an illustration which shows the principle of a first method of driving the liquid crystal display.

In the upper section of FIG. 3, a driving waveform which is applied to liquid crystal (LCD1) corresponding to a pixel is shown, and in the lower section, the state of the liquid crystal in each of the steps is schematically illustrated. As FIG. 3 shows, in the first driving method, the reset step Tr is twice as long as that of the selection step Ts, and the evolution step Te is thrice as long as that of the selection step Ts. Accordingly, for writing of one line, it takes a time which is equal to six times as long as the selection step Ts, and when sequential scanning is carried out, a dark strip is seen in a part corresponding to six lines.

In the reset step Tr, first, a voltage with an absolute value of VR is applied to the pixels on a scanning line to be written, and thereby, the pixels on the scanning line are reset to a homeotropic state (see "a" in FIG. 3).

The selection step Ts is composed of three steps (a pre-selection step Ts1, a selection pulse application step Ts2 and a post-selection step Ts3). In the pre-selection step Ts1, the voltage applied to the pixels on the scanning line to be written is made zero. Thereby, the liquid crystal of the pixels on the scanning line are untwisted a little (to come to a first transient state, see "b" in FIG. 3). Next, in the selection pulse application step Ts2, a selection pulse in accordance with the image to be displayed is applied to each of the pixels on the scanning line. In the selection pulse application step Ts2, the pulse waveform applied to pixels which are desired to finally come to a planar state is different from the pulse waveform applied to pixels which are desired to finally come to a focal-conic state. Therefore, the steps after the selection pulse application step Ts2 will be described with respect to a pixel which is desired to finally come to a planar state and with respect to a pixel which is desired to finally come to a focal-conic state separately.

In selecting a planar state as the final state of a pixel, in the selection pulse application step Ts2, a selection pulse with an absolute value of Vsel1 is applied to the pixel, and thereby, the liquid crystal of the pixel comes to a homeotropic state again (see "c1" in FIG. 3). Thereafter, in the post-selection step Ts3, the voltage applied to the pixel is made zero, and thereby, the liquid crystal is untwisted a little (see "d1" in FIG. 3). This state is almost equal to the first transition state.

In the evolution step Te, first, a pulse voltage with an absolute value of Ve is applied to the pixels on the scanning line to be written. The liquid crystal of the pixel, which has been untwisted a little in the selection step Ts, is completely untwisted by the application of the pulse voltage Ve, and the liquid crystal comes to a homeotropic state (see "e1" in FIG. 3).

In the display step Td, the voltage applied to the liquid crystal section of the pixel is made zero. Thereby, the liquid crystal in a homeotropic state comes to a planar state (see "f1" in FIG. 3). In this way, selection/evolution of a pixel to a planar state is carried out.

In selecting a focal-conic state as the final state of a pixel, in the selection pulse application step Ts2, the voltage applied to the liquid crystal section of the pixel is made zero, and thereby, the liquid crystal is untwisted further (comes to a second transient state, see "c2" in FIG. 3). In the post-selection step Ts3, as in the case of selecting a planar state, the voltage applied to the liquid crystal section is made zero. Thereby, the liquid crystal is untwisted and comes to a state in which the helical pitch is widened approximately double (comes to a third transient state, see "d2" in FIG. 3). This state is considered to be almost equal to the transient planar state taught by U.S. Pat. No. 5,748,277.

Next, in the evolution step Te, as in the case of selecting a planar state, a pulse voltage with an absolute value of Ve is applied to the pixels on the scanning line to be written. The liquid crystal of the pixel, which has been untwisted a little in the selection step Ts, comes to a focal-conic state by the application of the pulse voltage Ve (comes to a fourth transient state, see "e2" in FIG. 3).

In the display step Td, as in the case of selecting a planar state, the voltage applied to the liquid crystal is made zero. The liquid crystal in a focal-conic state stays in the focal-conic state even after the voltage is made zero. In this way, selection/evolution of a pixel to a focal-conic state is carried out (see "f2" in FIG. 3).

Thus, depending on the selection pulse applied to liquid crystal in the middle short period of the selection step Ts, that is, in the selection pulse application step Ts2, the final state of the pixel is selected. Further, by adjusting the pulse width of the selection pulse and more specifically by changing the form of the pulse applied to the data electrode in accordance with image data, intermediate tones can be displayed.

Making the voltage applied to the liquid crystal zero in the pre-selection step Ts1 and in the post-selection step Ts3, that is, setting break times permits use of a simple driver structure as will be described later, which contributes to reduction of cost. Needless to say, the voltage is not necessarily made zero but may be set to a voltage which is almost zero and is not actually effective.

Figure 4:
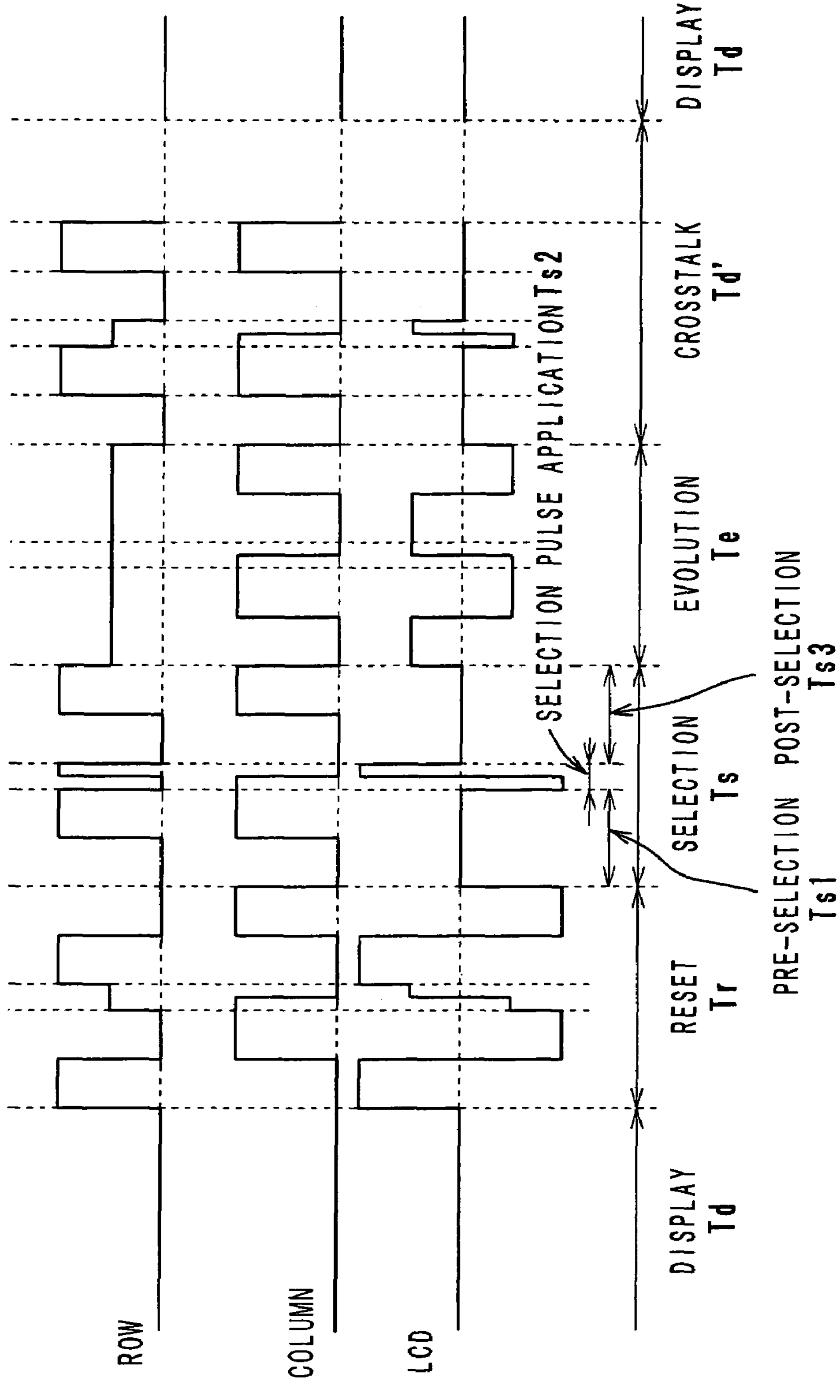
FIG. 4 is a chart which shows fundamental driving waveforms according to the first driving method.

FIG. 4 shows the waveform of a voltage which is applied to one of a plurality of pixels arranged in a matrix and exemplary waveforms applied to the scan electrode (row) and the data electrode (column) to obtain the voltage waveform acting on the pixel. On the contrary, in FIG. 4, "ROW" means a scanning line on a scan electrode, "COLUMN" means a data line on a data electrode, and "LCD" means the liquid crystal corresponding to the pixel which is the intersection between the ROW and the COLUMN.

As FIG. 4 shows, in the matrix driving method, after the evolution step Te of a scanning line, data are written on the pixels on other scanning lines, and the pixels on which writing has been done are influenced by a specified voltage as a crosstalk voltage through the data electrodes. The step in which the crosstalk voltage is applied is referred to as a crosstalk step Td'. The pulse width and the energy of the crosstalk voltage are too narrow and too small to influence the liquid crystal.

All the scan electrodes have been selected, and when the evolution step Te of the last selected scan electrode is over, the other scan electrodes has gone through the crosstalk step Td'. Then, the voltages applied to all the scan electrodes and the data electrodes are made zero, and the whole liquid crystal comes to the display step Td. This state is maintained until the next writing is started.

In FIG. 4, for simplification, the lengths of the reset step Tr, the selection step Ts, the evolution step Te and the crosstalk step Td' are illustrated to be equal to one another. For the same reason, the signal sent to the COLUMN is shown as a waveform to select all the pixels to come to a planar state.

Specific Examples of First Driving Method

In the following, specific examples of the first driving method are described. In the following first through third examples, "ROW1", "ROW2" and "ROW3" mean three scan electrodes which are serially selected, "COLUMN" means a data electrode which crosses the three scan electrodes (ROWS 1-3), and "LCD1", "LCD2" and "LCD3" mean liquid crystal corresponding to the pixels on the intersections between the ROWS 1-3 and the COLUMN.

Figure 5:
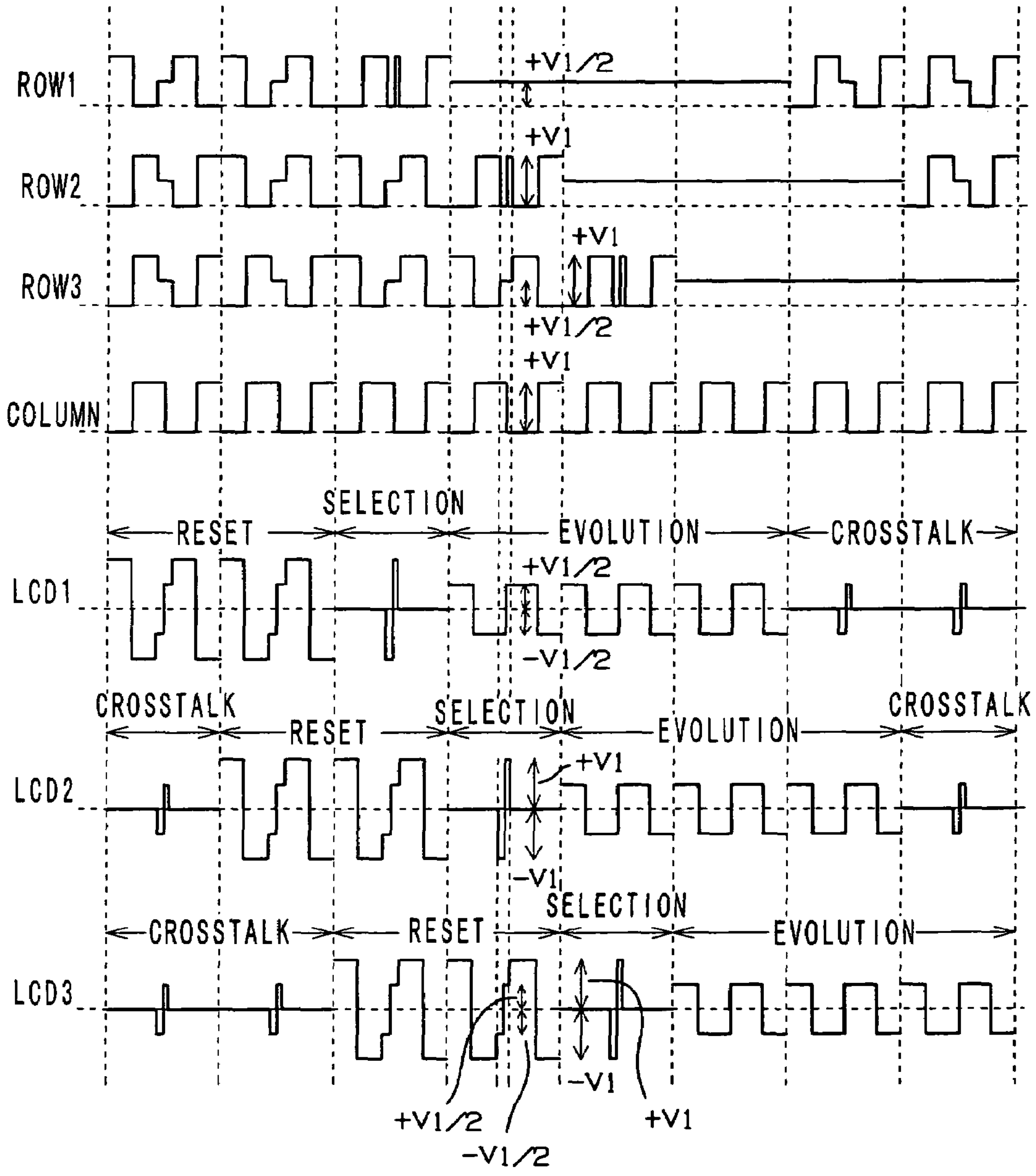
FIG. 5 is a chart which shows driving waveforms in a first example of driving.

First Example of Matrix Driving; See FIG. 5

According to the first driving method, as described above, there are a reset step, a selection step, an evolution step and a crosstalk step. Further, the selection step has a pre-selection step, a selection pulse application step and a post-selection step, and a selection pulse is applied to the pixel only in part of the selection step.

The form of the selection pulse must be changed according to image data to be written on the pixel, and selection pulses of different forms in accordance with image data must be applied to the column. On the other hand, at the pre-selection step and at the post-selection step of every pixel, the voltage applied thereto is zero, and a combination of specified pulse waveforms to be applied to the rows and the columns to cause application of 0 volt to the pixels can be used. In the first example shown by FIG. 5, by using this, reset, evolution and display are carried out simultaneously on the pixels on a plurality of scan electrodes.

For example, while the LCD2 is in the pre-selection step, pulses of a voltage +V1 which are out of phase with each other are applied to the ROW2 and ROW3, and a voltage +V 1/2 is applied to the ROW 1. At this time, if a pulse of +V1 which is out of phase with the pulse applied to the ROW3 is applied to the COLUMN, a reset pulse of ±VR=±V1 is applied to the LCD3, 0 volt is applied to the LCD2, and an evolution pulse ±Ve=±V1/2 is applied to the LCD1.

While the LCD2 is in the selection pulse application step, a data pulse of a form in accordance with image data (of a voltage +V1) is applied to the COLUMN. Accordingly, a voltage of +V1/2 is applied to the ROW1 and the ROW2 so that a voltage of ±V1/2 can be applied to the LCD1 and the LCD3. A pulse of a voltage +V1 is applied to the ROW2, so that the voltage difference (±V1 or 0) between the voltage applied to the ROW2 and the data pulse applied to the COLUMN is applied to the LCD2 as a selection pulse of a voltage ±Vse1. By changing the form of the data pulse applied to the COLUMN, the pulse width of the selection pulse can be changed.

In the post-selection step, the same process as in the pre-selection step is carried out. Specifically, pulses which are of a voltage +V1 but are out of phase are applied to the ROW2 and the ROW3, and a pulse of a voltage +V1/2 is applied to the ROW1. At this time, a pulse of a voltage +V1 which is out of phase with the pulse applied to the ROW3 is applied to the COLUMN. Thereby, a reset pulse of ±Vr=±V1 is applied to the LCD3, 0 volt is applied to the LCD2, and an evolution pulse ±Ve=±V1/2 is applied to the LCD1.

In the steps other than the reset step, the selection step and the evolution step, pulses in phase with the data pulses applied to the data electrode in the pre-selection step and in the post-selection step are applied, and while any of the other scan electrodes is in the selection pulse application step, a pulse of a voltage +V1/2 is applied. Thereby, to the part of the liquid crystal corresponding to this pixel, a crosstalk voltage ±V1/2 with the same pulse width as that of the selection pulse is applied. The pulse width of this crosstalk voltage is too narrow to change the state of the liquid crystal.

By applying the above-described pulses to the scan electrodes repeatedly, an image is displayed on the liquid crystal display. The selection of the scan electrodes may be performed by interlace scanning or by sequential scanning. Also, because it is possible to apply the reset pulse, the selection pulse and the evolution pulse to any desired scan electrodes, partial writing of the liquid crystal display is possible.

In the first example, the driving IC for the rows (scan electrodes) has three output levels (V1, V1/2 and GND), and the driving IC for the columns (data electrodes) has two output levels (V1 and GND). Thus, merely a three-value driver and a two-value driver can be used for the scan electrode driving IC and for the data electrode driving IC, respectively, which results in a reduction in the cost for the driving ICs.

Second Example of Matrix Driving; See FIG. 6

Figure 6:
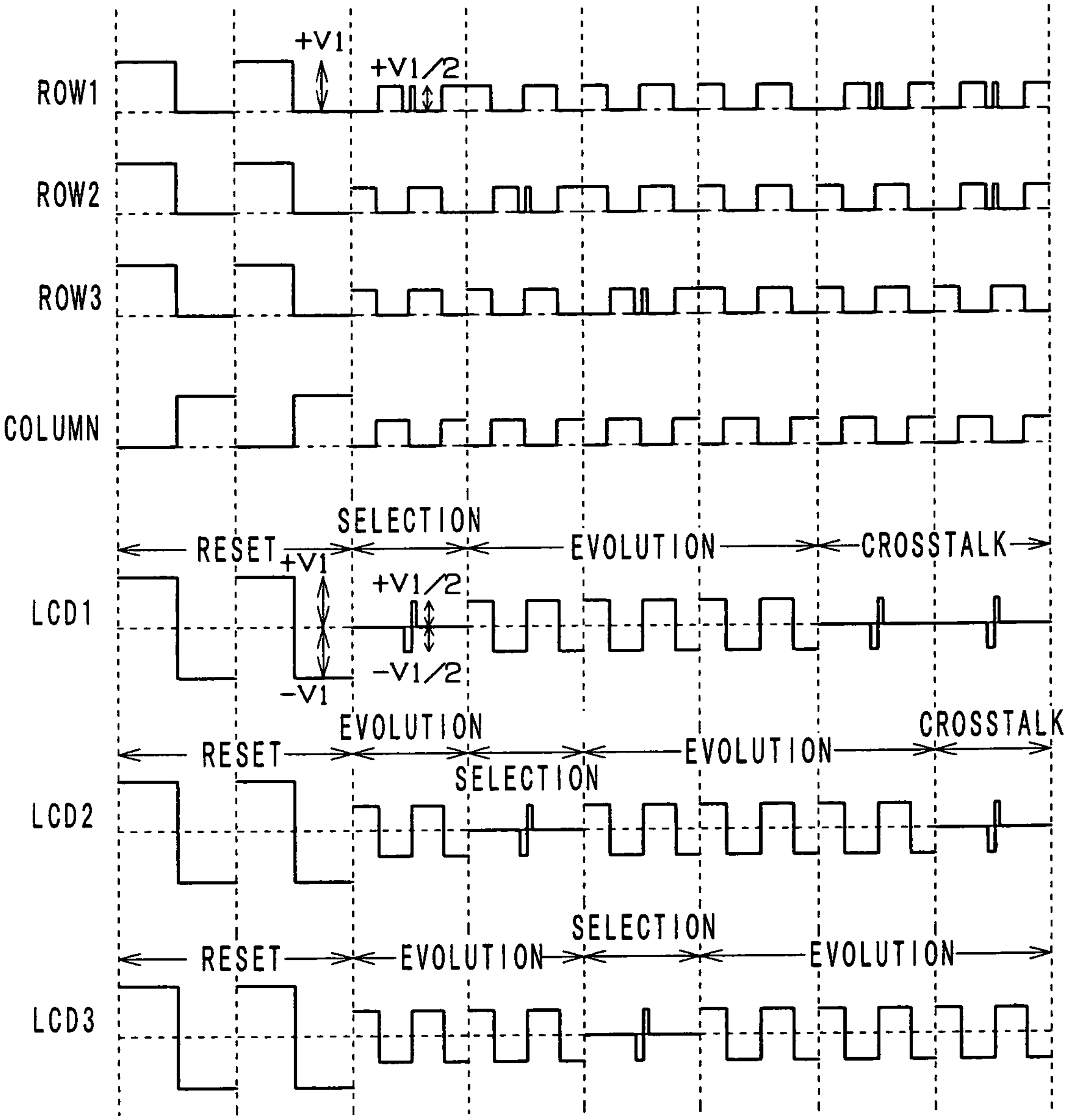
FIG. 6 is a chart which shows driving waveforms in a second example of driving.

In the first example, the scan electrodes are reset serially. The second example, however, adopts a total reset method in which all the scan electrodes in the area to be written are reset at one time. FIG. 6 shows driving waveforms in the second example. In this example, merely two-value drivers can be used for the scan electrode driving IC and for the data electrode driving IC by providing voltage switching means in each of the driving ICs.

First, all the screen is once reset (initial reset). At this time, the reset pulses ±VR outputted from the driving ICs are of a voltage V1. Because this voltage is applied to the entire screen simultaneously, the voltages supplied to the driving ICs are set to V1. Then, for serial selection of the scan electrodes, the voltages supplied to the driving ICs are switched to V1/2.

While the LCD2 is in the pre-selection step, pulses which are of a voltage +V1/2 and are in phase with each other are applied to the ROW1 and the ROW3, and to the ROW2, a pulse of +V1/2 which is out of phase with the pulses applied to the ROW1 and the ROW3 is applied. At this time, a pulse which is of a voltage ±V1/2 and is in phase with the pulse applied to the ROW2 is applied to the COLUMN. Thereby, 0 volt is applied to the LCD2, and an evolution pulse of a voltage ±Ve=±V1/2 is applied to the LCD1 and the LCD3.

While the LCD2 is in the selection pulse application step, a pulse of a voltage +V1/2 is applied to the ROW1, the ROW2 and the ROW3. The voltage difference between a data pulse applied to the COLUMN and the voltage (±V1/2 or 0) is applied to the LCD2 as a selection pulse of a voltage ±Vse1. By changing the form of the data pulse applied to the COLUMN, the pulse width of the selection pulse can be changed.

In the post-selection step, application of pulses to the ROWS 1-3 and the COLUMN is carried out in the same way as in the pre-selection step.

In the steps other than the reset step, the selection step and the evolution step, pulses in phase with the data pulse applied to the data electrode in the pre-selection step and in the post-selection step are applied, and while any of the other scan electrodes is in the selection pulse application step, a pulse of a voltage +V1/2 is applied. Thereby, to the part of the liquid crystal corresponding to this pixel, a crosstalk voltage ±V1/2 with the same pulse width as that of the selection pulse is applied. The pulse width of this crosstalk voltage is too narrow to change the state of the liquid crystal.

By applying the pulses after the initial reset to the scan electrodes repeatedly, an image can be displayed on the liquid crystal display. Off course, partial writing on the liquid crystal display is possible, and in this case, only the scanning lines to be written are subjected to the initial reset and application of the subsequent pulses.

In the second example, the driving IC for the rows (scan electrodes) has three output levels (V1, V1/2 and GND), and the driving IC for the columns (data electrodes) has three output levels (V1, V1/2 and GND). The voltage V1 is necessary only for the reset of all the screen. Therefore, by using voltage switching means, e.g., an analog switch, it becomes possible to switch the voltage supplied from a power source in the reset step and in the other steps. Thereby, in the reset step, the driving IC for the rows must have merely two output levels (V1 and GND), and the driving IC for the columns must have merely two output levels (V1/2 and GND). In the selection step, the driving IC for the rows must have merely two output levels (V1/2 and GND), and the driving IC for the columns must have merely two output levels (V1/2 and GND). Then, the cost for the drivers can be reduced more.

Third Example of Matrix Driving; See FIG. 7

In the first example, scanning is carried out by using the length of the whole selection step as a reference. In the third example, however, scanning is carried out by using the length of the selection pulse application step as a reference. The pulse width of the selection pulse is adjusted by using the maximum pulse width to achieve the maximum reflectance as a reference. Here, to the data electrode, a signal to select "transmission", "intermediate tone" and "total reflection" in order is inputted.

Figure 7:
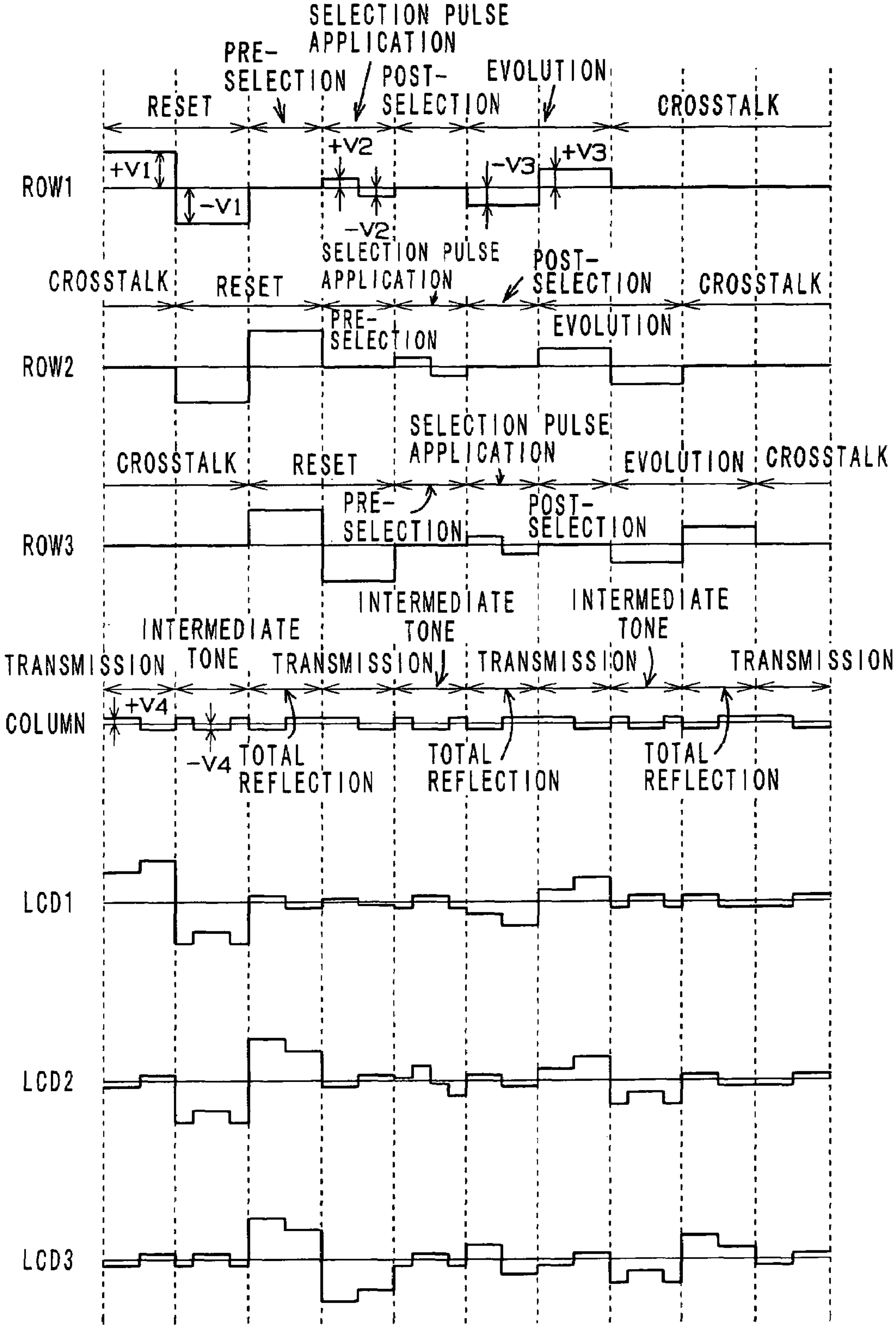
FIG. 7 is a chart which shows driving waveforms in a third example of driving.

In the third example, the selection step is composed of a selection pulse application step, and a pre-selection step and a post-selection step which are before and after the selection pulse application step. The pre-selection step and the post-selection step have a length which is a multiple of the pulse width of a selection pulse (the application time of a selection pulse). In FIG. 7, the length of the pre-selection step and the post-selection step is equal to the pulse width of a selection pulse.

To the ROW1, the ROW2 and the ROW3, a reset voltage ±V1, a selection voltage ±V2 and an evolution voltage ±V3 are applied, respectively. The reset step and the evolution step have a length which is a multiple (in FIG. 7, twice) of the application time of a selection pulse. In the display (crosstalk) step, 0 volt is applied. In the meantime, to the data electrode (COLUMN), a pulse waveform which is of a voltage ±V4 and has a phase in accordance with image data is applied.

In the third example, the form of the selection pulse applied to each pixel depends on the phase and the value of the voltage ±V4 applied to the COLUMN and the selection voltage ±V2. When the voltage ±V4 is in phase with the voltage ±V2, a selection pulse of a voltage ±(V2−V4) is applied to the pixel to select a transparent (focal-conic) state. When the voltage ±V4 is completely out of phase with the voltage ±V2, a selection pulse of a voltage ±(V2+V4) is applied to the pixel to select a selective reflection (planar) state. The voltages V2 and V4 are optimal values to select a transparent state and a reflection state. The voltage V4 which acts as crosstalk is a value under the threshold to change the state of the liquid crystal.

In the third example, the lines are scanned at intervals of the application time of a selection pulse, that is, the scanning time is equal to the application time of a selection pulse. If a pre-selection step and a post-selection step are provided, however, it is possible to scan the lines at intervals of the length of the selection step including the pre-selection step and the post-selection step. In this case, the scanning time is equal to the length of the selection step.

Second Driving Method; See 8

In the second driving method, the liquid crystal on all the scan electrodes in the area to be written is wholly reset to a focal-conic state and thereafter, the pixels on the scan electrodes are selected to finally come to a focal-conic state or a planar state serially.

Figure 8:
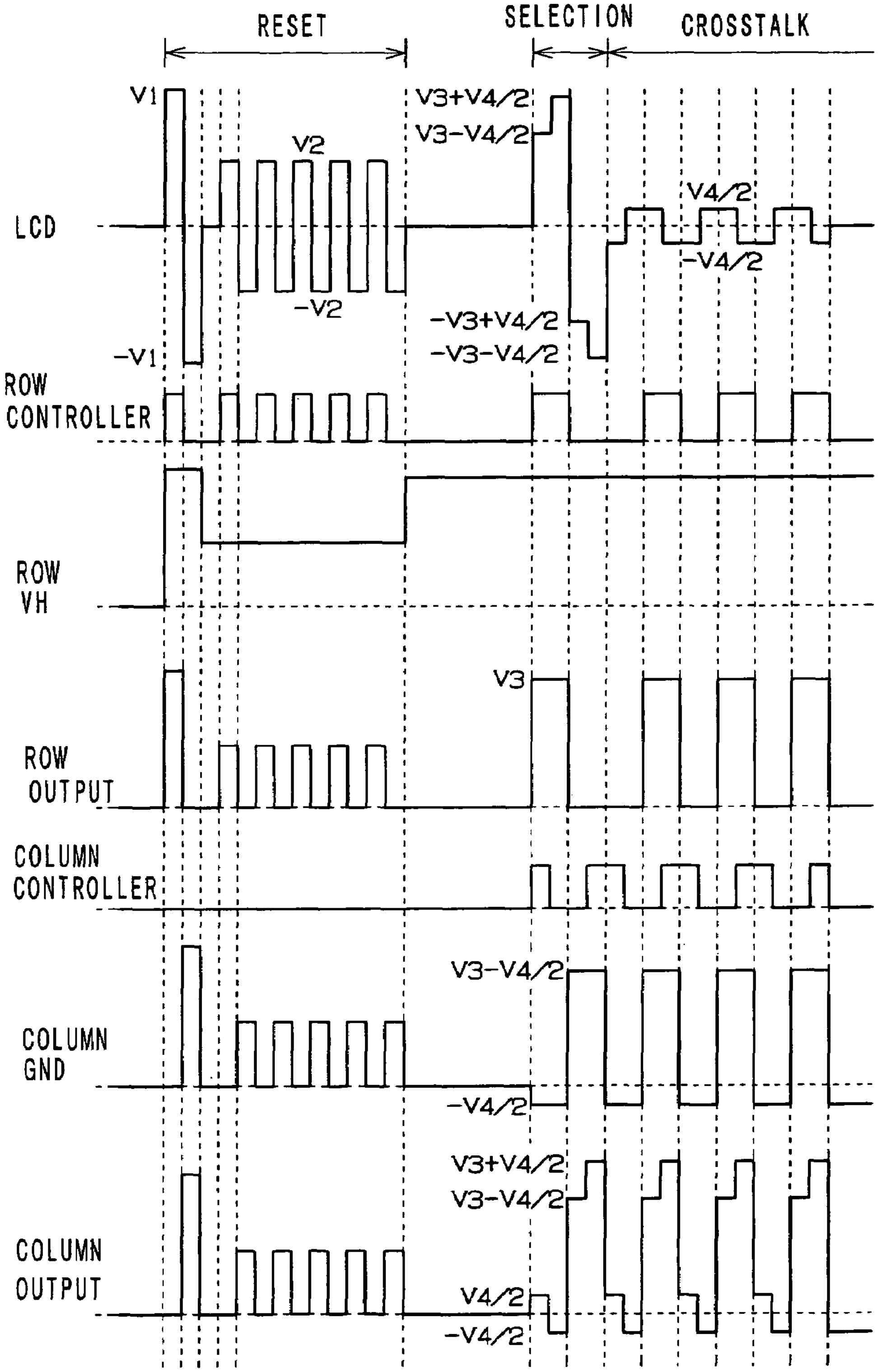
FIG. 8 is a chart which shows fundamental driving waveforms according to a second method of driving the liquid crystal display.

As FIG. 8 shows, in the reset step, a pulse voltage with an absolute value +V1 is applied to reset the liquid crystal to a focal-conic state, and in the selection step, a pulse voltage with two stages (with absolute values V3+V4/2 and V3−V4/2) is applied to permit reproduction of gray levels. In the evolution step, a pulse voltage with an absolute value V4/2 is applied.

In FIG. 8, the section indicated with "LCD" shows a pulse waveform which is applied to the liquid crystal of a pixel. The other waveforms are exemplary waveforms which are applied to the scan electrode and the data electrode to achieve the waveform applied to the pixel. "ROW CONTROLLER" indicates a waveform outputted from the controller 133, "ROW VH" indicates the voltage of the power source of the scan electrode driving IC 131, and "ROW OUTPUT" indicates a waveform outputted from the driving IC 131 to the scan electrode. "COLUMN CONTROLLER" indicates a waveform outputted from the controller 134, "COLUMN GND" indicates the voltage of the power supply of the data electrode driving IC 132, and "COLUMN OUTPUT" indicates a waveform outputted from the driving IC 132 to the data electrode.

Fourth Example of Matrix Driving; See FIG. 9

Figure 9:
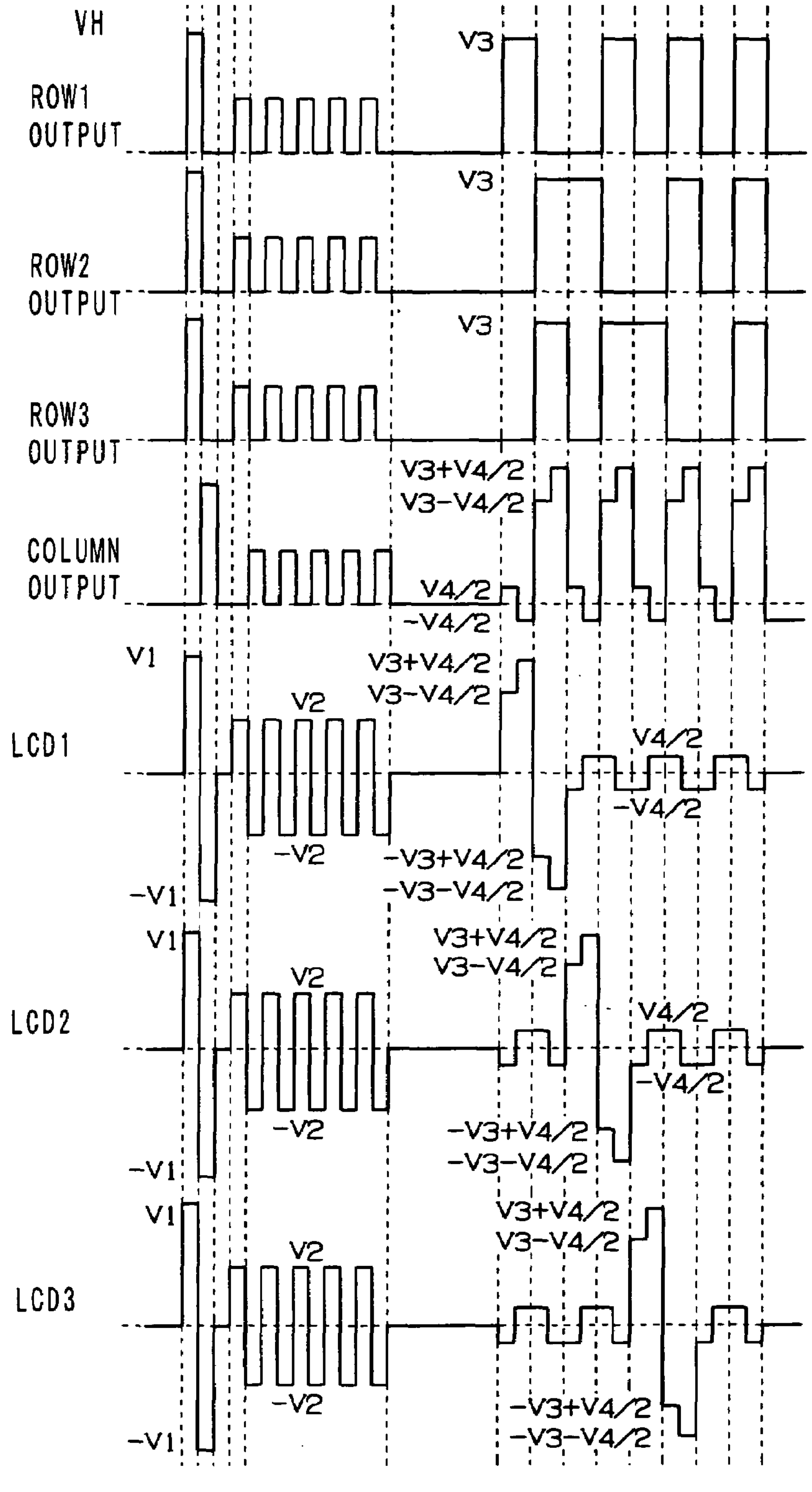
FIG. 9 is a chart which shows driving waveforms according to the second driving method.

FIG. 9 shows a fourth example of matrix driving according to the second driving method. As FIG. 9 shows, first, all the pixels in a displaying area are reset to a focal-conic state at one time, and thereafter, the scanning lines are subjected to writing serially. In the fourth example, although it takes a relatively long time for reset, a quality image can be displayed.

Interlace Scanning

Driving methods according to interlace scanning are described referring to the following first through thirteenth and sixteenth examples. Interlace scanning, in contrast with sequential scanning, is to scan every two or more lines in writing one frame. The following fourteenth and fifteenth examples are driving methods according to sequential scanning.

First Example of Scanning; See FIG. 10

In the first example of scanning, one frame is divided into an odd-number field and an even-number field. First, writing on scanning lines of odd numbers is carried out, and writing on scanning lines of even numbers is carried out. Writing on each scanning line is carried out, in the same way shown by FIGS. 3 and 4, by following the reset step Tr, the selection step Ts and the evolution step Te. During these three steps, the liquid crystal display is in a blackout state in which the observer sees the light absorbing layer on the backside (see FIG. 11). Thereafter, the liquid crystal stays in the display state Td.

Figure 11:
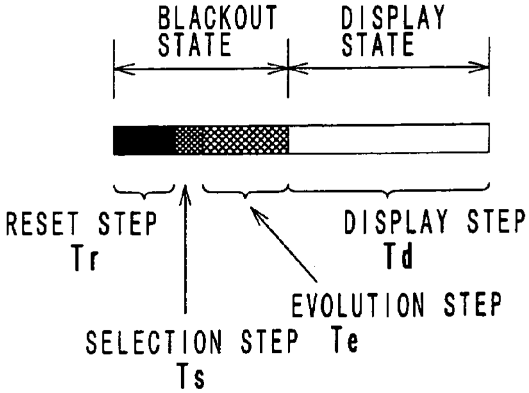
FIG. 11 is a chart which shows steps of writing on a pixel.

Further, in a case of matrix driving, even after writing of a scanning line is completed, the scanning line is influenced by the pulses applied to the data electrodes for writing on other scanning lines. These pulses are crosstalk pulses, and the display step Td shown in FIG. 11 is actually a crosstalk step Td' in which crosstalk pulses are applied.

Depending on the kind of liquid crystal, it is probable that an image is not displayed thereon immediately after the evolution step. In this case, the delay from the end of the evolution step to the appearance of the image is expected beforehand, and this delay time is considered in actually driving the liquid crystal display. This is the same as in the following examples.

In the first example, in each of the fields, writing on each scanning line (reset, selection and evolution) is started at uniform intervals, and when the evolution step of the last scanning line in a field is completed, writing on the first scanning line in the next field is started. Then, after writing of a frame is completed, writing of the next frame is started, and therefore, it takes a long time to write one frame. However, since at least either all the scanning lines in the odd-number field or all the scanning lines in the even-number field are in the display step at all times, the screen is bright. This first example is suited to be carried out in switching a still picture to a motion picture.

Figure 12:
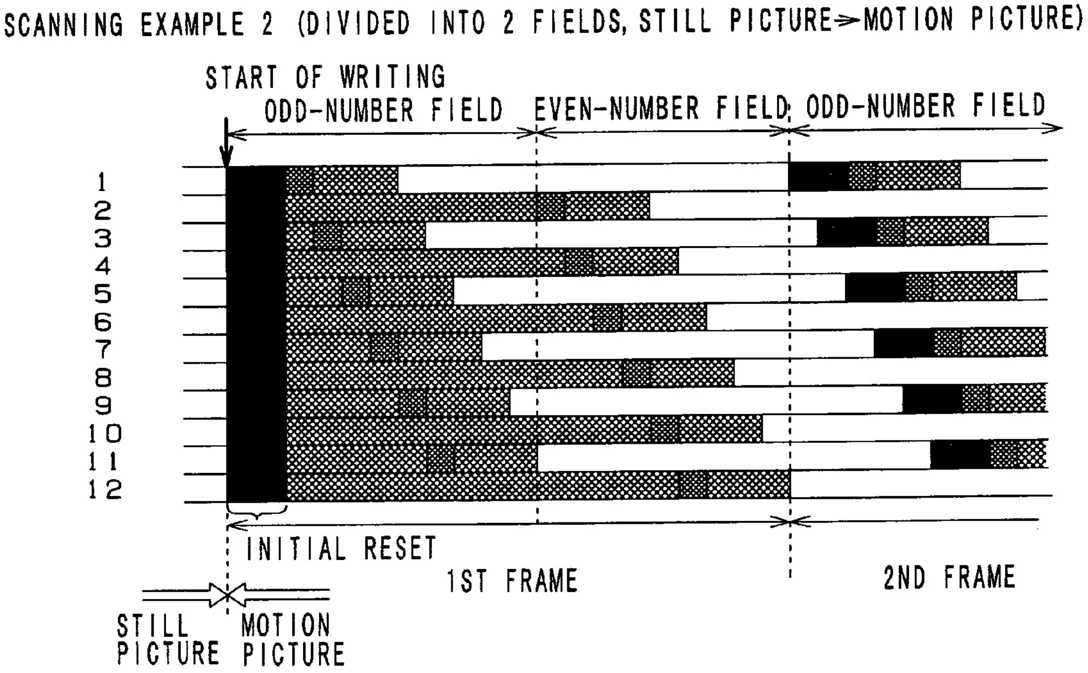
FIG. 12 is a chart which shows a second example of scanning (interlace scanning)

Second Example of Scanning; See FIG. 12

In the second example, one frame is divided into two fields, namely, an odd-number field and an even-number field. First, all the scanning lines are reset at one time, and scanning lines in the odd-number field are sequentially subjected to writing. Thereafter, scanning lines in the even-number field are sequentially subjected to writing without reset. (Reset of the scanning lines in the even-number field has been already carried out.) In this way, a first frame is written.

In this second example, at the start of writing of the first frame, all the scanning lines are reset at one time (initial reset), and in the even-number field of the first frame, the reset step can be omitted. As was described referring to the waveform in FIG. 6, by applying the reset pulse to all the scanning lines for initial reset and subsequently applying the evolution pulse to the second and subsequent scanning lines in the odd-number field and the scanning lines in the even-number field, the liquid crystal in these parts can stay in the reset state.

In the second example, because of the initial reset, composition of the image before writing and the image to be written can be prevented. If this second example is adopted in switching a still picture to a display of inputted letters, the display becomes easy to see. In and after the even-number field of the first frame, as in the first example, the screen is bright.

Figure 13:
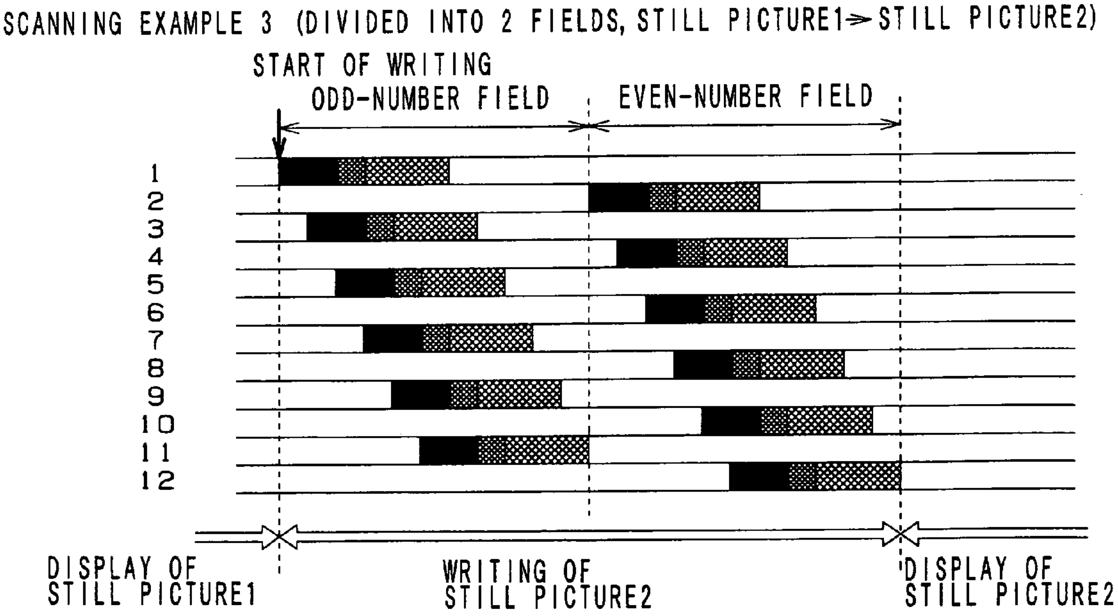
FIG. 13 is a chart which shows a third example of scanning (interlace scanning)

Third Example of Scanning; See FIG. 13

The third example is suited to be carried out in switching a still picture to another still picture. Writing according to the third example is carried out basically in the same way as in the first example. Writing of one frame is divided into two fields, and interlace scanning is carried out.

Fourth Example of Scanning; See FIG. 14

In the fourth example, as in the first and third examples, writing of one frame is divided into two fields, namely, an odd-number field and an even-number field, and interlace scanning is carried out without performing initial reset. In this fourth example, however, based on the time of completion of the reset step of the last scanning line in a field, writing of the first scanning line in the next filed is started.

Specifically, on the condition that the selection step *A of the last scanning line in the odd-number field does not overlap the selection step *B of the first scanning line in the even-number field, writing on the scanning lines in the odd-number field and writing on the scanning lines in the even-number field overlap each other.

Figure 14:
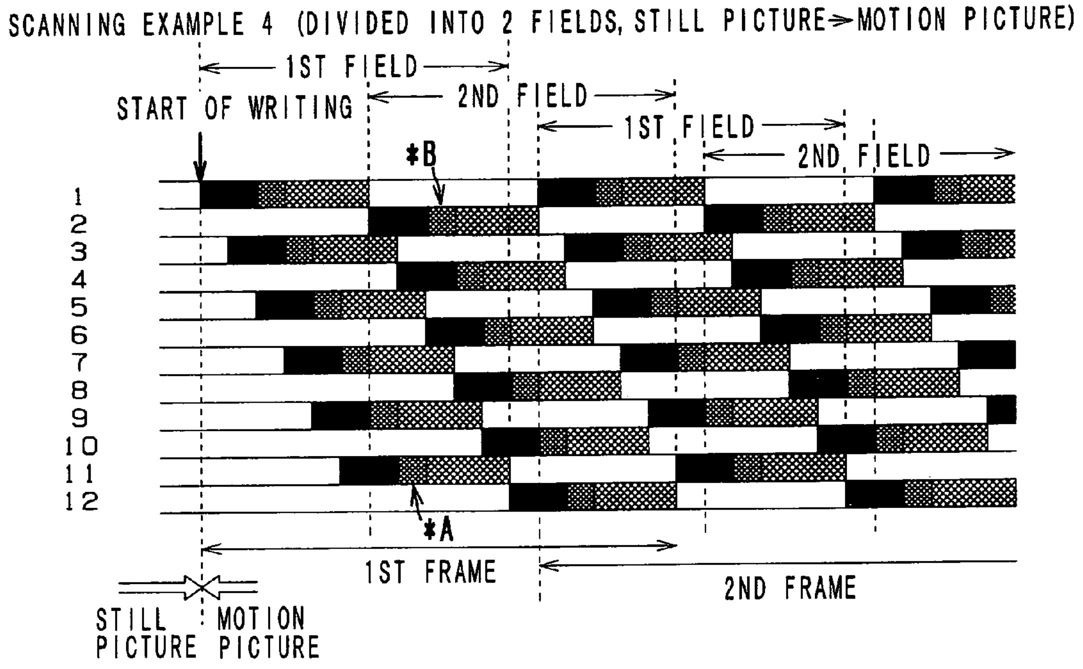
FIG. 14 is a chart which shows a fourth example of scanning (interlace scanning)

As FIG. 14 shows, if each scanning line switches between a blackout state and a display state alternately and repeatedly at uniform time intervals, the whole frame is seen as an image with even brightness, that is, a flicker can be prevented. In order to achieve this, if the number of scanning lines in the area to be written is not so large compared with the time length of the blackout state of each scanning line, when the blackout of the first scanning line in a field ends, writing in the next field is started. If the number of scanning lines in the area to be written is large compared with the time length of the blackout of each scanning line, the length of the evolution step in the first field may be adjusted. The adjustment of the length of the evolution step will be described in connection with a modification of the fourth example and the sixth example.

Modification of Fourth Example; See FIG. 15

Figure 15:
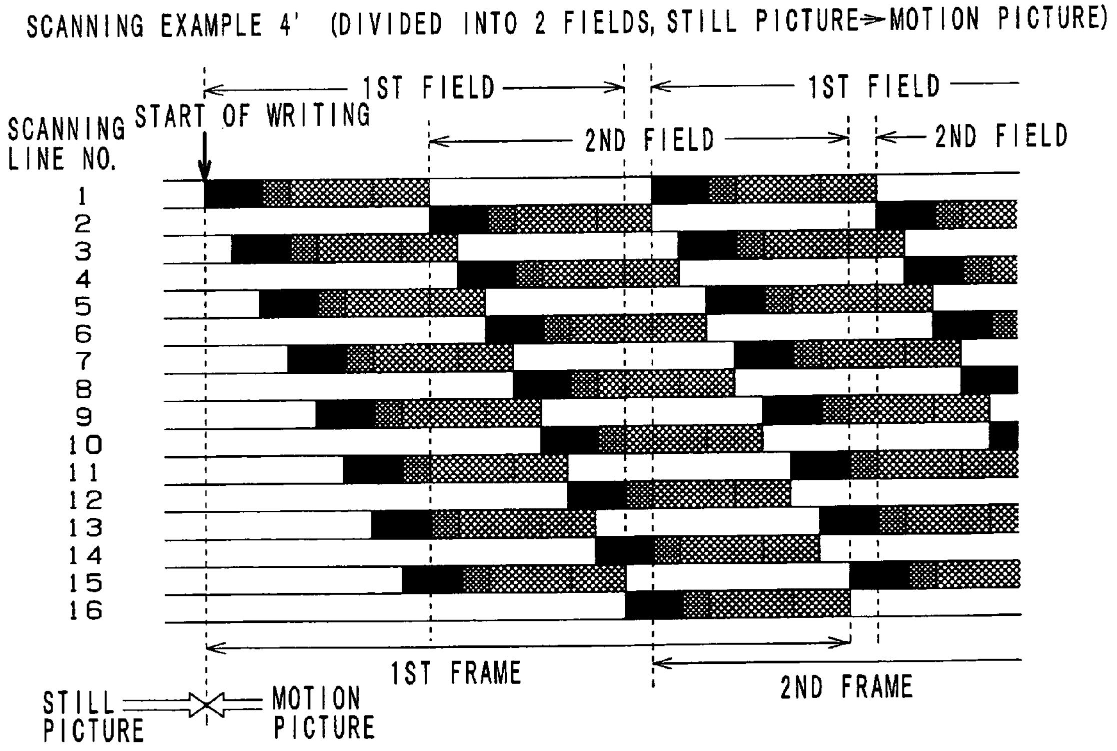
FIG. 15 is a chart which shows a modification of the fourth example of scanning (interlace scanning)

FIG. 15 shows a modification of the fourth example. As in the fourth example, based on the time of completion of the reset step of the last scanning line in a first field, writing in a second field is started. According to the fourth example, however, if the number of scanning lines is large, a flicker occurs. In order to avoid the flicker, the evolution step of each scanning line in the first field is extended to the start of writing on each scanning line in the second field. With this extension, the ratio of the pixels in a blackout state to the pixels in a display state is almost constant, and the brightness of the screen is almost constant.

Figure 16:
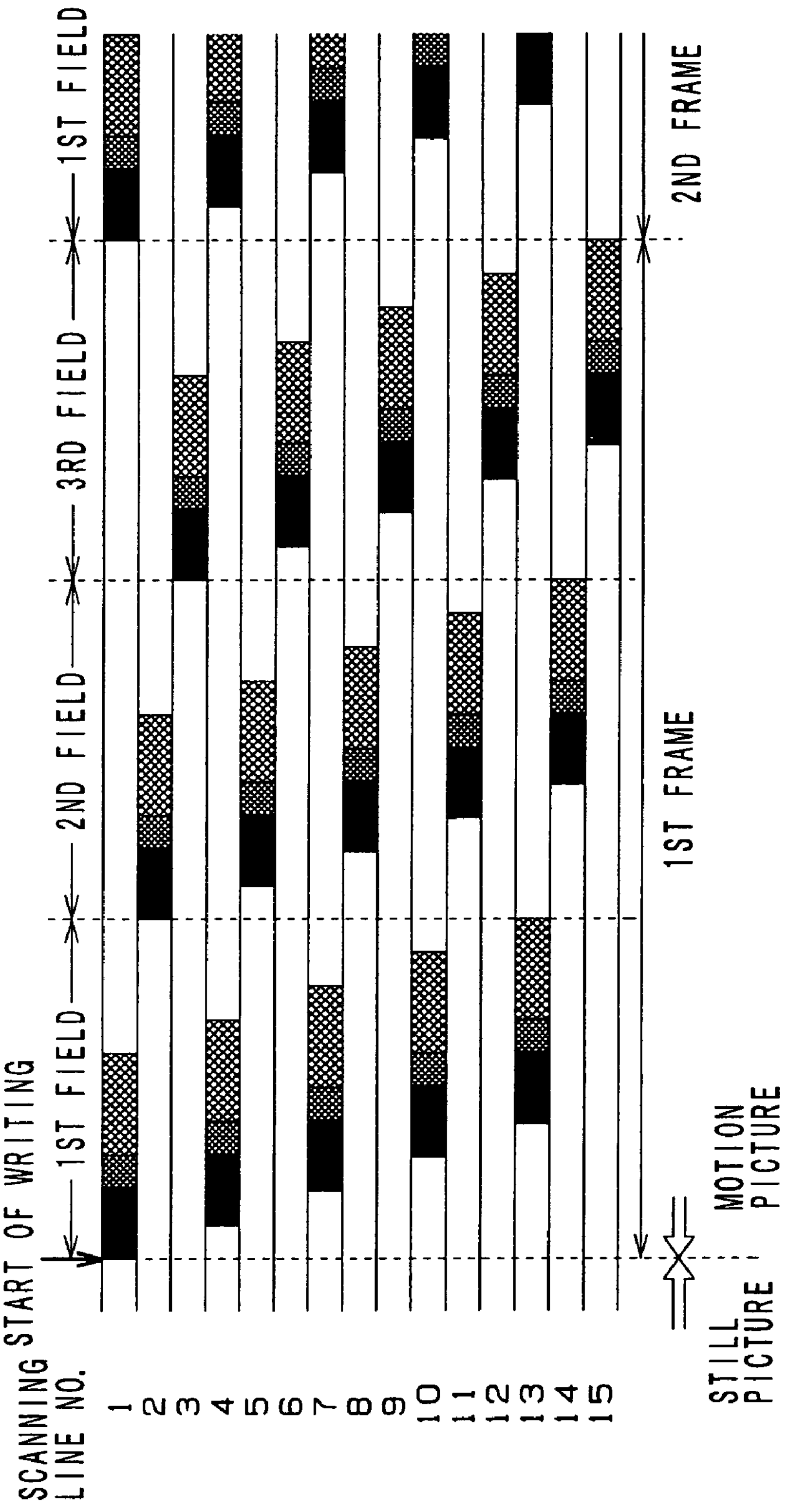
FIG. 16 is a chart which shows a fifth example of scanning (interlace scanning)

Fifth Example of Scanning; See FIG. 16

In the fifth example, one frame is divided into a first, field, a second field and a third field. Writing in the first field, writing in the second field and writing in the third field are carried out sequentially, and thus, an image of one frame is displayed. In the other points, writing according to the fifth example is the same as writing according to the first example.

Figure 17:
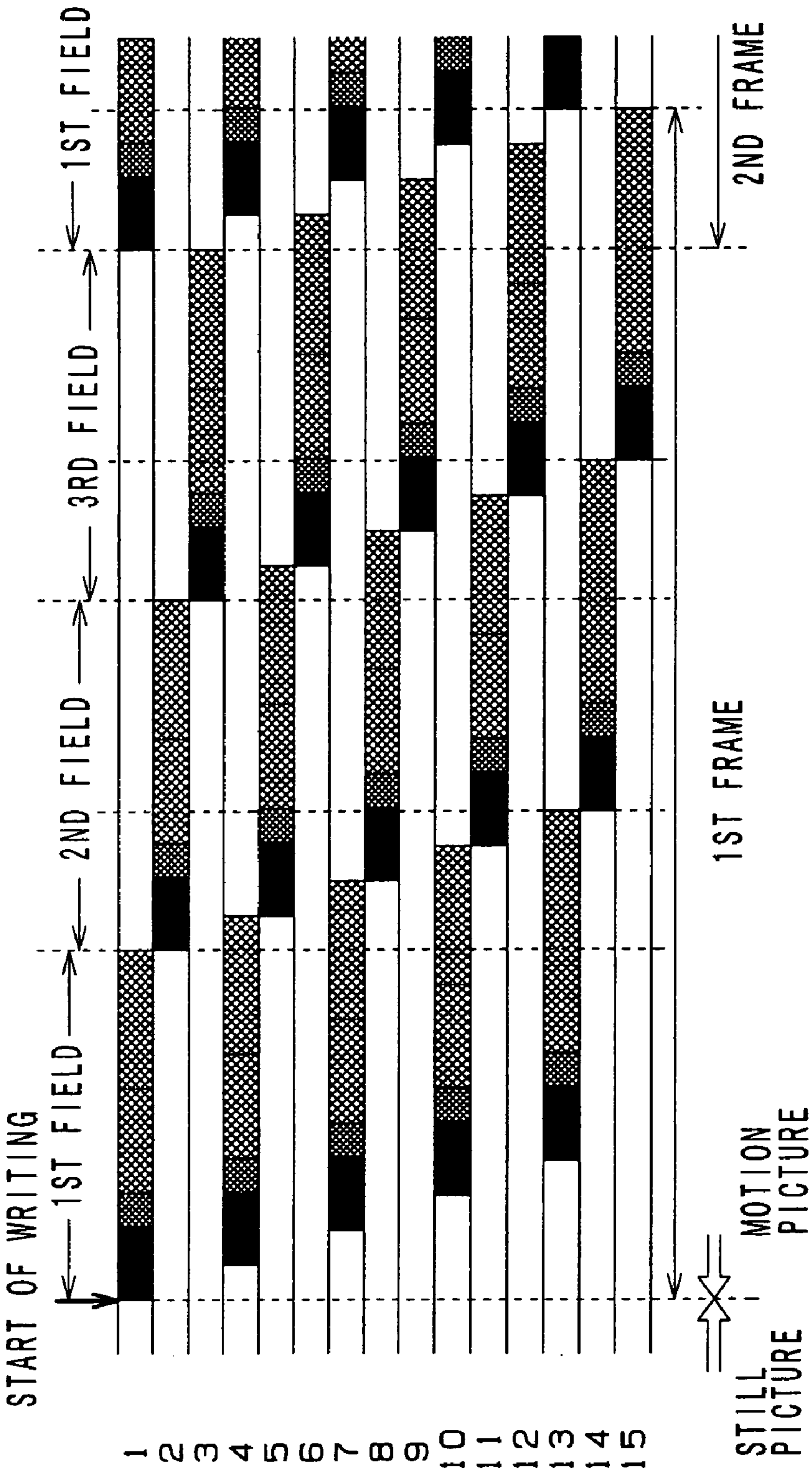
FIG. 17 is a chart which shows a sixth example of scanning (interlace scanning)

Sixth Example of Scanning; See FIG. 17

The sixth example is mainly to avoid a flicker as the fourth example. One frame is divided into three fields, and the evolution step of each scanning line in a field is extended to the start of writing on each scanning line in the next field. With this extension, the ratio of the pixels in a blackout state to the pixels in a display state is almost constant, and the brightness of the screen is almost constant.

Figure 18:
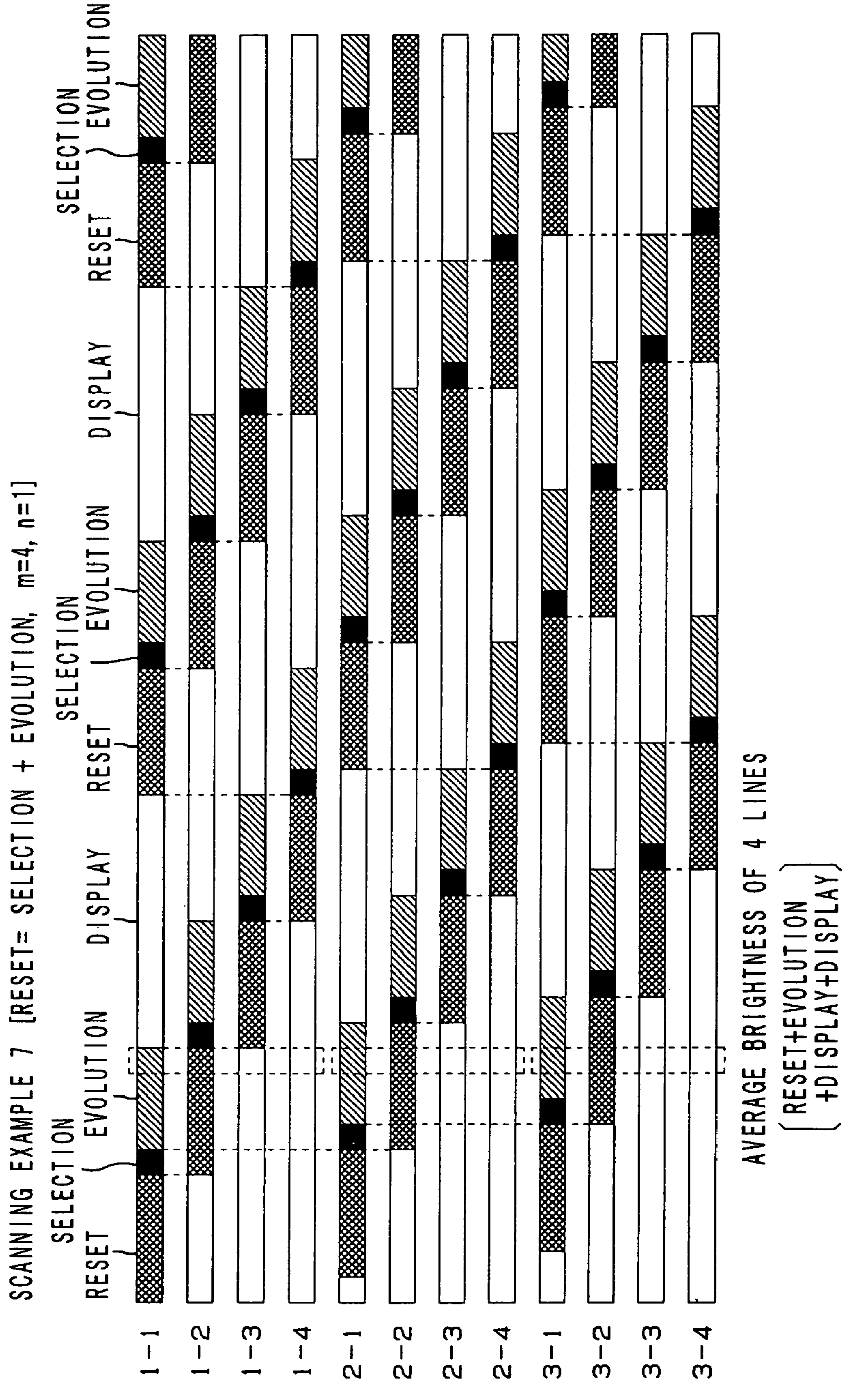
FIG. 18 is a chart which shows a seventh example of scanning (interlace scanning)

Seventh Example of Scanning; See FIG. 18

In the seventh example, one frame is divided into four fields (m=4). Scanning lines in a first field are serially subjected to writing, and next, scanning lines in a second field are serially subjected to writing. In the same way, scanning lines in a third field and scanning lines in a fourth field are serially subjected to writing. Thus, an image of one frame is displayed. Writing on each scanning line is carried out in the way shown by FIGS. 3 and 4, by following the reset step Tr, the selection step Ts and the evolution step Te. In these steps, the part subjected to writing is in a blackout state in which the observer sees the light absorbing layer on the backside of the liquid crystal display (see FIG. 11). Thereafter, the liquid crystal stays in a display state Td.

The length of the reset step is equal to the total length of the selection step and the evolution step (n=1). In this case, serial four scanning lines are in the following states: one of them is in the reset step; another is in the evolution step; and the other two are in the display step. The average luminosity of the scanning lines is constant, and a flicker is prevented.

Further, in a case of matrix driving, even after writing on a scanning line is completed, the scanning line is influenced by the pulses applied to the data electrodes for writing on other scanning lines. These pulses are crosstalk pulses, and the display step Td shown in FIG. 11 is actually a crosstalk step Td' in which crosstalk pulses are applied.

Figure 19:
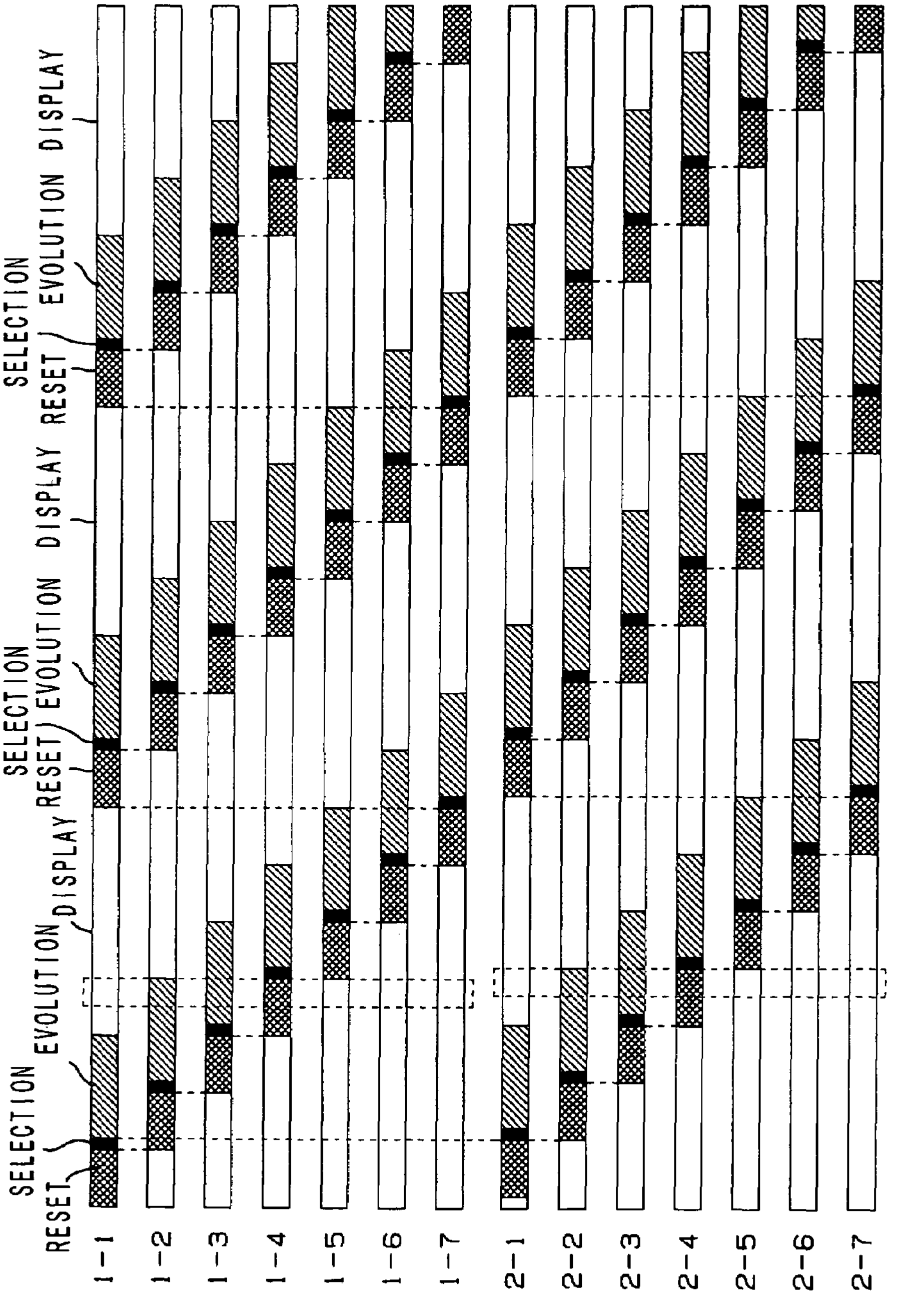
FIG. 19 is a chart which shows an eighth example of scanning (interlace scanning)

Eighth Example of Scanning; See FIG. 19

In the eighth example, one frame is divided into seven fields (m=7). Scanning lines in a first field are serially subjected to writing, and scanning lines in a second field, scanning lines in a third field, scanning lines in a fourth field, scanning lines in a fifth field, scanning lines in a sixth field and scanning lines in a seventh field are serially subjected to writing. Thus, an image of one frame is displayed.

The total length of the selection step and the evolution step is twice the length of the reset step (n=2). In this case, serial seven scanning lines are in the following states: one of them is in the reset step; other two lines are in the evolution step; and the other four are in the display step. Therefore, the average luminosity of the scanning lines is constant, and a flicker is prevented.

Figure 20:
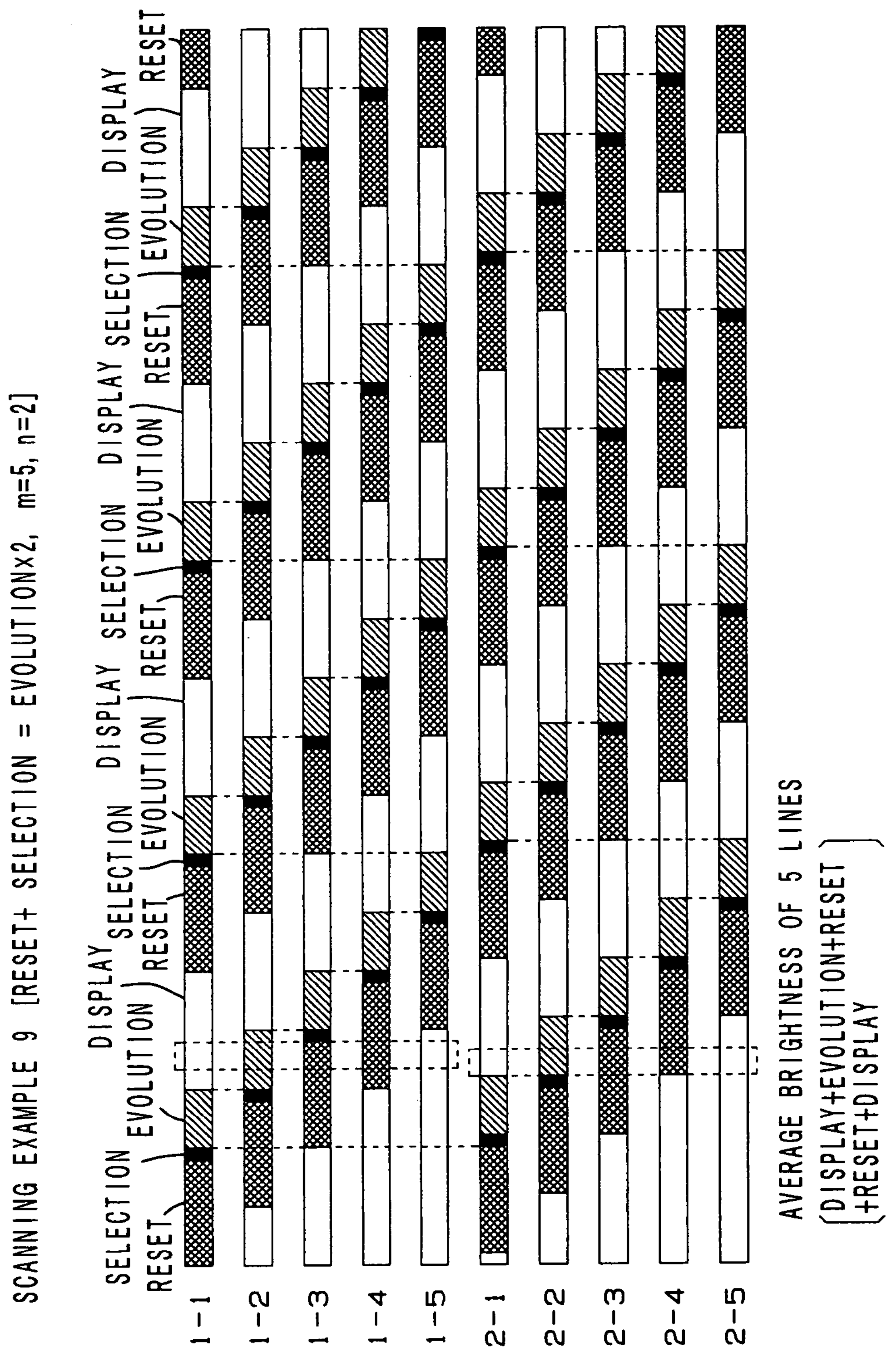
FIG. 20 is a chart which shows a ninth example of scanning (interlace scanning)

Ninth Example of Scanning; See FIG. 20

In the ninth example of scanning, one frame is divided into five fields (m=5). Scanning lines in a first field are serially subjected to writing, and scanning lines in a second field, scanning lines in a third field, scanning lines in a fourth field and scanning lines in a fifth field are serially subjected to writing. Thus, an image of one frame is displayed.

The total length of the reset step and the selection step is twice the length of the evolution step (n=2). In this case, serial five scanning lines are in the following states: two of them are in the reset step; another is in the evolution step; and the other two are in the display step. Therefore, the average luminosity of the scanning lines is constant, and a flicker is prevented.

Figure 21:
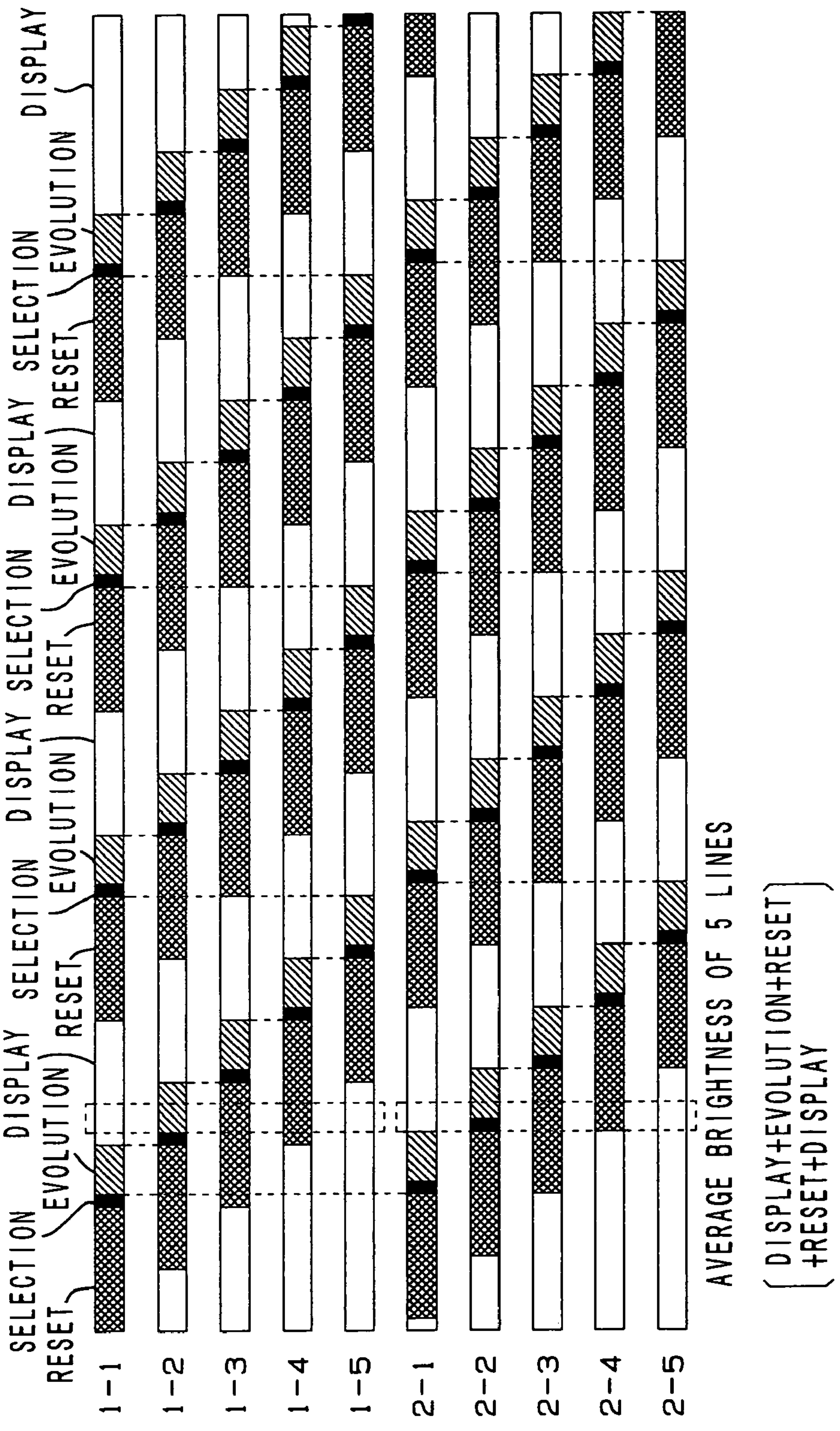
FIG. 21 is a chart which shows a tenth example of scanning (interlace scanning)

Tenth Example of Scanning; See FIG. 21

In the tenth example of scanning, one frame is divided into five fields (m=5). Scanning lines in a first field are serially subjected to writing, and scanning lines in a second field, scanning lines in a third field, scanning lines in a fourth field and scanning lines in a fifth field are serially subjected to writing. Thus, an image of one frame is displayed.

The length of the reset step is twice the total length of the selection step and the evolution step (n=2). In this case, serial five scanning lines are in the following states: two of them are in the reset step; another is in the evolution step; and the other two are in the display step. Therefore, the average luminosity of the scanning lines is constant, and a flicker is prevented.

Figure 22:
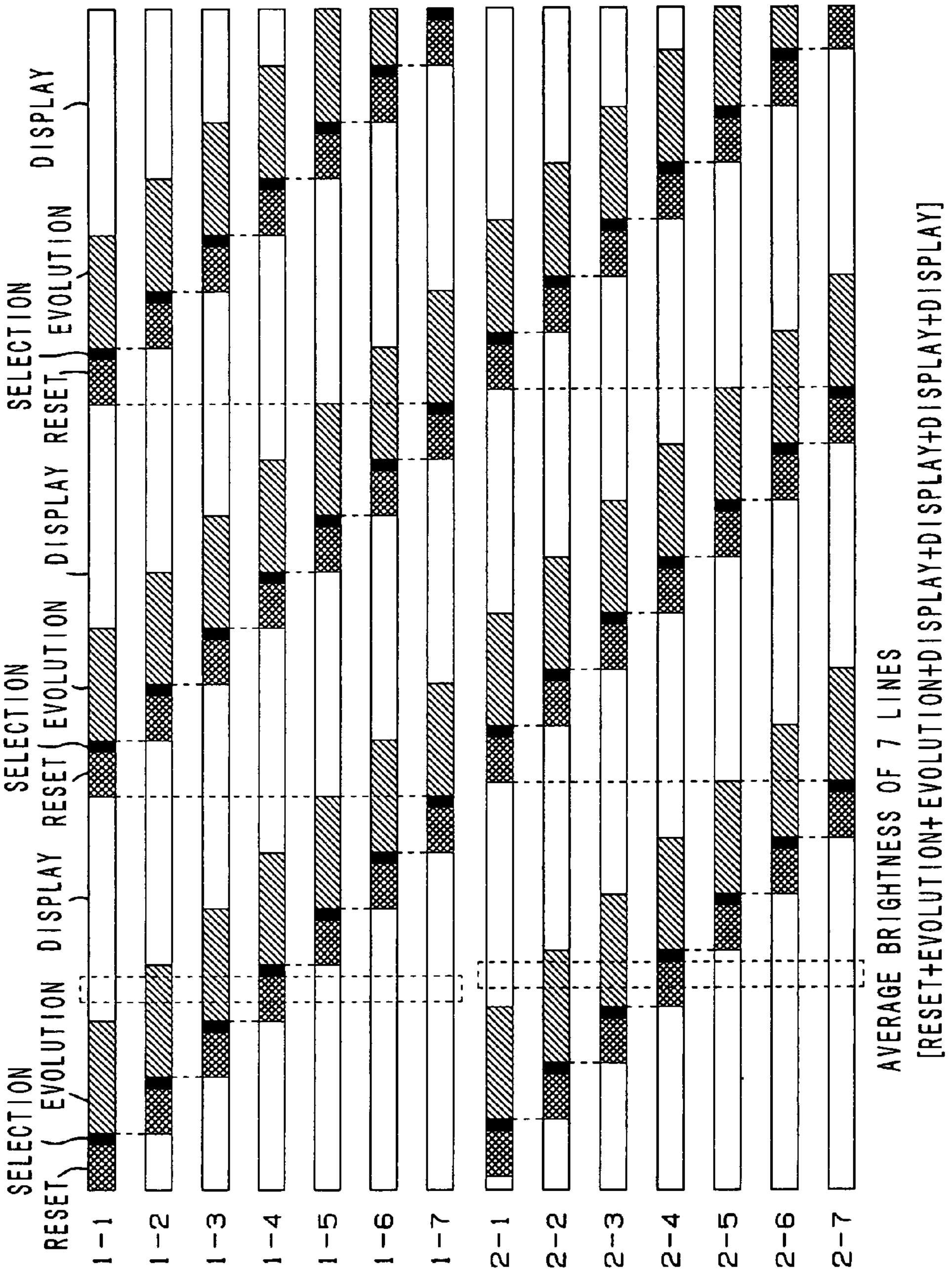
FIG. 22 is a chart which shows an eleventh example of scanning (interlace scanning)

Eleventh Example of Scanning; See FIG. 22

In the eleventh example of scanning, one frame is divided into seven fields (m=7). Scanning lines in a first field are serially subjected to writing, and scanning lines in a second field, scanning lines in a third field, scanning lines in a fourth field, scanning lines in a fifth field, scanning lines in a sixth field and scanning lines in a seventh field are serially subjected to writing. Thus, an image of one frame is displayed.

The length of the evolution step is twice the total length of the reset step and the selection step (n=2). In this case, serial seven scanning lines are in the following states: one of them is in the reset step; other two lines are in the evolution step; and the other four are in the display step. Therefore, the average luminosity of the scanning lines is constant, and a flicker is prevented.

Figure 23:
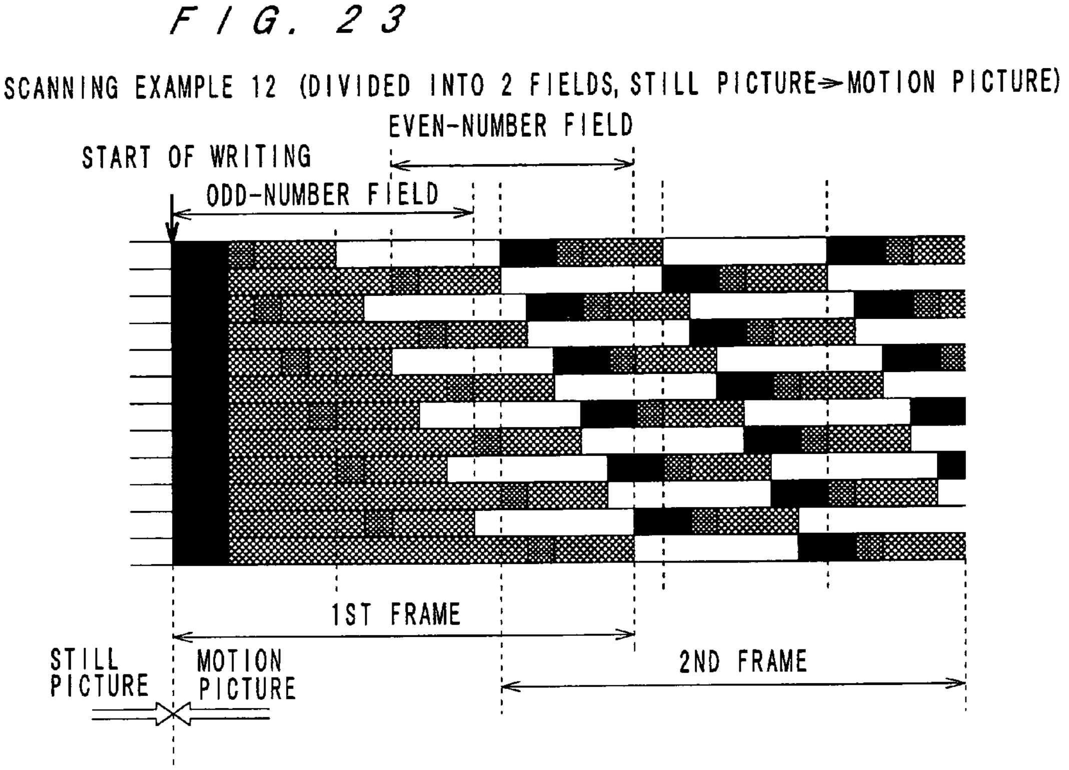
FIG. 23 is a chart which shows a twelfth example of scanning (interlace scanning)

Twelfth Example of Scanning; See FIG. 23

In the twelfth example, one frame is divided into two fields, namely, an odd-number field and an even-number field. As in the second example, first, all the scanning lines are reset at one time, and thereafter, scanning lines of odd numbers are serially subjected to writing. Then, scanning lines of even numbers are serially subjected to writing. Thus, an image of one frame is displayed. The time to start writing in the next field is similar to that in the fourth example.

In this twelfth example, at the start of writing in the first frame, all the scanning lines are reset at one time (initial reset), and in the even-number field of the first frame, the reset step can be omitted. As was described referring to the waveform in FIG. 6, by applying the reset pulse to all the scanning lines for initial reset and subsequently applying the evolution pulse to the second and subsequent scanning lines in the odd-number field and the scanning lines in the even-number field, the liquid crystal in these parts can stay in the reset state.

In the twelfth example, because of the initial reset, composition of the image before writing and the image to be written can be prevented. If this twelfth example is adopted in switching a still picture to a display of inputted letters, the display becomes easy to see. As in the second example, the brightness of the screen is guaranteed during and after writing in the even-number field of the first frame.

Figure 24:
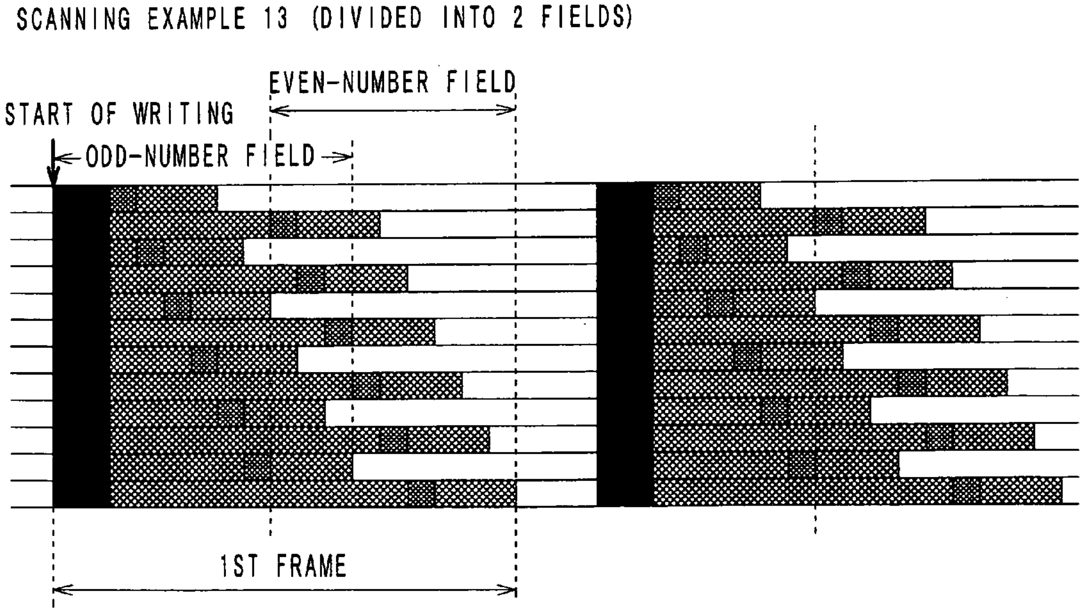
FIG. 24 is a chart which shows a thirteenth example of scanning (interlace scanning)

Thirteenth Example of Scanning; See FIG. 24

In the thirteenth example, as in the fourth and twelfth examples, one frame is divided into two fields, namely, an odd-number field and an even-number field, and interlace scanning is carried out. In this example, however, at the start of writing of every frame, initial reset is carried out. Writing according to the thirteenth example is suited to display page-turns.

Figure 25:
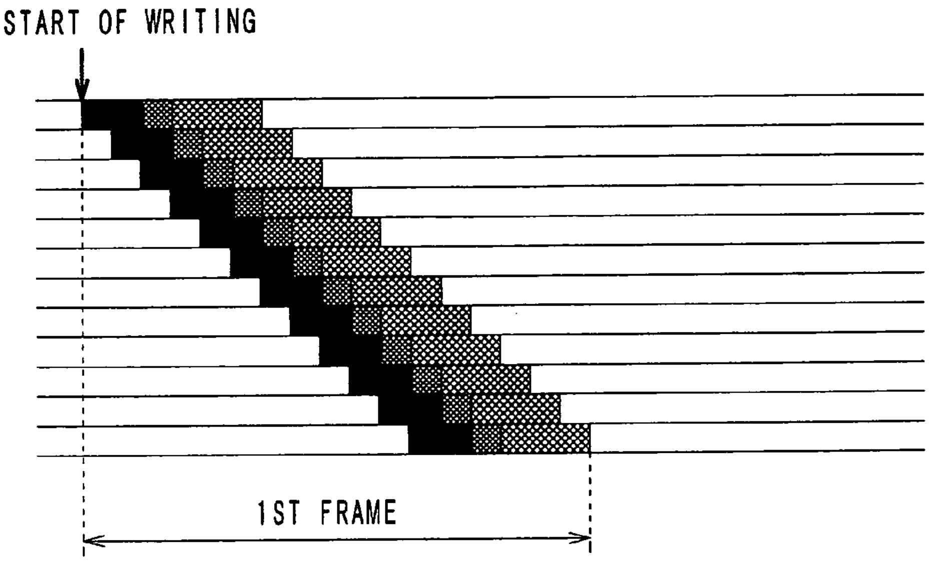
FIG. 25 is a chart which shows a fourteenth example of scanning (sequential scanning)

Fourteenth Example of Scanning; See FIG. 25

The fourteenth example is not an example of interlace scanning but an example of sequential scanning from the first scanning line.

Figure 26:
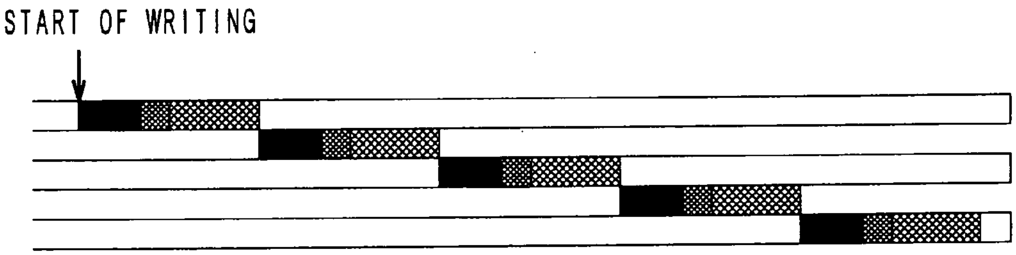
FIG. 26 is a chart which shows a fifteenth example of scanning (sequential scanning)

Fifteenth Example of Scanning; See FIG. 26

The fifteenth example is an example of sequential scanning in the same way as in the fourteenth example. In the fifteenth example, when the evolution step of a scanning line is completed, writing on the next scanning line is started.

Figure 27:
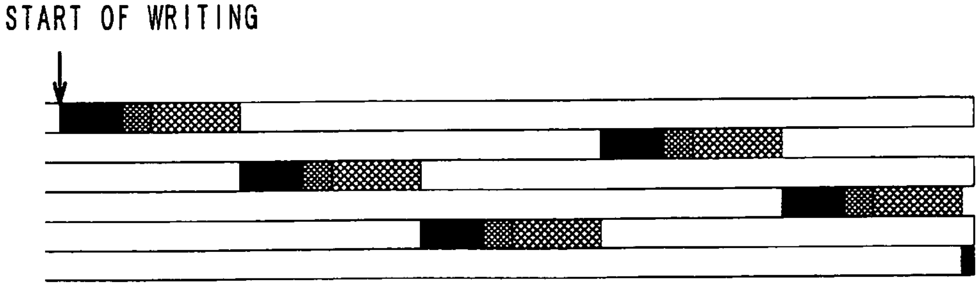
FIG. 27 is a chart which shows a sixteenth example of scanning (interlace scanning)

Sixteenth Example of Scanning; See FIG. 27

In the sixteenth example, interlace scanning is carried out without dividing one frame into fields. When writing on a scanning line is completed, which means that the scanning line comes to the display step, writing on the next scanning line is started.

Ways of Providing Frame Data; See FIG. 28

Figure 28:
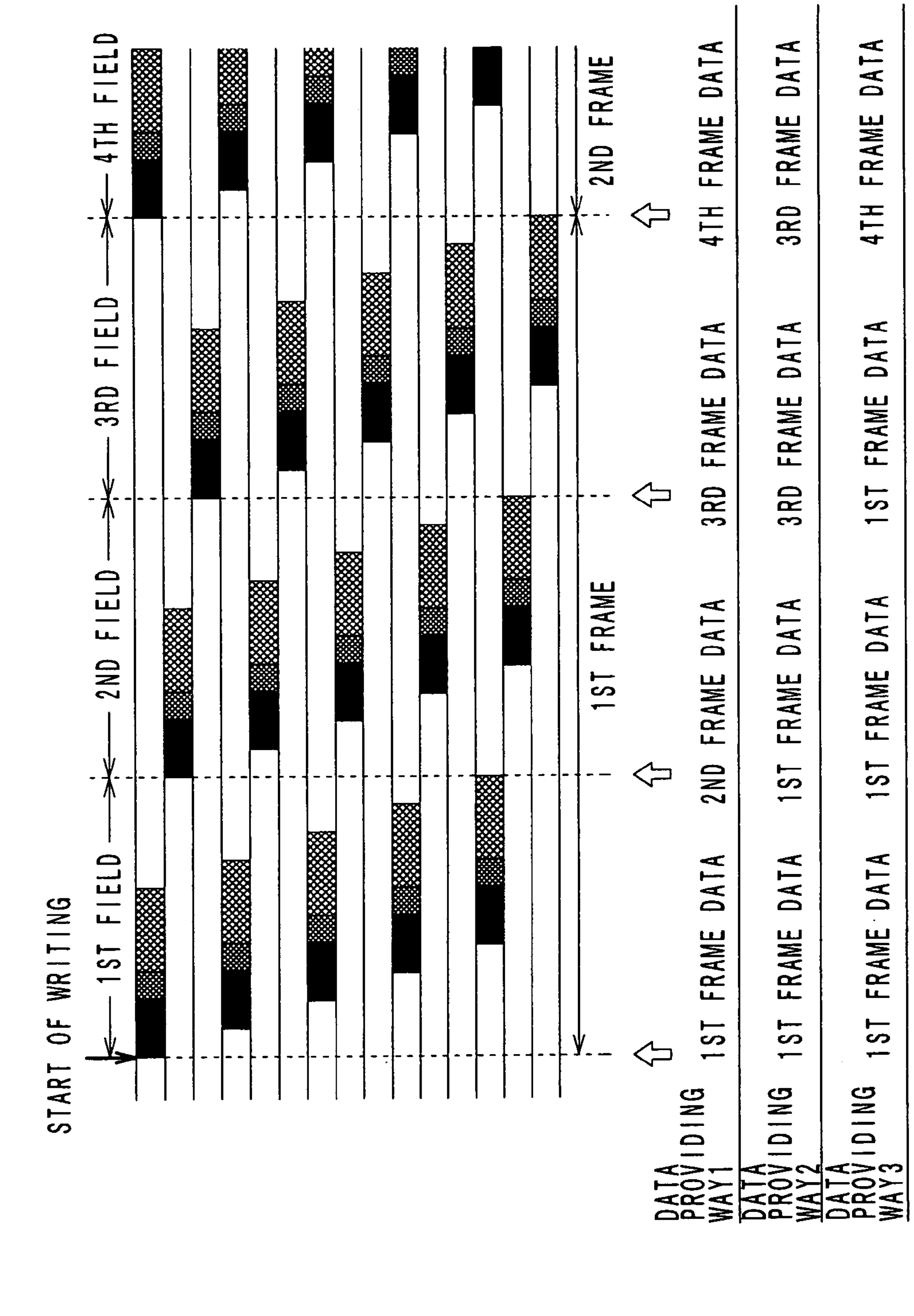
FIG. 28 is a chart which shows a first way, a second way and a third way of providing frame data.

Next, in interlace scanning, exemplary ways of providing frame data are described with reference to FIG. 28 and Tables 1-3. The ways of providing frame data described herewith are to carry out the fifth example (see FIG. 16) in which one frame is divided into three fields.

TABLE 1

| Field No. | Frame Data No. 1$^{st}$ frame | 2$^{nd}$ frame | 3$^{rd}$ frame | 4$^{th}$ frame | . . . | m$^{th}$ frame |
|---|---|---|---|---|---|---|
| n | 1 | 4 | 7 | 10 | . . . | 3m − 2 |
| n + 1 | 2 | 5 | 8 | 11 | . . . | 3m − 1 |
| n + 2 | 3 | 6 | 9 | 12 | . . . | 3m |

TABLE 2

| Field No. | Frame Data No. 1$^{st}$ frame | 2$^{nd}$ frame | 3$^{rd}$ frame | 4$^{th}$ frame | . . . | m$^{th}$ frame |
|---|---|---|---|---|---|---|
| n | 1 | 3 | 7 | 9 | . . . | 6m − 5 (m = O.N.)<br>6m − 3 (m = E.N.) |
| N + 1 | 1 | 5 | 7 | 11 | . . . | 6m − 4 (m = O.N.)<br>6m − 2 (m = E.N.) |
| N + 2 | 3 | 5 | 9 | 11 | . . . | 6m − 3 (m = O.N.)<br>6m − 1 (m = E.N.) |

"O.N." means an odd number, and "E.N." means an even number.

TABLE 3

| Field No. | Frame Data No. 1$^{st}$ frame | 2$^{nd}$ frame | 3$^{rd}$ frame | 4$^{th}$ frame | . . . | m$^{th}$ frame |
|---|---|---|---|---|---|---|
| n | 1 | 4 | 7 | 10 | . . . | 3m − 2 |
| n + 1 | 1 | 4 | 7 | 10 | . . . | 3m − 2 |
| n + 2 | 1 | 4 | 7 | 10 | . . . | 3m − 2 |

In the case of Table 1, for writing in each field, new frame data are provided. Since new data are displayed in each field, the way of providing frame data is suited to display a dynamic and rapid motion picture. In the case of Table 2, new frame data are provided for writing in every other field. In the case of Table 3, the same frame data are provided for writing in three fields composing one frame. In the way shown by Table 3, after one frame data are wholly displayed, writing of next frame data is started. Therefore, the displayed data are easy to recognize, and this is suited to scroll.

First through Third Examples of Providing Data; See FIGS. 29-31

Figure 29:
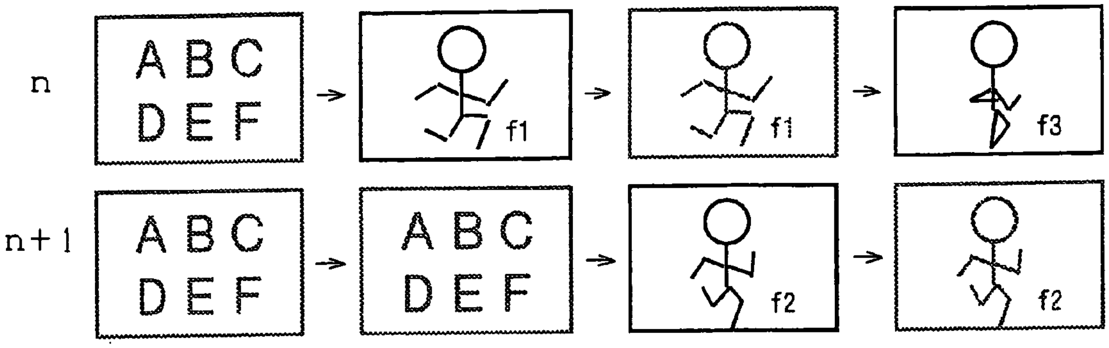
FIG. 29 is an illustration which shows a first example of providing frame data according to the first way.
Figure 30:
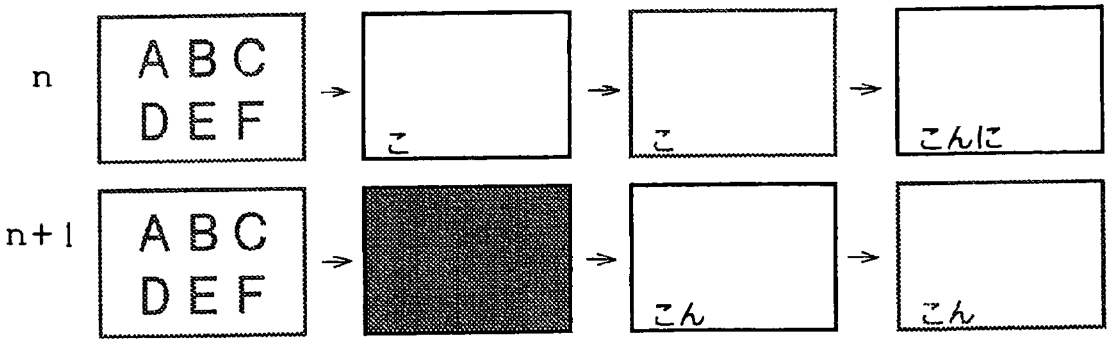
FIG. 30 is an illustration which shows a second example of providing frame data according to the second way.
Figure 31:
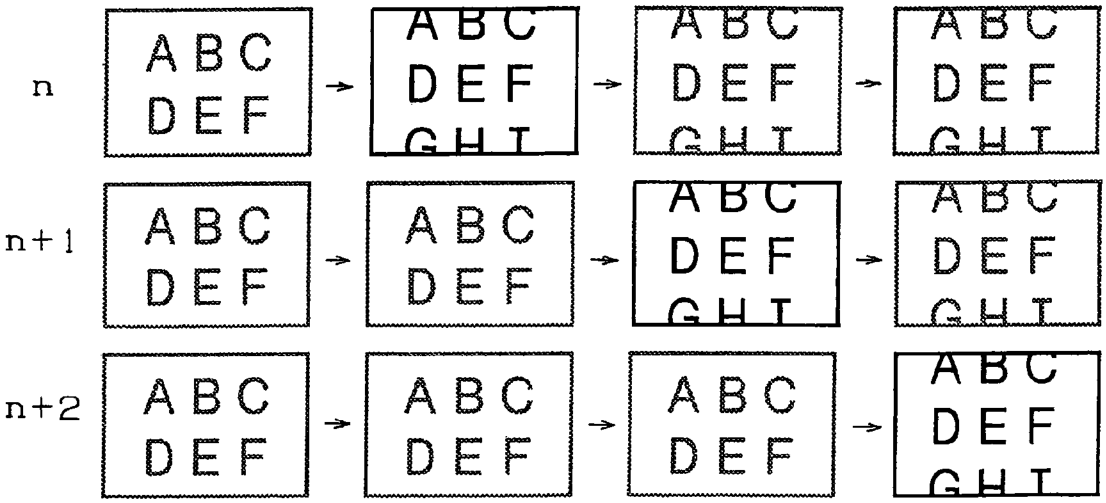
FIG. 31 is an illustration which shows a third example of providing frame data according to the third way.

Referring to FIGS. 29 to 31, specific examples (first through third examples) of providing data in an interlace scanning drive are described. FIG. 29 shows a first example of providing frame data in the way shown by Table 1 to carry out writing according to the first example or the fourth example of scanning (see FIGS. 10 and 14) in which one frame is divided into two fields. FIG. 29 shows a case of switching a still picture to a motion picture. FIG. 30 shows a second example of providing frame data in the way shown by Table 1 to carry out writing according to the second example of scanning (see FIG. 12) in which one frame is divided into two fields. FIG. 30 shows a case of switching a still picture to a display of inputted letters. FIG. 31 shows a third example of providing frame data in the way shown by Table 3 to carry out writing according to the fifth example or the sixth example of scanning (see FIGS. 16 and 17) in which one frame is divided into three fields. FIG. 31 shows a case of scrolling. In FIGS. 29 through 31, the solidly drawn images are images which are being written, and the thinly drawn images are images which have been written.

Fourth through Sixth Ways of Providing Data; See FIG. 32

Figure 32:
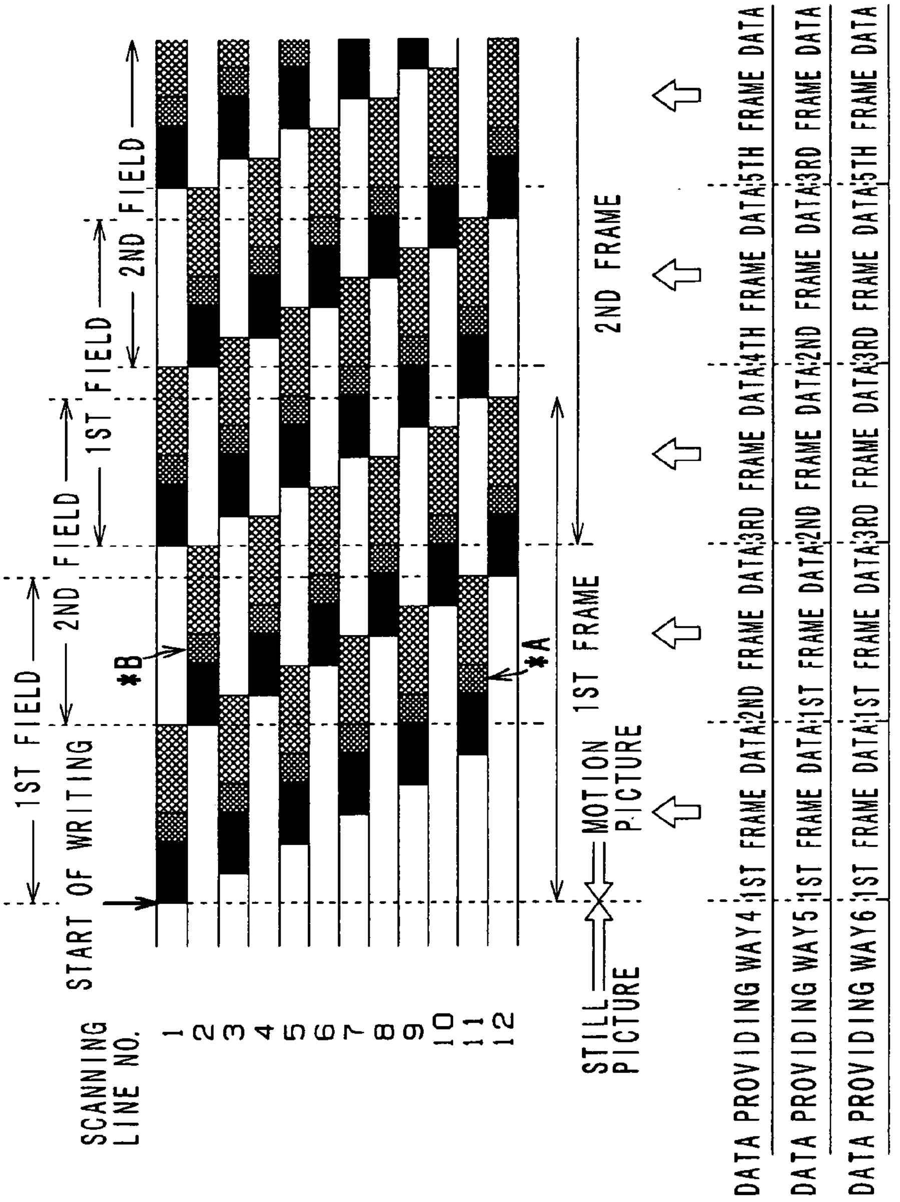
FIG. 32 is an illustration which shows a fourth way, a fifth way and a sixth way of providing data.

FIG. 32 shows a fourth, a fifth and a sixth way of providing data to carry out writing according to the fourth example of scanning shown by FIG. 14. In the fourth example of providing data, new field data are provided for writing in each field. Since new data are displayed in each field, the way of providing frame data is suited to display a dynamic and rapid motion picture. In the fifth example of providing data, new frame data are provided for writing in every other field. In the sixth example of providing data, the same frame data are provided for writing in two fields composing one frame. In the sixth example, after one frame data are wholly displayed, writing of next frame data is started. Therefore, the displayed data are easy to recognize, and this is suited for scroll display.

Seventh through Ninth Ways of Providing Data; See FIG. 33

Figure 10:
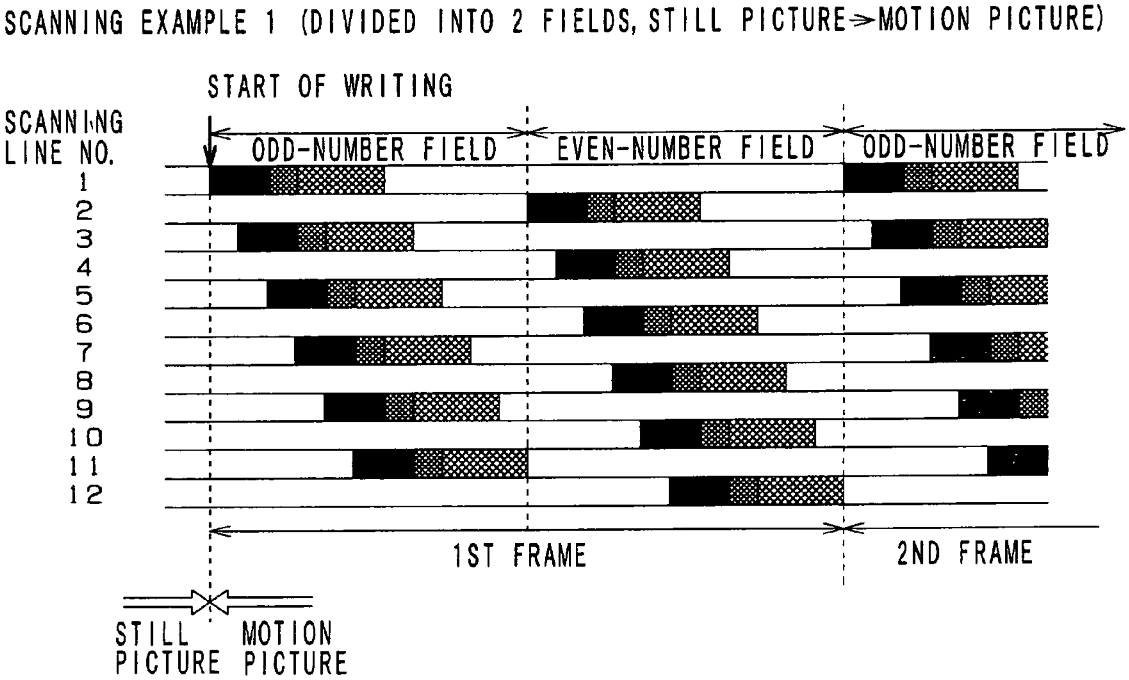
FIG. 10 is a chart which shows a first example of scanning (interlace scanning)
Figure 33:
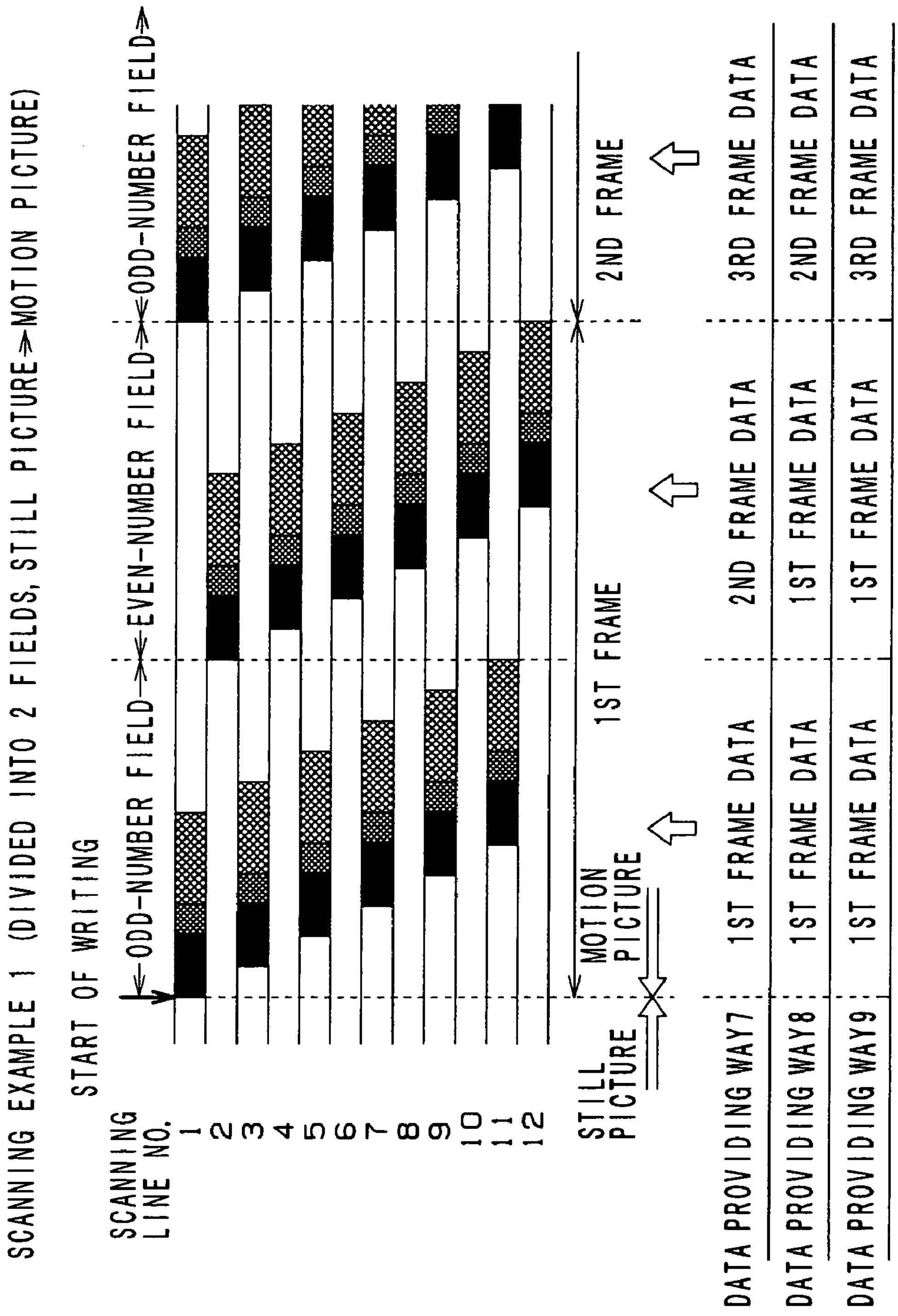
FIG. 33 is an illustration which shows a seventh way, an eighth way and a ninth way of providing data.

FIG. 33 shows a seventh, an eighth and a ninth way of providing data to carry out writing according to the first example of scanning shown by FIG. 10. The seventh through ninth ways are the same as the fourth through sixth ways shown in FIG. 32, respectively.

Procedure of Selecting a Driving Method; See FIG. 34

Figure 34:
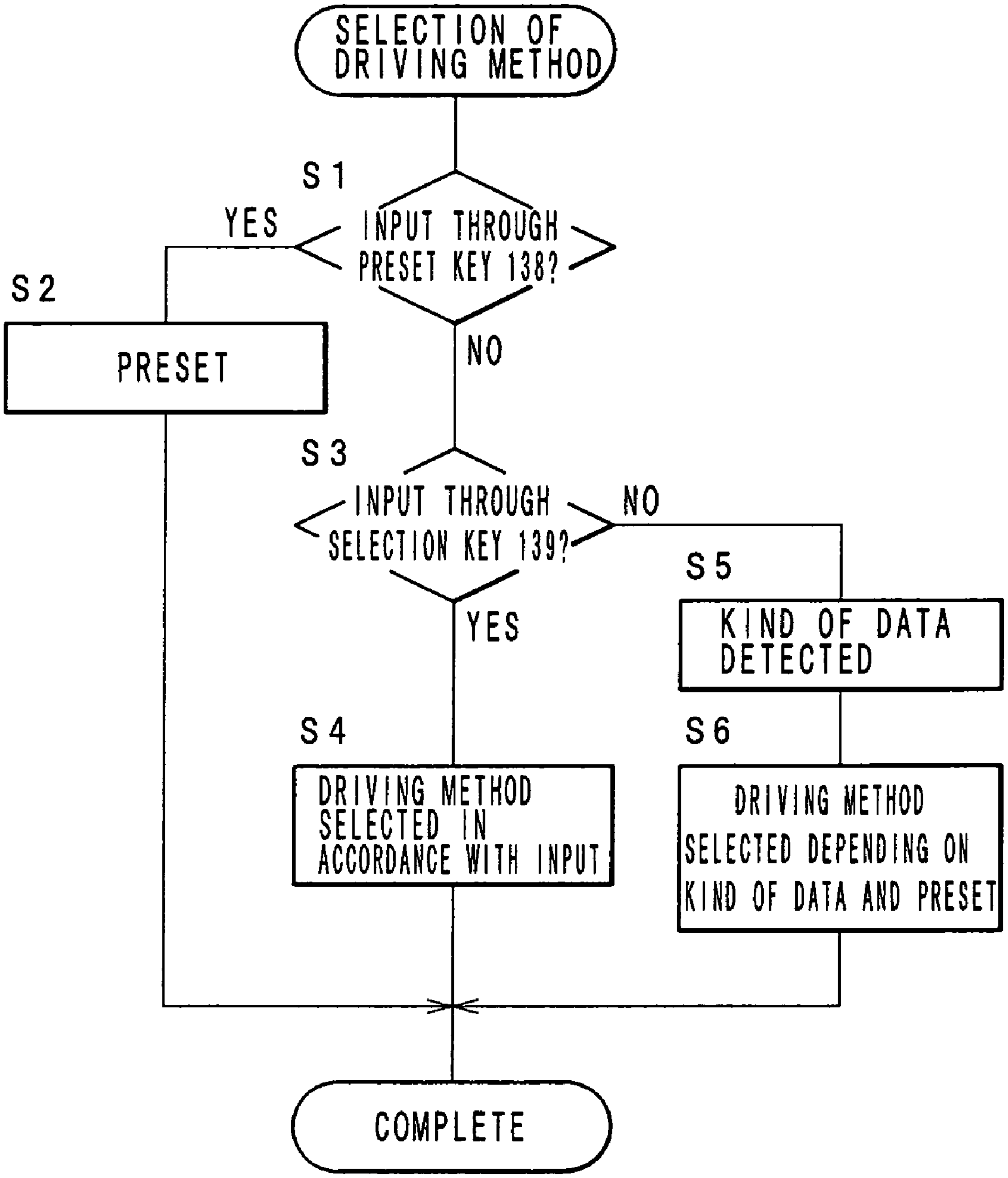
FIG. 34 is a flowchart which shows a procedure of selecting a driving method.

FIG. 34 is a flowchart which shows a procedure of selecting a driving method in the display device shown by FIGS. 1 and 2.

First, it is judged at step S1 whether there are any inputs for preset. Preset is carried out by use of the preset key 138 at the time of delivering the display device from the factory or carried out by the user. At the preset, default is set by setting the following factors: a way of selecting a driving methods from driving methods according to interlace scanning and driving methods according to sequential scanning depending on the kind of data to be displayed; the number of fields in performing interlace scanning; the necessity of carrying out initial reset, etc. When inputs about these factors for preset are done, preset is executed at step S2.

When there are no inputs for preset, it is judged at step S3 whether the user has made an input for selection of a driving method by use of the selection key 139. With this arrangement, the user's selection on the spot is prior to the selection in accordance with the default by the preset. Therefore, when there is an input through the key 139, at step S4, a driving method is set in accordance with the user's selection by use of the key 139.

If there are no inputs from the user through the key 139, the kind of data to be displayed (a still picture, a motion picture, inputted letters, scroll, etc.) is detected at step S5. Then, at step S6, a driving method is selected depending on the kind of data and the default by the preset.

Structure of Scan Electrode Driving IC; See FIG. 35

Figure 35:
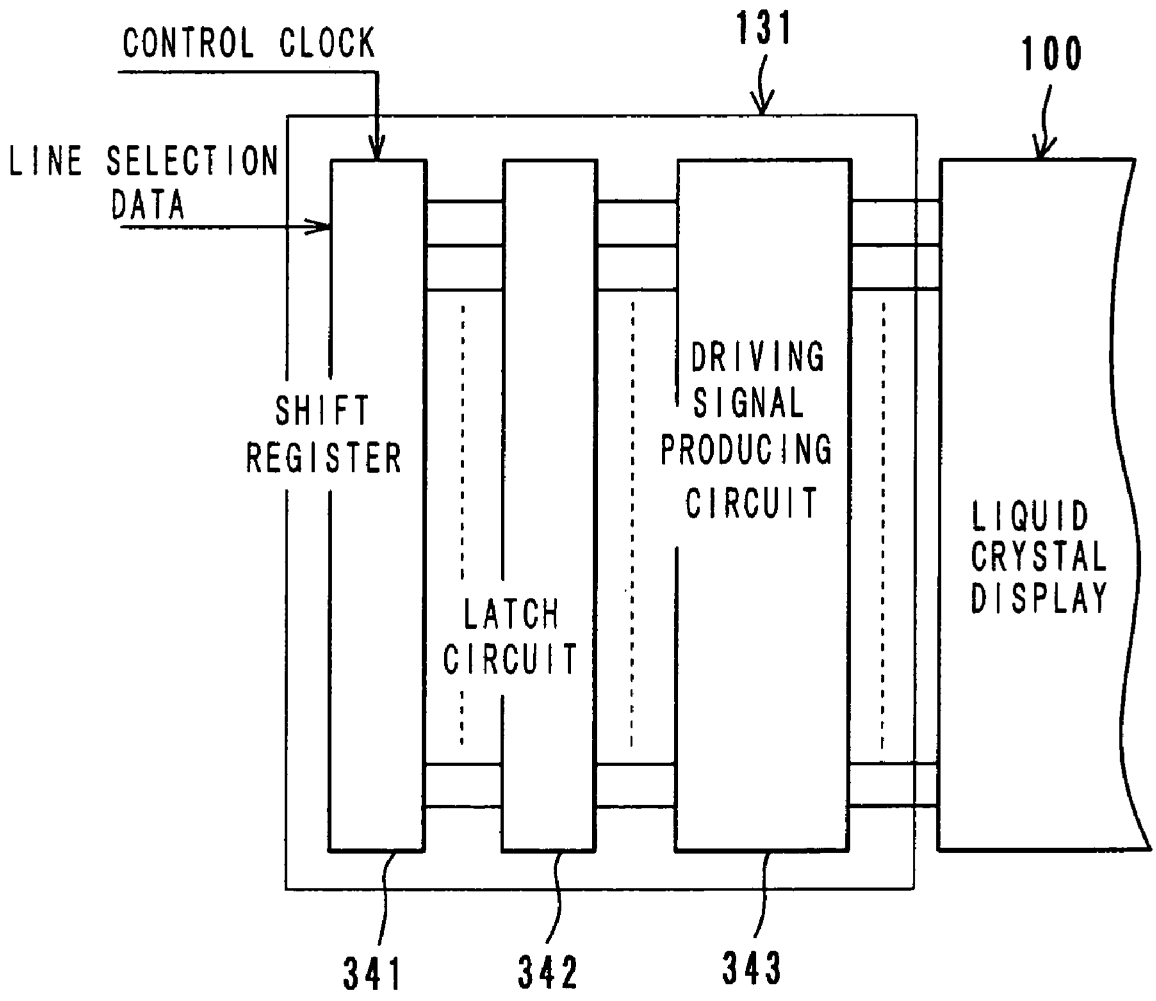
FIG. 35 is a block diagram which shows an internal circuit of a scan electrode driving IC.

The scan electrode driving IC 131 employed in the driving circuit shown by FIG. 2 is of the structure shown by FIG. 35. The scan electrode driving IC 131 comprises a shift register 341, a latch circuit 342, and a driving signal producing circuit 343.

In accordance with key operation of the display device, the CPU 135 takes into an image from an external device or reads an image from a storage medium and stores the image in the image memory 137. The CPU 135 further sends a writing start signal and a driving mode signal (a combination of an ordinary mode or a power-saving mode and a sequential scanning mode or an interlace scanning mode) to the controllers 133 and 134. The driving mode signal will be described in detail later.

The scan electrode controller 133 produces line selection data to designate scanning electrodes to be driven for writing and sends the line selection data to the shift register 341. The controller 133 also produces a control clock signal and sends it to the shift register 341. The control clock signal is used when the shift register 341 takes in the line selection data. The length of the cycle of sending the line selection data corresponds to the length of the cycle of selecting a scanning electrode (writing on one line). The data electrode controller 134, in synchronization with sending of the line selection data, image data are sent from the image memory 137 to the data electrode driving IC 132.

It is possible to shift the selected line from a scan electrode to another serially by, after sending the line selection data to select the first line, shifting the line selection data serially in the shift register 341. In this case, the intervals between the control clocks correspond to the length of the cycle of selecting a scan electrode.

Driving Mode; See FIGS. 36-38

A driving mode which is a combination of a sequential scanning mode and an ordinary mode 1, a power-saving mode 1 or a power-saving mode 2 (see FIG. 36), a driving mode which is a combination of an interlace scanning mode and an ordinary mode 2, a power-saving mode 2-1 or a power-saving mode 2-2 (see FIG. 37) and a driving mode which is a combination of an interlace scanning mode and an ordinary mode 3 or a power-saving mode 3-1 (see FIG. 38) are selectable.

In a sequential scanning/ordinary 1 mode shown in FIG. 36, a first frame, a second frame and subsequent frames are written serially. The cycle of writing a frame in this driving mode are of a conventional length, and this time length is referred to as a first frame length.

In a sequential scanning/power-saving 1-1 mode, the cycle of writing a frame are lengthened, for example, are 1.5 times of the cycle of writing a frame in the sequential scanning/ordinary 1 mode. Such a longer length of the cycle of writing a frame is referred to as a second frame length. Here, by lengthening the cycle of selecting a line, the cycle of writing a frame is lengthened.

In a sequential scanning/power-saving 1-2 mode, the time for writing a frame is equal to that in the sequential scanning/ordinary 1 mode, that is, the length of the cycle of selecting a line is equal to that in the sequential scanning/ordinary 1 mode; however, break times are inserted among writing times of frames. Consequently, the cycle of writing a frame is lengthened as in the sequential scanning/power-saving 1-1 mode.

In an interlace scanning/ordinary 2 mode shown in FIG. 37, one frame is divided into two fields, namely, an odd-number field and an even-number field, and interlace scanning is carried out. In this driving mode, the cycle of writing a frame is of the first frame length, and frames are written continuously (see the first through fourth examples of scanning).

On the other hand, in an interlace scanning/power-saving 2-1 mode, the time for writing a frame is equal to that in the interlace scanning/ordinary 2 mode, that is, the length of the cycle of selecting a line is equal to that in the interlace scanning/ordinary 2 mode; however, break times are inserted among writing times of frames. Consequently, the cycle of writing a frame is lengthened.

In an interlace scanning/power-saving 2-2 mode, the length of the time for writing in a field is equal to that in the interlace scanning/ordinary 2 mode, that is, the length of the cycle of selecting a line is equal to that in the interlace scanning/ordinary 2 mode; however, break times are inserted among writing times in fields. Consequently, the cycle of writing a frame is lengthened.

When the power-saving 2-2 mode is adopted, in the break time after writing in the odd-number field, a composite image of the previous image left in the even-number field and the newly written image in the odd-number field is displayed. When the power-saving 2-1 mode is adopted, such display of a composite image does not occur. Therefore, the power-saving 2-1 mode is suited to write an image which is totally different from the previous image. On the other hand, in the power-saving 2-2 mode, the break times are shorter than those in the power-saving 2-1 mode and are scattered. In the power-saving 2-2 mode, therefore, the existences of the break times are not obstructive to display.

In an interlace scanning/ordinary 3 mode shown in FIG. 38, only either data for the odd-number field or data for the even-number field are provided for writing of one frame. Thus, interlace scanning is carried out for fast forward display.

In an interlace scanning/power-saving 3-1 mode, as in the ordinary 3 mode, only either data for the odd-number field or data for the even-number field are provided for writing of one frame, and the time for writing in a field (i.e., writing of a frame) is equal to that in the interlace scanning/ordinary 3 mode, that is, the length of the cycle of selecting a line is equal to that in the interlace scanning/ordinary 3 mode; however, break times are inserted among writing times in fields (i.e., writing times of frames). Consequently, the cycle of writing a frame is lengthened.

The selection between the ordinary mode and the power-saving mode is done by operation of mode selection keys. When the user wishes to save power consumption of the battery, the user shall select the power-saving mode, and when the user wishes picture quality, the user shall select the ordinary mode.

The display device may be so structured that the mode selection is automatically carried out depending on the type of display. For example, when inputted letters are to be serially displayed, the picture quality is not a matter of great significance, and the power-saving mode is automatically selected. When a motion picture is to be displayed, the ordinary mode is automatically selected.

It is also possible that the display device is so structured to automatically cancel the power-saving mode and to set the ordinary mode while the display device is being used connected to an AC adapter.

In the above paragraphs, the interlace scanning mode has been described as a mode to carry out writing according to the first through fourth examples of scanning in which one frame is divided into two fields; however, the interlace scanning mode can be adapted to carry out writing in which one frame is divided into three fields as in the fifth and the sixth examples of scanning or into more fields.

In this embodiment, as described above, by lengthening the cycle of selecting a line (power-saving 1-1) or by inserting break times (power-saving 1-2, 2-1, 2-2 and 3-1), the number of lines which are subjected to writing per a unit time (the rate of writing) is reduced, and the power consumption of the scan electrode driving IC 131 can be reduced, which contributes to power saving.

Also, in this embodiment, since a liquid crystal display with a memory effect is used, an image is displayed continuously even after the supply of electric power thereto is stopped. Therefore, there are no possibilities that the insertion of break times may cause a flicker.

Mobile Communication Terminal, Mobile Telephone; See FIGS. 39-56

Figure 39:
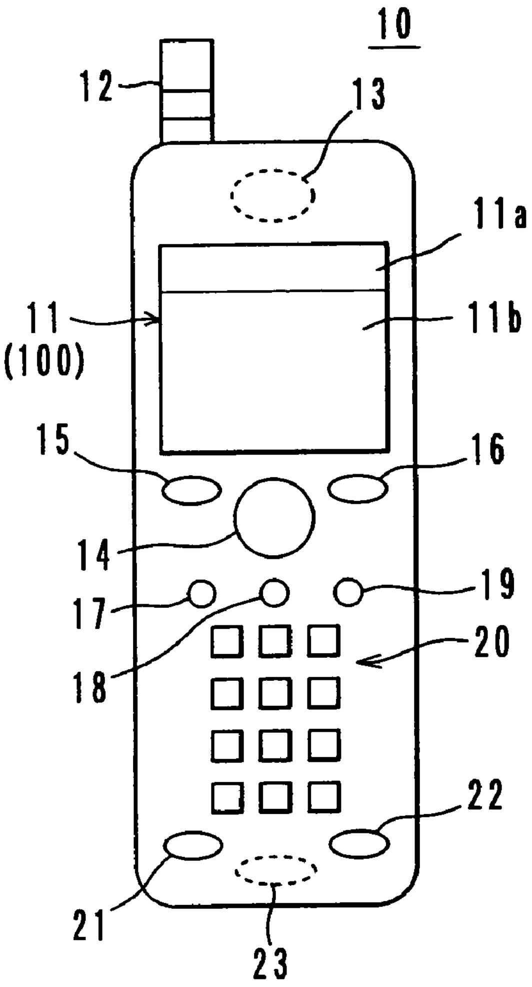
FIG. 39 is a front view of a mobile telephone.

FIG. 39 shows an example of application of the present invention to a mobile telephone. The mobile telephone 10 comprises a display 11 which is the above-described liquid crystal display 100, an antenna 12, a speaker 13, a cursor key 14, a directory key 15, a menu switch key 16, a call key 17, a clear key 18, a power key 19, a ten-key 20, a record key 21, a manner mode key 22 and a microphone 23. The functions of these keys are well known.

Figure 40:
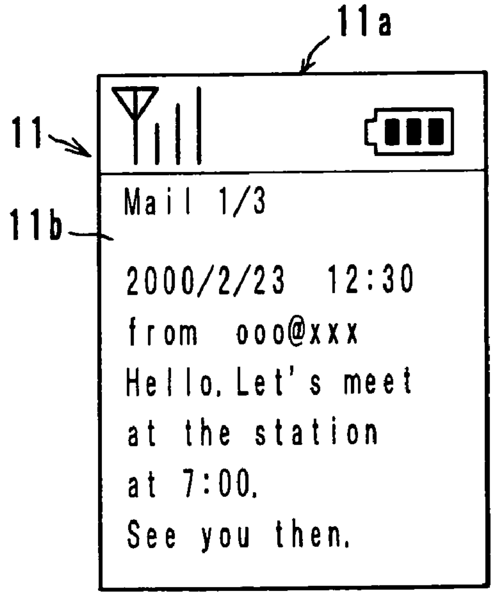
FIG. 40 is a front view of a display of the mobile telephone.
Figures 42A, 42B, 42C, 42D:
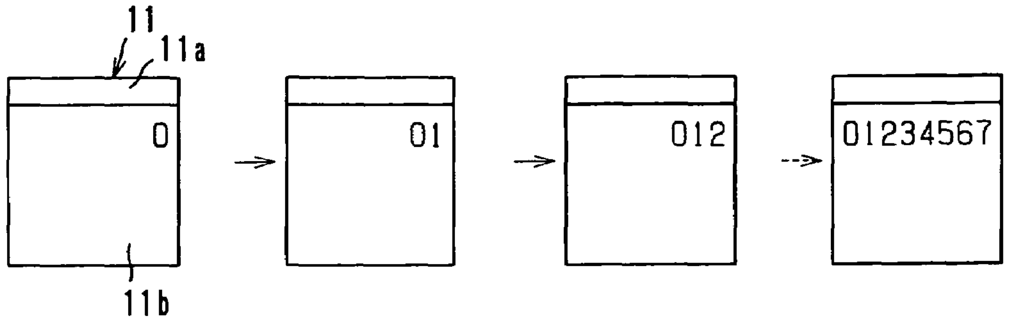
FIGS. 42*a* through 42*d* are illustrations which show a way of displaying information on the display of the mobile telephone.
Figures 43A, 43B, 43C, 43D:
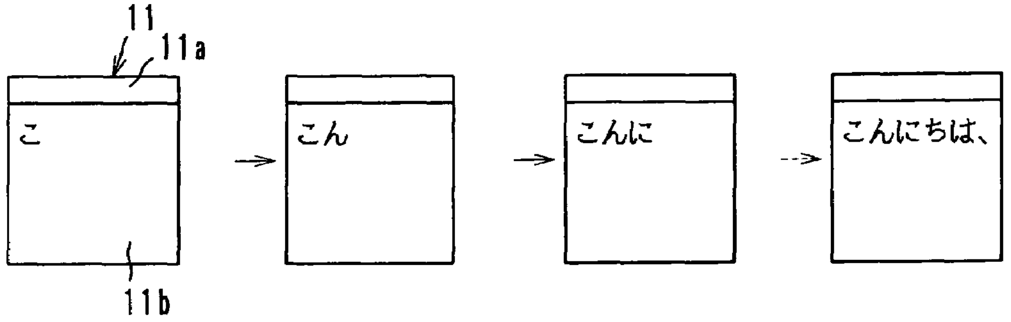
FIGS. 43*a* through 43*d* are illustrations which shows another way of displaying information on the display of the mobile telephone.
Figures 44A, 44B:
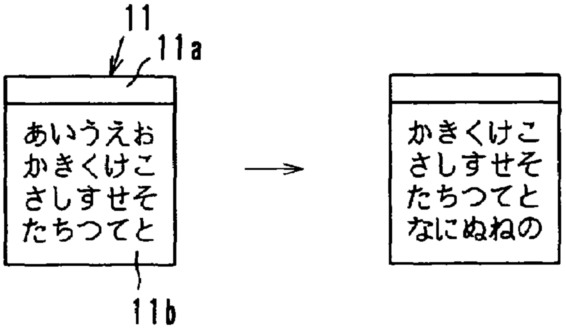
FIGS. 44*a* and 44*b* are illustrations which shows another way of displaying information on the display of the mobile telephone.

FIG. 40 shows the display 11. The display 11 has a status display area 11 a which is a narrow area in the upper part and an information display area **11*b* which is the other large part. In the status display area 11*a*, for example, symbol marks such as a mark indicating the strength of radio waves received, a mark indicating the remainder of the battery, the current date and time, the communication time, etc. are displayed. In the information display area 11*b***, the telephone number, the name, the date and time of communication, the contents of a mail, information about the mail, various kinds of messages, etc. are displayed.

Next, referring to FIG. 41, a first exemplary control circuit for the mobile telephone 10 is described. This control circuit 50 is basically of the same structure as that of a conventional mobile telephone. The main component of the circuit 50 is the CPU 135 shown in FIG. 2. To the CPU 135, further, an operation section 51 composed of various keys, the microphone 23, the speaker 13, a light emitting element 52, e.g., an LED which is turned on during communication, a memory 53 stored with a telephone directory, etc. are connected, and the antenna 12 is connected to the CPU 135 via a wireless communication circuit 54.

A battery 55 is provided in the circuit 50 to supply electric power to the CPU 135, the LCD driving circuit 130 and the wireless communication circuit 54 via a power circuit 56. The remainder of the battery 55 is monitored by a monitoring circuit 57 which is controlled by the CPU 135.

Next, various ways of displaying information on the display 11 of the mobile telephone 10 are described.

FIGS. **42*a* through 42*d* show a case of displaying numerals (a telephone number) inputted through the ten-key 20 in a strip-like area of the information display area 11*b*. Writing according to the fourth example of scanning and the fifth or sixth way of providing data (see FIG. 32**) is suited for this display.

FIGS. **43*a* through 43*d* show a case of displaying letters which are being inputted to write a mail in a strip-like area of the information display area 11*b*. Writing according to the fourth example of scanning and the fifth or sixth way of providing data (see FIG. 32**) is suited for this display.

FIGS. **44*a* and 44*b* show a case of scrolling the information display area 11*b*, for example, to look into the address note, to write a new address in the address note, to write a mail, to read a mail, etc. Writing according to the fourth example of scanning and the fifth or sixth way of providing data (see FIG. 32**) is suited for this display.

Figure 45A:
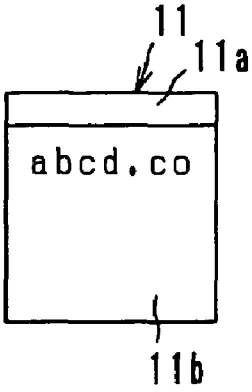
FIGS. 45*a* and 45*b* are illustrations which shows another way of displaying information on the display of the mobile telephone.
Figure 45B:
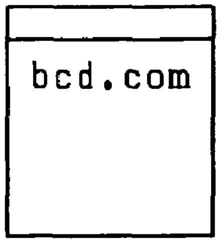

FIGS. 45*a* and 45*b* show a case of scrolling the strip-like area of the information display area 11*b* letter by letter. Writing according to the fourth example of scanning and the fifth or sixth way of providing data (see FIG. 32) is suited for this display.

Figure 46A:
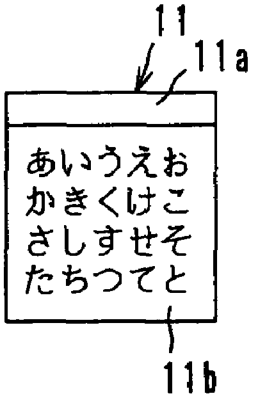
FIGS. 46*a* and 46*b* are illustrations which shows another way of displaying information on the display of the mobile telephone.
Figure 46B:
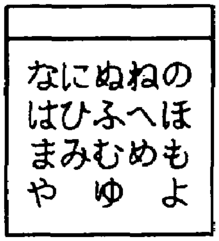

FIGS. 46*a* and 46*b* show a case of displaying the text of a mail page by page. For this display, writing according to the fourth example of scanning and the fourth, fifth or sixth way of providing data (see FIG. 32) and writing according to the thirteenth example of scanning (see FIG. 24) are suited for this display.

Figure 47A:
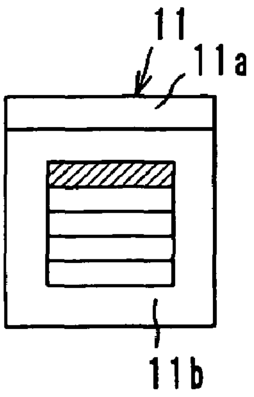
FIGS. 47*a* and 47*b* are illustrations which shows another way of displaying information on the display of the mobile telephone.
Figure 47B:
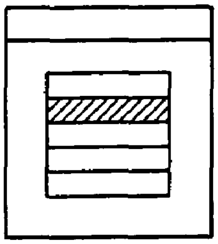

FIGS. 47*a* and 47*b* show a case of displaying a menu selection picture in the information display area 11*b*. In the menu selection picture, reversal display of a selected menu is carried out by partial writing. For this display, writing according to the fourth example of scanning and the fourth, fifth or sixth way of providing data (see FIG. 32) and writing according to the first example of scanning and the seventh, eighth or ninth way of providing data (see FIG. 33) are suited.

Figures 48A, 48B, 48C:
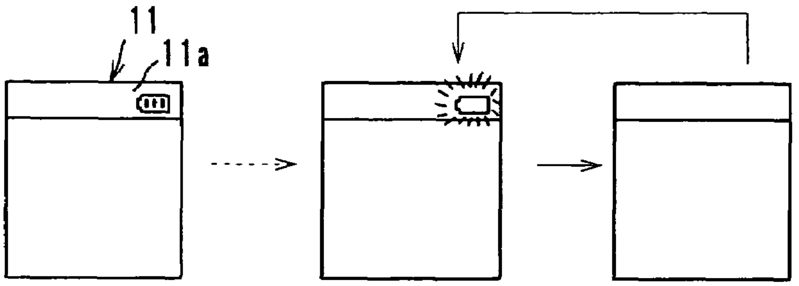
FIGS. 48*a* through 48*c* are illustrations which shows another way of displaying information on the display of the mobile telephone.
Figures 49A, 49B, 49C, 49D:
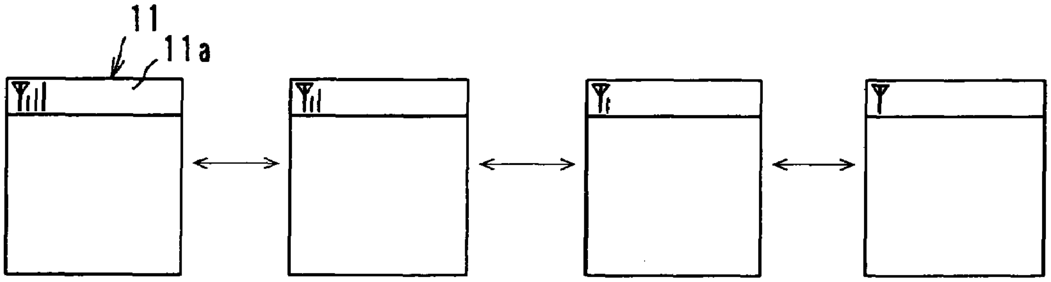
FIGS. 49*a* through 49*d* are illustrations which shows another way of displaying information on the display of the mobile telephone.

FIGS. 48*a* through 48*c* show a case of displaying a warning of use-up of the battery in the status display area 11*a*. For this display, writing according to the first example of scanning and the seventh example of providing data (see FIG. 33), writing according to the fifteenth example of scanning (see FIG. 26), writing according to the sixteenth example of scanning (see FIG. 27) and writing by the second driving method (see FIG. 9) are suited.

FIGS. 49*a* through 49*d* show a case of displaying the strength of eradio waves received. For this display, writing according to the first example of scanning and the seventh way of providing data (see FIG. 33), writing according to the fifteenth example of scanning (see FIG. 26), the sixteenth example of scanning (see FIG. 27) and writing by the second driving method 2 (see FIG. 9) are suited.

Figure 50:
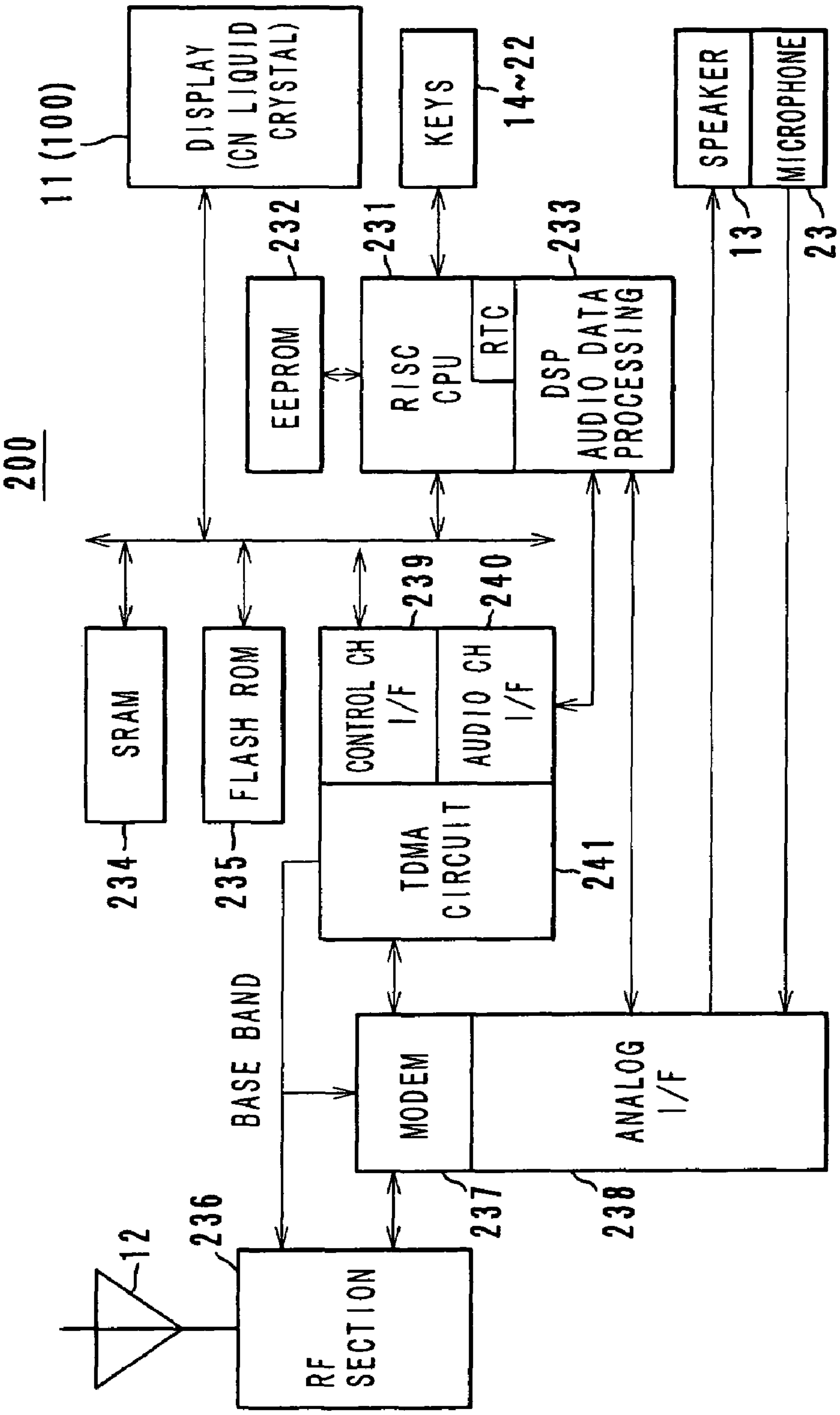
FIG. 50 is a block diagram which shows a second exemplary control circuit for the mobile telephone.

FIG. 50 shows a second exemplary control circuit for the mobile telephone 10. This control circuit 200 comprises a R1SC (reduced instruction set computer) 231 provided with an EEPROM 232, a DSP (digital signal processor) 233, an SRAM 234, a flash ROM 235, and an RF (radio frequency) section 236, a modem 237 provided with an analog I/F 238, a TDMA (time division multiple access) circuit 241 provided with a control channel I/F 239 and an audio channel I/F 240.

The keys 14 through 22 and the display 11 (liquid crystal display 100) are connected to the R1SC 231, and the speaker 13 and the microphone 23 are connected to the analog I/F 238.

Figure 51:
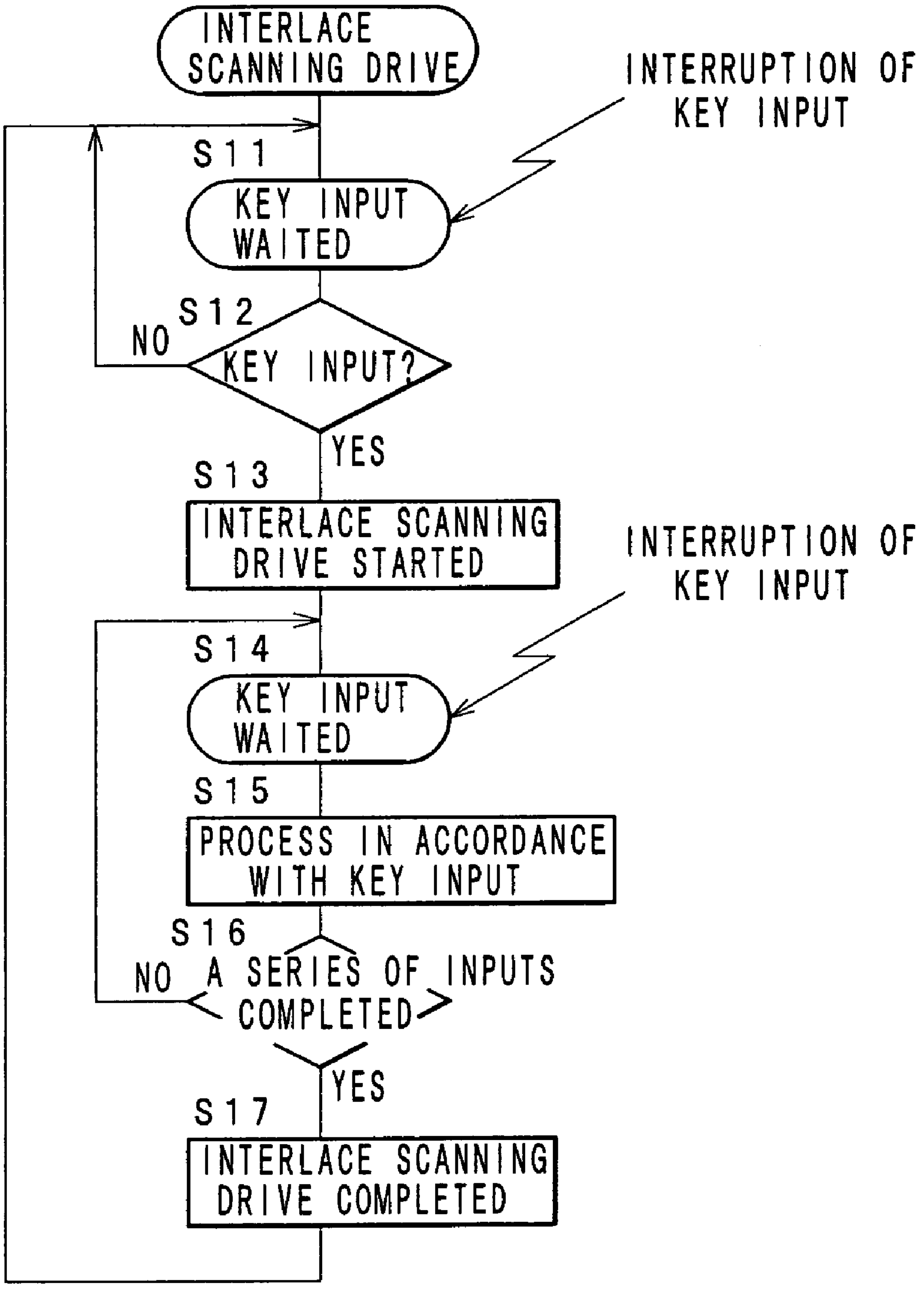
FIG. 51 is a flowchart which shows a first exemplary procedure of driving the display of the mobile telephone by interlace scanning when the mobile telephone is controlled by the second exemplary control circuit.

FIG. 51 shows a first exemplary procedure of controlling the display 11 when the mobile telephone 10 is controlled by the control circuit 200. An input through either of the keys 14 to 22 (interruption) is waited at step S11, and when any key input is detected ("YES" at step S12), an interlace scanning drive of the display 11 is started at step S13.

Then, an input through either of the keys 14 to 22 (interruption) is waited at step S14, and a process in accordance with the input is performed at step S15. When completion of a series of key inputs is confirmed ("YES" at step S16), the interlace scanning drive is stopped at step S17, and the program returns to step S11.

Figure 52:
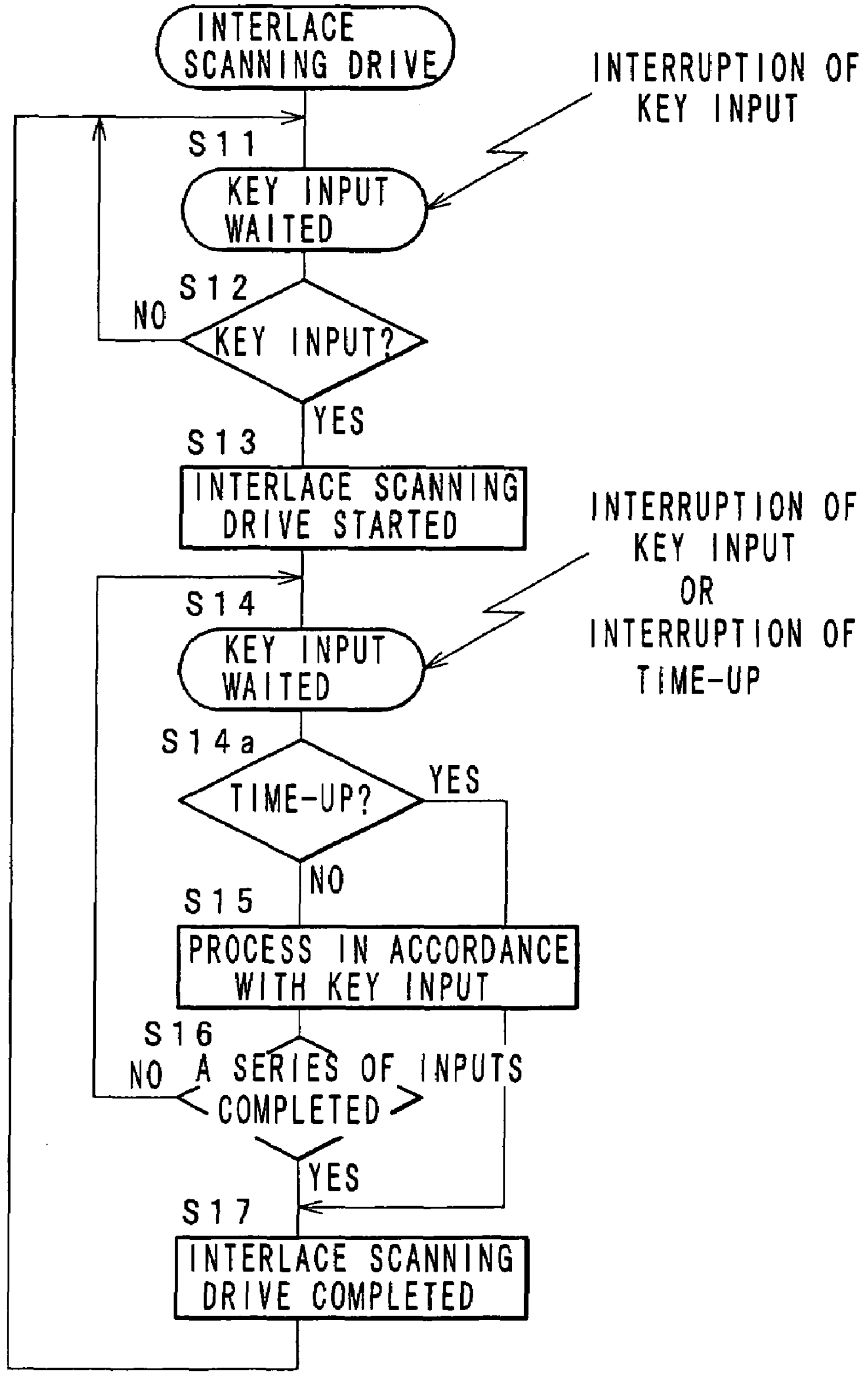
FIG. 52 is a flowchart which shows a second exemplary procedure of driving the display of the mobile telephone by interlace scanning when the mobile telephone is controlled by the second exemplary control circuit.

FIG. 52 shows a second exemplary procedure of controlling the display 11 when the mobile telephone 10 is controlled by the control circuit 200 shown by FIG. 50. This control procedure is basically the same as the control procedure shown by FIG. 51; however, if a specified time has passed since the start of an interlace scanning drive ("YES" at step S14*a*), the interlace scanning drive is stopped at step S17.

In the first and second exemplary procedures, it is possible to impart a function of selecting interlace scanning on the menu switch key 16. In this case, the judgments about execution of a key input at steps S12 and S16 are replaced with a judgment whether or not the interlace scanning is selected and a judgment whether or not the interlace scanning is cancelled.

Figure 53:
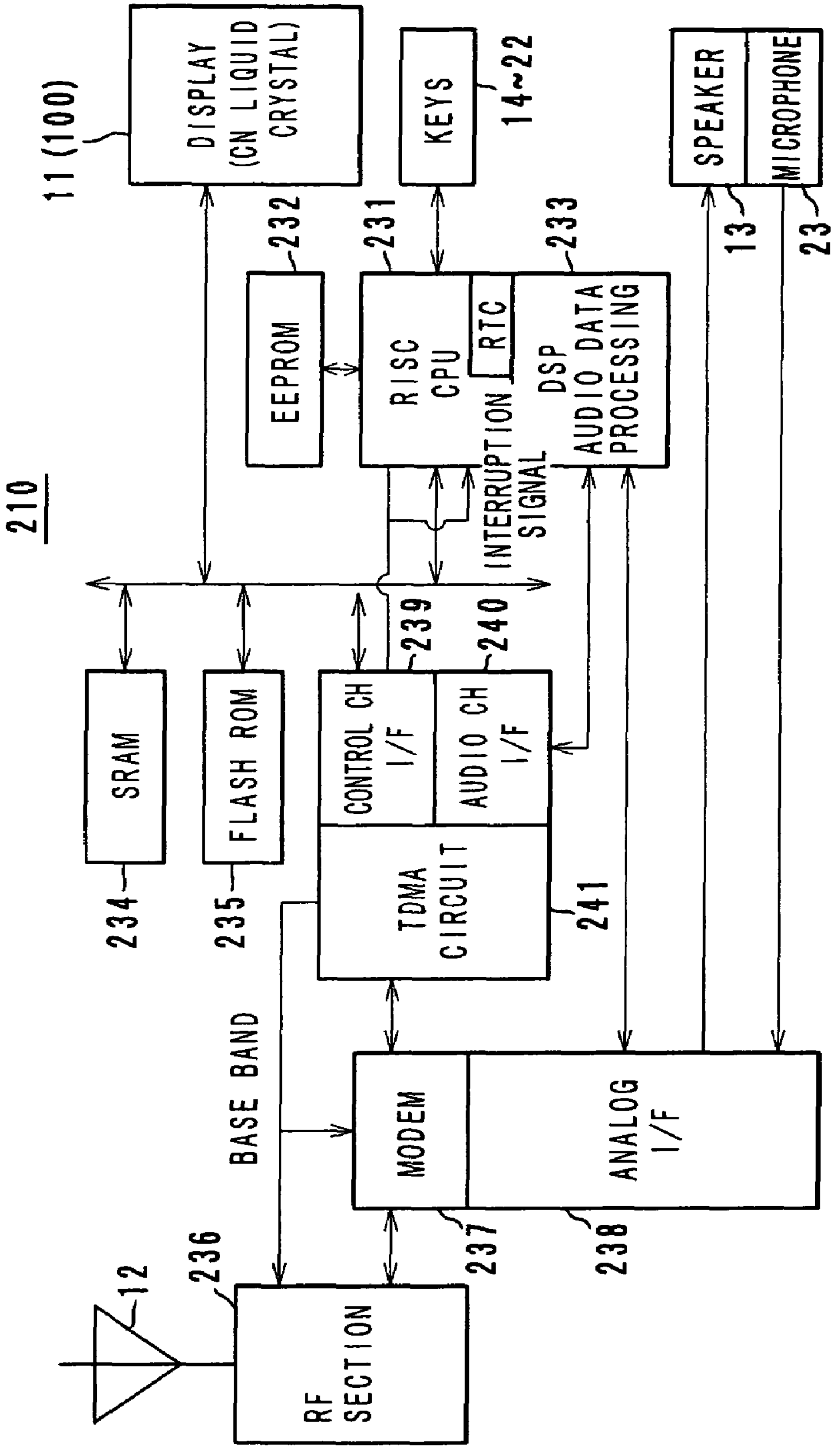
FIG. 53 is a block diagram which shows a third exemplary control circuit for the mobile telephone.

FIG. 53 shows a third exemplary control circuit for the mobile telephone 10. This control circuit 210 is basically of the same structure as the second exemplary control circuit 200 shown by FIG. 50. What is different from the second exemplary circuit 200 is that an interruption signal is inputted from the control channel I/F 239 to the R1SC 231.

Figure 54:
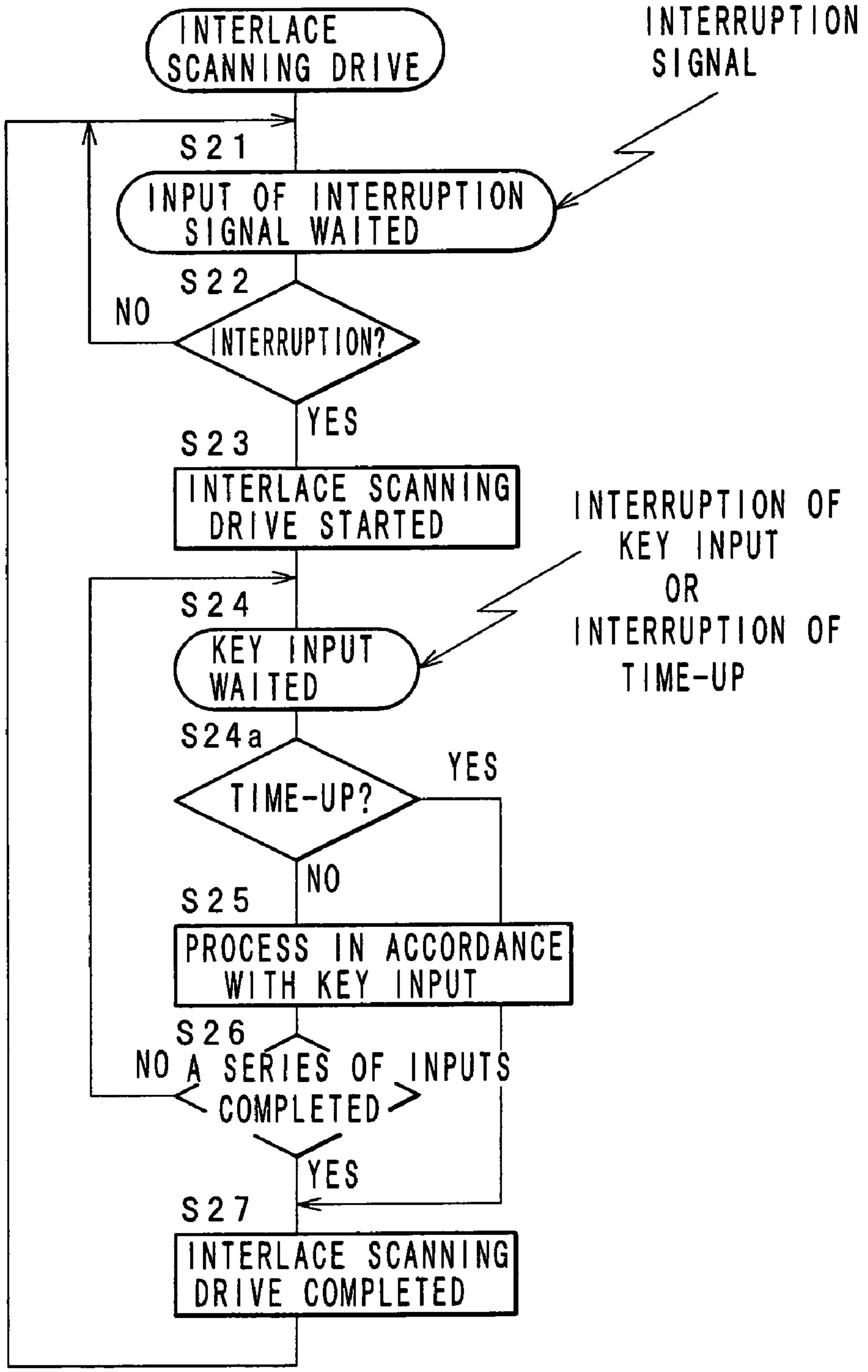
FIG. 54 is a flowchart which shows an exemplary procedure of driving the display of the mobile telephone by interlace scanning when the mobile telephone is controlled by the third exemplary control circuit.

FIG. 54 shows an exemplary procedure of controlling the display 11 when the mobile telephone 10 is controlled by the control circuit 210 shown by FIG. 53. An input of an interruption signal from the control channel I/F 239 is waited at step S21, and when an input of the interruption signal is detected ("YES" at step S22), an interlace scanning drive of the display 11 is started at step S23.

Next, an interruption of an input through the keys 14 to 22 or an interruption from the timer is waited at step S24. When a specified time has passed since the start of the interlace scanning drive ("YES" at step S24*a*), the interlace scanning drive is stopped immediately at step S27. Then, the program returns to step S21.

When any input through either of the keys 14 to 22 is detected within the specified time, ("NO" at step S24*a*), a process in accordance with the input is performed at step S25. Further, when completion of a series of key inputs is judged ("YES" at step S26), the interlace scanning drive is stopped at step S27. Then, the program returns to step S21.

Figure 55:
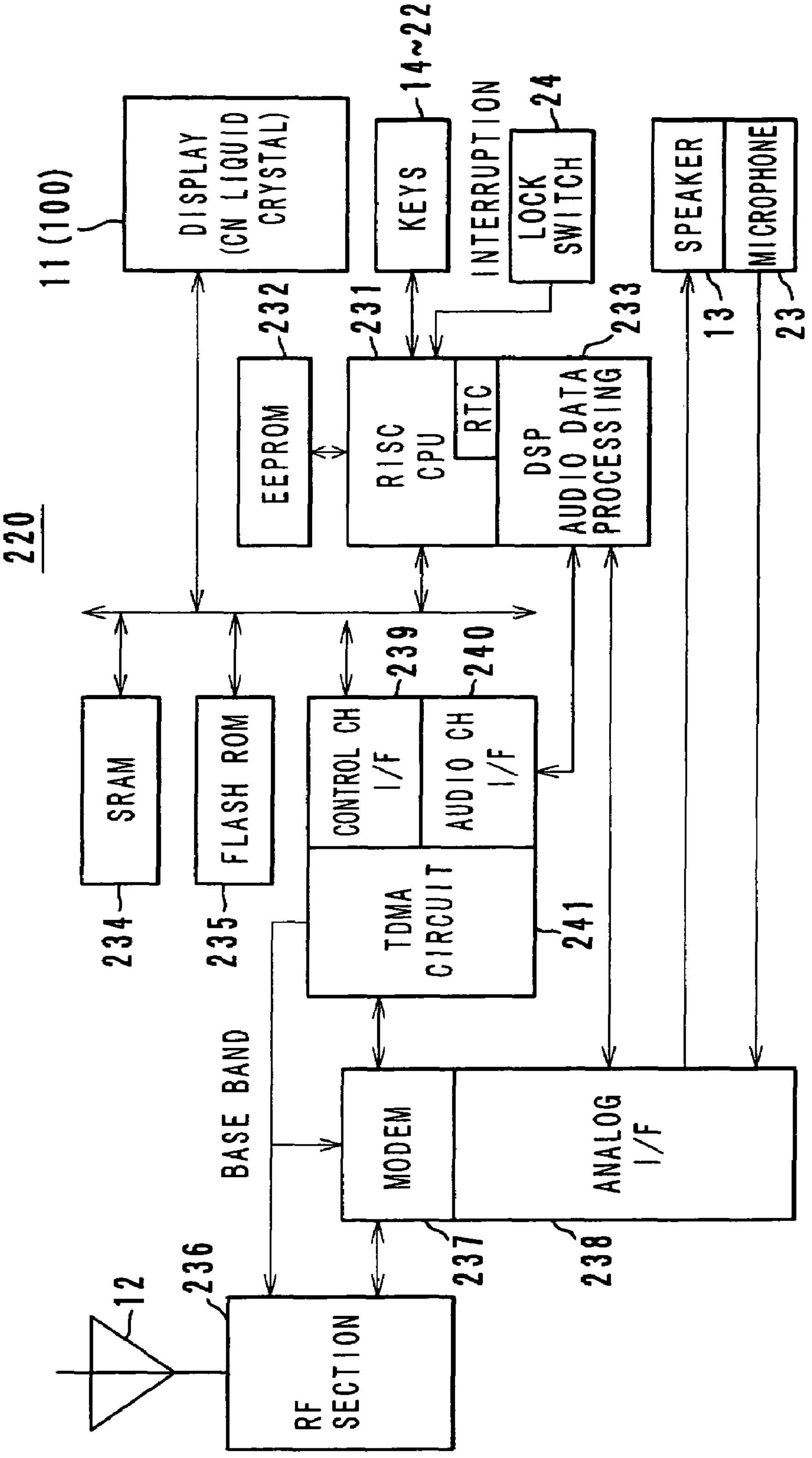
FIG. 55 is a block diagram which shows a fourth exemplary control circuit for the mobile telephone.

FIG. 55 shows a fourth exemplary control circuit for the mobile telephone 10. In this case, the mobile telephone 10 has a lock switch 24 which sends an interruption signal to the R1SC 231. In the other points, the fourth exemplary control circuit is of the same structure as that of the second exemplary control circuit shown by FIG. 50.

The lock switch 24 is to detect that the mobile telephone 10 is unlocked. If the mobile telephone 10 is of a foldable structure, the lock switch 24 is an electrical contact point which is capable of detecting that the mobile telephone 10 is opened from a folded state. If the mobile telephone 10 is of a slidable structure in which a lid is capable of sliding, the lock switch 24 is an electrical contact point which is capable of detecting that the lid is opened from a closed state.

Figure 56:
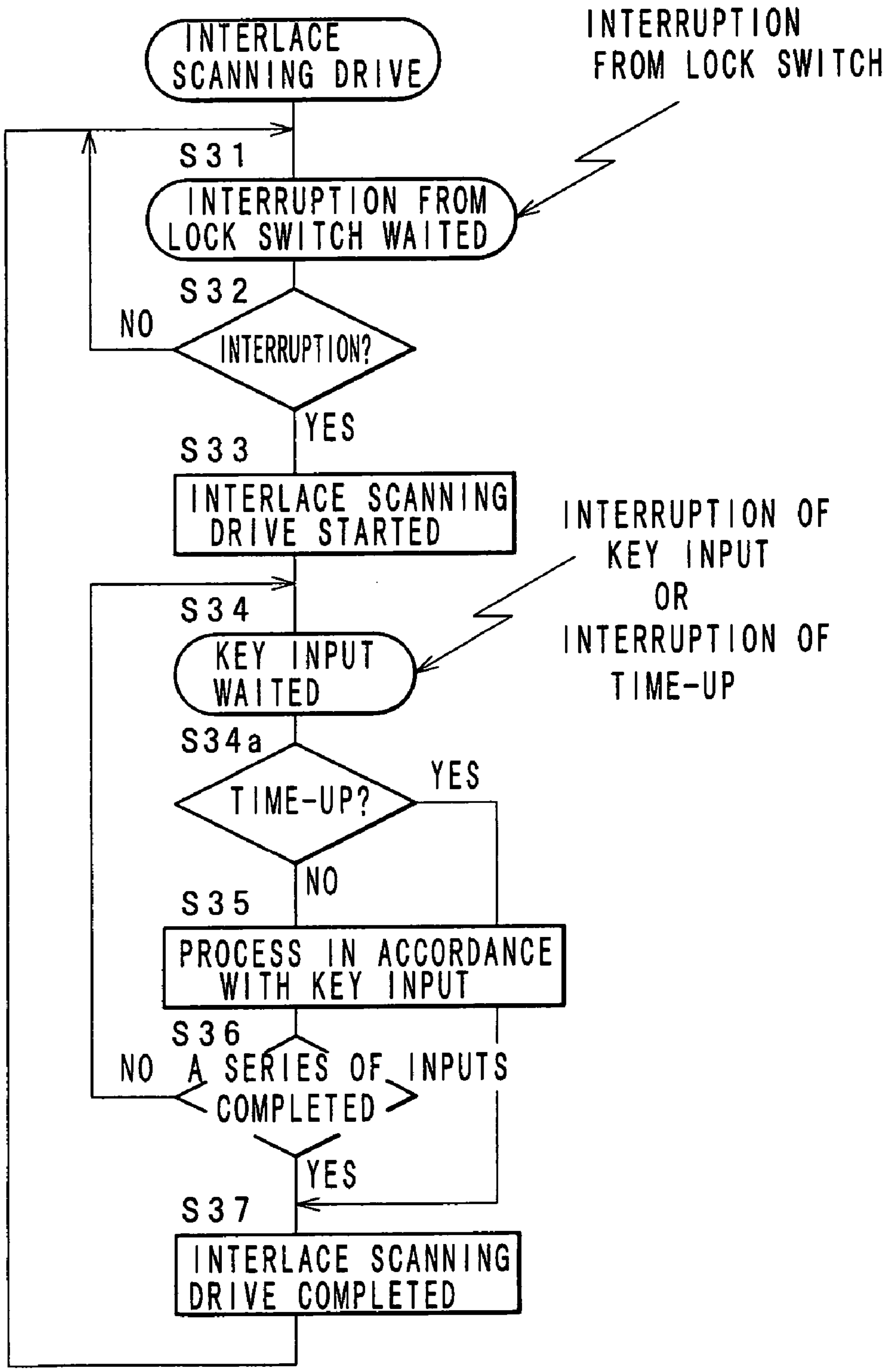
FIG. 56 is a flowchart which shows an exemplary procedure of driving the display of the mobile telephone by interlace scanning when the mobile telephone is controlled by the fourth exemplary control circuit.

FIG. 56 shows an exemplary procedure of controlling the display 11 when the mobile telephone 10 is controlled by the control circuit 220 shown by FIG. 55. An interruption of an input from the lock switch 24 is waited at step S31, and when the interruption is detected ("YES" at step S32), an interlace scanning drive of the display 11 is started at step S33.

Next, an interruption of an input through the keys 14 to 22 or an interruption from the timer is waited at step S34. When a specified time has passed since the start of the interlace scanning drive ("YES" at step S34*a*), the interlace scanning drive is stopped immediately at step S27. Then, the program returns to step S31.

When any input through either of the keys 14 to 22 is detected within the specified time, ("NO" at step S34*a*), a process in accordance with the input is performed at step S35. Further, when completion of a series of key inputs is judged ("YES" at step S36), the interlace scanning drive is stopped at step S37. Then, the program returns to step S31.

Mobile Information Terminal, PDA; See FIGS. 57-62

Figure 57:
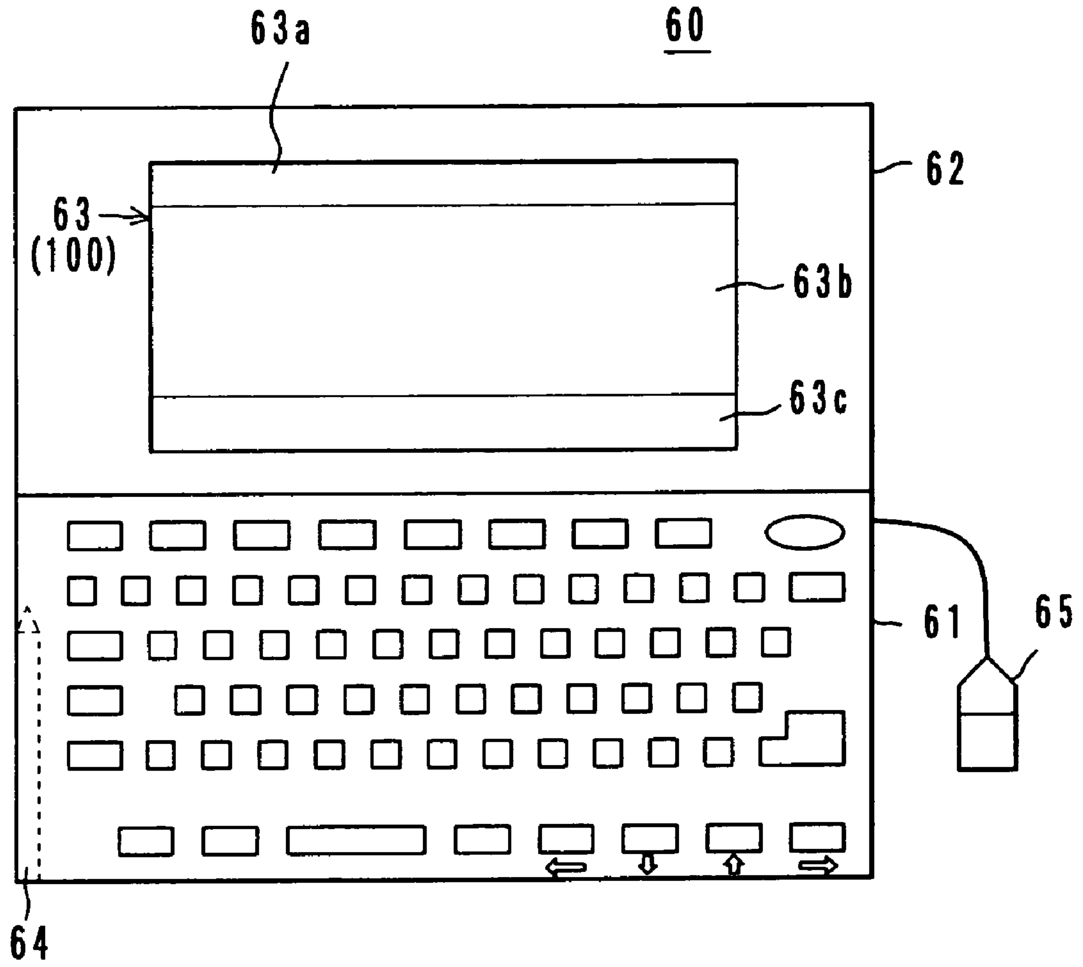
FIG. 57 is a front view of PDA.

FIG. 57 shows an example of application of the present invention to PDA. The PDA 60 have an upper door 62 which is opened and closed from and to a base casing 61 via a hinge (not shown). A display 63 which is the liquid crystal display 100 is provided in the upper door 62. The base casing 61 is structured as a keyboard with various keys arranged thereon, and a pen 64 is encased in the casing 61. Further, a connecting terminal 65 to a mobile telephone is attached to the casing 61.

Figure 58:
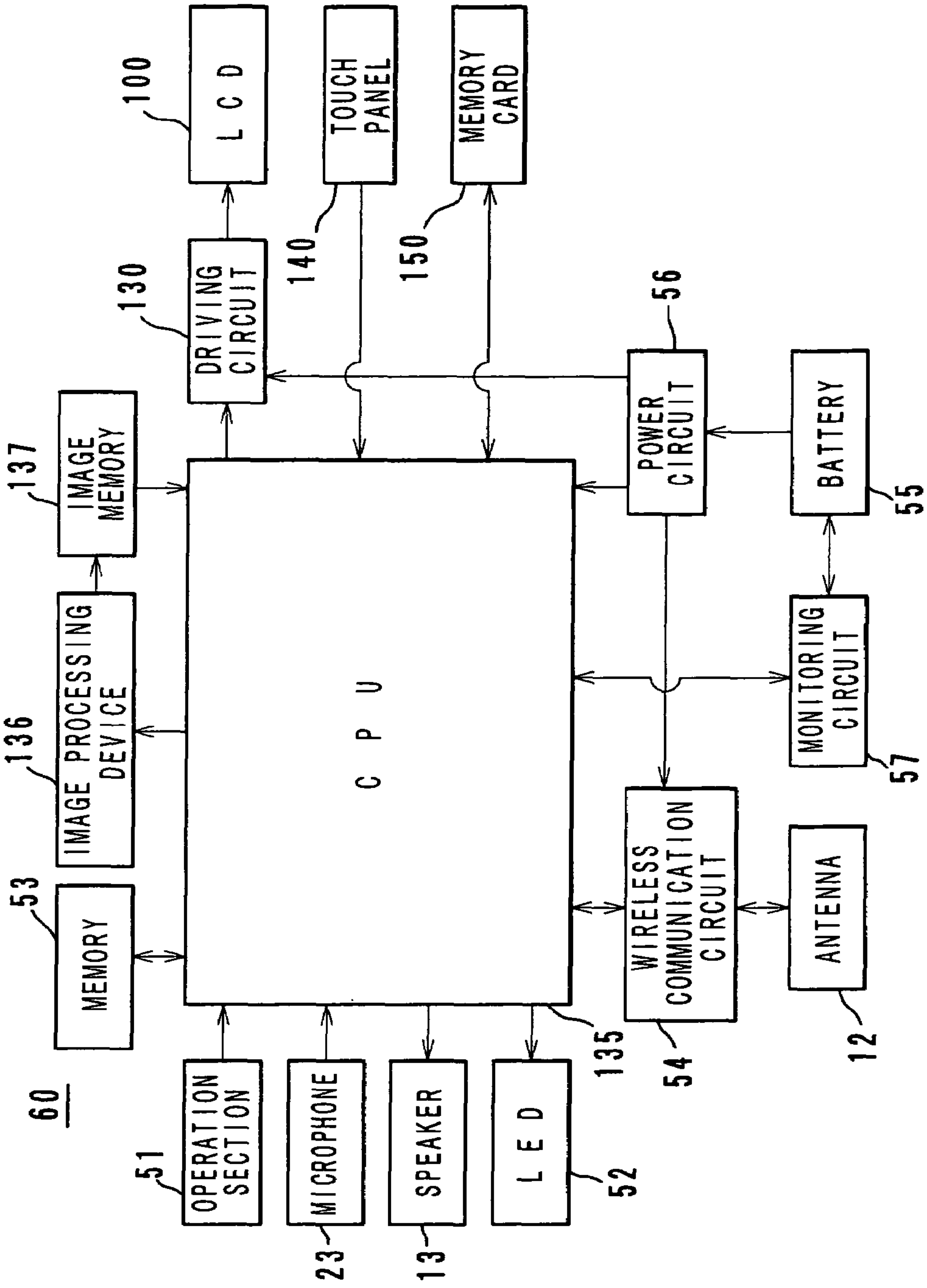
FIG. 58 is a block diagram which shows the control circuit of the PDA.

FIG. 58 shows the control circuit 60 of the PDA 60. This control circuit 60 is basically of the same structure as the control circuit 50 (see FIG. 41) of the mobile telephone 10. In FIG. 58, the same parts and members are provided with the same reference symbols as in FIG. 41. In FIG. 58, however, a touch panel 140 and a memory card 150 are added.

FIG. 59 shows a state in which the touch panel 140 is placed on the liquid crystal display 100. The touch panel 140 is placed on the liquid crystal display 100 with a preventive layer 148 made of rigid resin in-between. The preventive layer 148 is to prevent pressure from acting on part of the liquid crystal display 100. The touch panel 140 is of a conventional structure. On the mutually opposite surfaces of transparent substrates 141 and 142, strip-like electrodes 143 and 144 are arranged, so that a matrix-type sensor is formed. By providing spacer particles 146 between the substrates 141 and 142 and by providing a sealant 147 therearound, the gap between the substrates 141 and 142 is kept in a specified value, and an air layer 145 is sealed in the gap. The intersections between the strip-like electrodes 134 and 144 are sensing sections, and these sensing sections correspond to the pixels of the display layers 111R, 111G and 111B.

Next, various ways of displaying information on the display 63 of the PDA 60 are described. The screen of the display 63 is divided into three areas 63*a*, 63*b*, and 63*c*, and mutually different kinds of information can be displayed in these areas 63*a*, 63*b* and 63*c*.

Figures 60A, 60B:
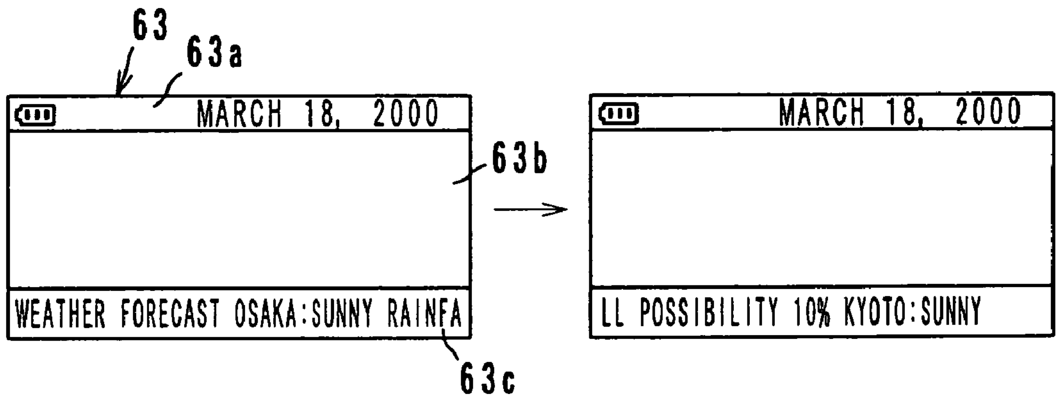
FIGS. 60*a* and 60*b* are illustrations which show a way of displaying information on the display of the PDA.

FIGS. 60*a* and 60*b* show a case of displaying literal information in the lower strip-like display area 63*c*. The literal information is displayed as a motion picture, and writing according to the fourth example of scanning and the fourth, fifth or sixth way of providing data (see FIG. 32) and writing according to the first example of scanning and the seventh, eighth or ninth way of providing data (see FIG. 33) are suited for this display.

Figures 61A, 61B:
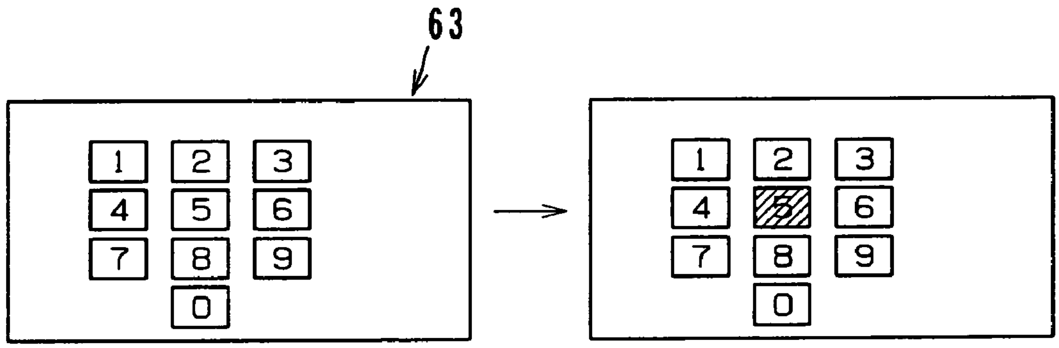
FIGS. 61*a* and 61*b* are illustrations which show another way of displaying information on the display of the PDA.

FIGS. 61*a* and 16*b* show a case of displaying a ten-key almost in the entire area of the display 63 to permit use of the touch panel 140 and of performing reversal display of the touched key. For this display, writing according to the fourth example of scanning and the fourth, fifth or sixth way of providing data (see FIG. 32) and writing according to the first example of scanning and the seventh, eighth or ninth way of providing data are suited.

Figures 62A, 62B:
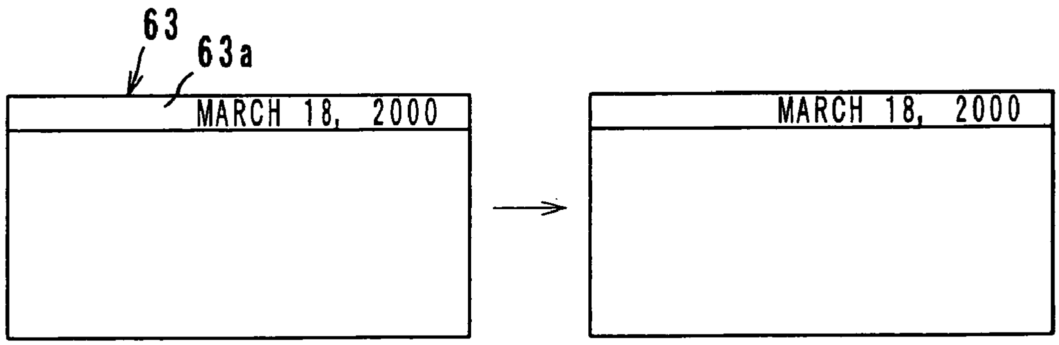
FIGS. 62*a* and 62*b* are illustrations which show another way of displaying information on the display of the PDA.

FIGS. 62*a* and 62*b* show a case of changing the date in the upper strip-like display area 63*a*. For this display, writing according to the first example of scanning and the seventh way of providing data (see FIG. 33), writing according to the fifteenth example (see FIG. 26), writing according to the sixteenth example and writing by the second driving method (see FIG. 9) are suited.

Mobile Information Terminal, GPS; See FIGS. 63 and 64

Figure 63:
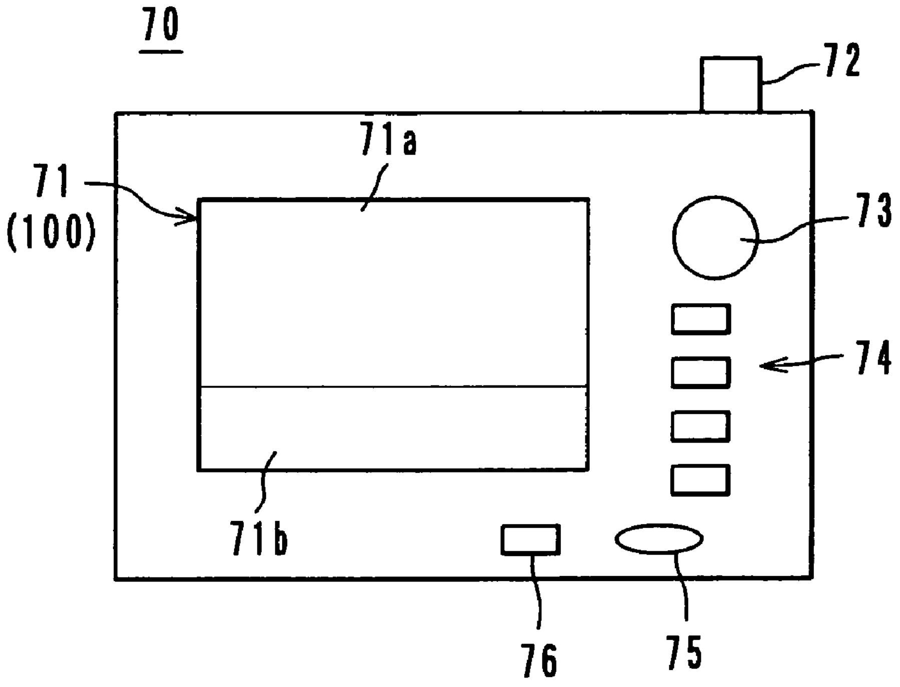
FIG. 63 is a front view of a GPS.

FIG. 63 shows an example of application of the present invention to a GPS (global positioning system). A GPS is a mobile information terminal which shows the geographical position by use of the conventional satellite positioning method. The GPS 70 comprises a display which is the liquid crystal display 100, an antenna 72, a scroll key 73, keys 74 exclusively used for displaying an address, etc., a power switch 75 and a mode key 86. The functions of these keys are well known. The GPS 70 is capable of displaying the geographical position and a map which shows a route to the destination.

The screen of the display 71 is divided into an upper large display area 71*a* and a lower strip-like display area 71*b*, and mutually different kinds of information can be displayed in the areas 71*a* and 71*b*.

Figure 64A:
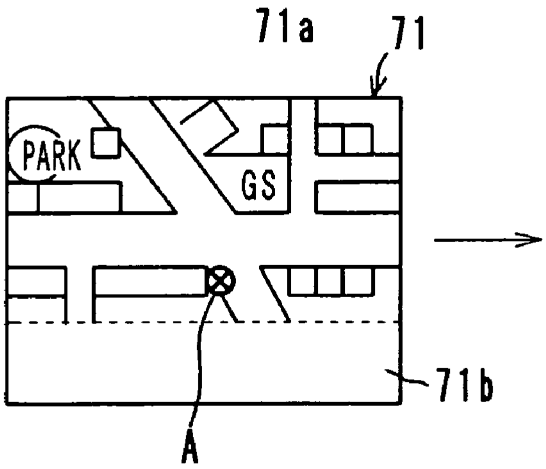
FIGS. 64*a* and 64*b* are illustrations which show a way of displaying information on a display of the GPS.
Figure 64B:
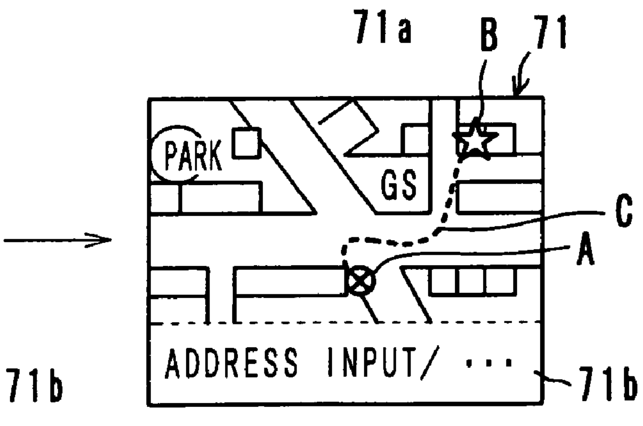

FIGS. 64*a* and 64*b* shows a case of displaying a map of the neighborhood and a mark A indicating the current position in the display area 71*a* of the display 71. When the user inputs the address of the destination by use of the keys, the inputted address is immediately displayed in the display area 71*b*. Simultaneously, in the map displayed in the area 71*a*, the destination is indicated by a mark B, and a route C is displayed. For this display, writing according to the fourth example of scanning and the fourth, fifth or sixth way of providing data (see FIG. 32) and writing according to the first example of scanning and the seventh, eighth or ninth way of providing data (see FIG. 33) are suited.

Mobile Information Terminal, GPS; See FIG. 65

Figure 65:
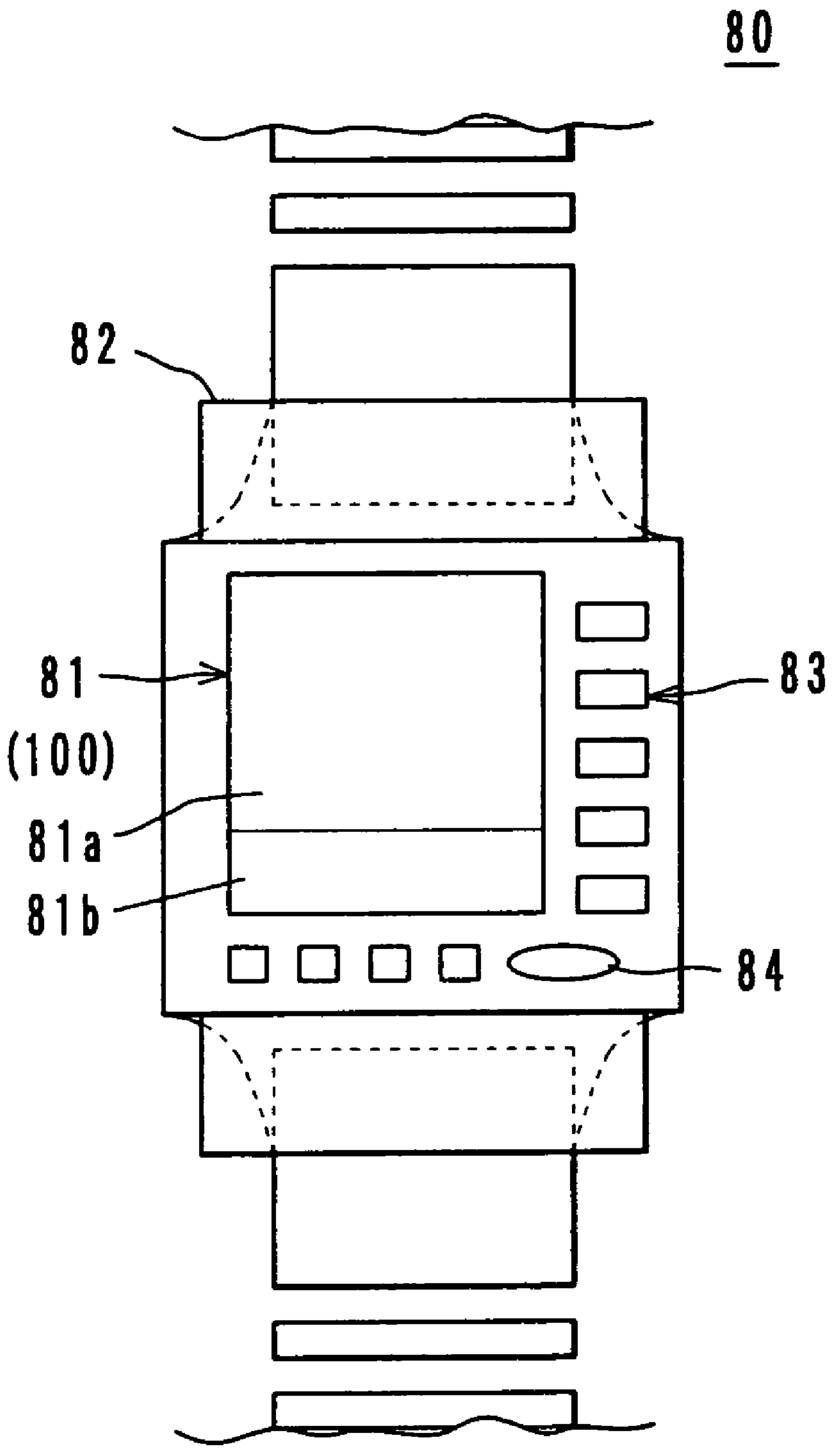
FIG. 65 is an illustration of another GPS.

FIG. 65 shows an example of application of the present invention to a watch-type GPS. This GPS 80 comprises a display 81 which is the liquid crystal display 100, an antenna 82, keys 83 for exclusive use, a power switch 84, etc. The functions of these keys are well known.

The screen of the display 81 is divided into an upper large display area 81*a* and a lower strip-like display area 81*b*, and mutually different kinds of information can be displayed in the areas 81 a and 81 b. Information can be displayed on the display 81 in similar ways to the case described in connection with the GPS 70.

Other Embodiments

With respect to the liquid crystal display, the structure, the materials, the producing method and the structure of the driving circuit are arbitrary. The shape of the display device and the structure of the operation panel, etc. are arbitrary. With respect to the driving modes which were described with reference to FIGS. 36 through 38, how much the second frame length (the length of the cycle of writing a frame in each power-saving mode) is longer than the first frame length is arbitrary.

In the embodiments above, the number of scanning lines (scanning electrodes), the number of data lines (data electrodes), the number of fields are merely examples.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A display device comprising:

a liquid crystal display comprising a plurality of scanning lines, a plurality of data lines which cross the scanning lines, and chiral nematic liquid crystal provided between the scanning lines and the data lines, the scanning lines and the data lines defining a plurality of pixels arranged in a matrix, the liquid crystal being capable of displaying an image thereon continuously while no voltages are applied to the scanning lines and the data lines, and the liquid crystal performing selective reflection in a cholestric phase;

a driver which is connected to the scanning lines and the data lines and which carries out writing in a first display area of the liquid crystal display and writing in a second display area of the liquid crystal display independently of each other in a predetermined display mode, wherein the first display area and the second display area are separated by a specified scanning line as a border, and in said predetermined display mode, the driver carries out writing by interlace scanning repeatedly in a plurality of fields into which each frame is divided, wherein said specified scanning line is changeable, and wherein said driver drives the liquid crystal display with a driving waveform including a reset step of resetting the liquid crystal into a homeotropic state, a selection step of selecting a final state of the liquid crystal, and an evolution step of establishing the final state of the liquid crystal;

an operation member to be used by an operator; and a controller for controlling the driver to start an interlace scanning drive in response to operation of the operation member, wherein the liquid crystal keeps displaying an image thereon using a memory effect until interlace scanning is started, and wherein, in an area other than an area that is subjected to interlace scanning, the liquid crystal keeps displaying an image thereon using the memory effect.

2. The display device according to claim 1, wherein the controller controls the driver to continue the interlace scanning drive for a specified time after the operation of the operation member.

3. The display device according to claim 2, wherein the controller controls the driver to stop the interlace scanning drive when the specified time has passed since the operation of the operation member.

4. The display device according to claim 1, wherein the controller controls the driver to continue the interlace scanning drive while the operation member is being operated.

5. The display device according to claim 1, wherein:

either one of the reset step or a total of the selection step and the evolution step has a length of time which is n times as long as the other, in which n is a natural number; or either one of a total of the reset step and the selection step or the evolution step has a length of time which is n times as long as the other, in which n is a natural number.

6. The display device according to claim 1, wherein:

the driver uses one of a length of the reset step, a total length of the selection step and the evolution step, a total length of the reset step and the selection step, and a length of the evolution step as a unit length; and when a length of time which is k times the unit length has passed since a start of the selection step of a scanning line, the driver starts the selection step of a next scanning line for writing, in which k is a natural number.

7. The display device according to claim 1, wherein the driver carries out writing by interlace scanning by dividing the frame into a plurality of fields.

8. The display device according to claim 7, wherein:

the driver uses one of a length of the reset step, a total length of the selection step and the evolution step, a total length of the reset step and the selection step, and a length of the evolution step as a unit length; and when a length of time which is k times the unit length has passed since a start of the selection step of a scanning line, the driver starts the selection step of a next scanning line for writing, in which k is a natural number.

9. The display device according to claim 7, wherein when a blackout state of a specified scanning line in a field ends, the driver starts the selection step of a first scanning line in a next field for writing.

10. The display device according to claim 9, wherein the specified scanning line in the field is the first scanning line in the field.

11. The display device according to claim 7, wherein the driver extends an evolution step of each scanning line in a field at least to a start of writing on each corresponding scanning line in a next field so as to keep the liquid crystal of each scanning line in a blackout state at least until the start of writing in the next field.

12. The display device according to claim 7, wherein the controller is adapted to control the driver to write a new piece of frame data in every field.

13. The display device according to claim 7, wherein the controller, when writing is carried out by dividing a frame into m fields, is adapted to control the driver to write a new piece of frame data in every m fields.

14. The display device according to claim 7, further comprising:

a selector for selecting a length for a cycle of writing a frame from a first frame length and a second frame length which is longer than the first frame length; and wherein the controller is adapted to control the driver to carry out writing at cycles of the selected frame length.

15. The display device according to claim 7, further comprising a selector for selecting a driving method from a plurality of driving methods, the driving methods including interlace scanning.

16. The display device according to claim 1, wherein:

the driver carries out writing by interlace scanning by dividing a frame into m fields, in which m is a natural number larger than n;

a length of the reset step is n times a total length of the selection step and the evolution step; and the writing comprises a moment when in serial m scanning lines, n scanning lines of them are in the reset step, one of them is in the selection step or in the evolution step, and the other m-n-1 scanning lines are in a display step.

17. The display device according to claim 1, wherein:

the driver carries out writing by interlace scanning by dividing a frame into m fields, in which m is a natural number larger than n;

a total length of the selection step and the evolution step is n times a length of the reset step; and the writing comprises a moment when in serial m scanning lines, one of them is in the reset step, n scanning lines of them are in the selection step or in the evolution step, and the other m-n-1 scanning lines are in a display step.

18. The display device according to claim 1, wherein:

the driver carries out writing by interlace scanning by dividing a frame into m fields, in which m is a natural number larger than n;

a total length of the reset step and the selection step is n times a length of the evolution step; and the writing comprises a moment when in serial m scanning lines, n scanning lines of them are in the reset step or in the selection step, one of them is in the evolution step, and the other m-n-1 scanning lines are in a display step.

19. The display device according to claim 1, wherein:

the driver carries out writing by interlace scanning by dividing a frame into m fields, in which m is a natural number larger than n;

a length of the evolution step is n times a total length of the reset step and the selection step; and the writing comprises a moment when in serial m scanning lines, one of them is in the reset step or in the selection step, n scanning lines of them are in the evolution step, and the other m-n-1 scanning lines are in a display step.

20. A display device comprising:

a liquid crystal display including a plurality of scanning lines, a plurality of data lines which cross the scanning lines, and chiral nematic liquid crystal provided between the scanning lines and the data lines, the scanning lines and the data lines defining a plurality of pixels arranged in a matrix, the liquid crystal being capable of displaying an image thereon continuously while no voltages are applied to the scanning lines and the data lines, and the liquid crystal being capable of performing selective reflection in a cholestric phase;

a driver connected to the scanning lines and the data lines and adapted to carry out writing in a first display area of the liquid crystal display and writing in a second display area of the liquid crystal display independently of each other in a predetermined display mode, wherein the first display area and the second display area are separated by a specified scanning line as a border, and in said predetermined display mode, the driver is adapted to carry out writing by interlace scanning repeatedly in a plurality of fields into which each frame of an image is divided, wherein said specified scanning line is changeable, and wherein said driver is adapted to drive the liquid crystal display with a driving waveform including a reset step of resetting the liquid crystal into a homeotropic state, a selection step of selecting a final state of the liquid crystal, and an evolution step of establishing the final state of the liquid crystal;

an operation member to be used by an operator; and a controller for controlling the driver to start an interlace scanning drive in response to operation of the operation member, wherein the liquid crystal is adapted to keep displaying an image thereon using a memory effect until interlace scanning is started, and wherein, in an area other than an area that is subjected to interlace scanning, the liquid crystal is adapted to keep displaying an image thereon using the memory effect.

* * * * *